United States Patent [19]
Ikuta et al.

[11] Patent Number: 5,441,032
[45] Date of Patent: Aug. 15, 1995

[54] FUEL INJECTION SYSTEM FOR MULTI-CYLINDER INTERNAL COMBUSTION ENGINE

[75] Inventors: Kenji Ikuta, Rolling Hills Estates, Calif.; Toshihiro Suzumura, Nagoya, Japan; Shigenori Isomura, Kariya, Japan; Keigi Honjoh, Anjo, Japan

[73] Assignee: Nippondenso Co., Ltd., Kariya, Japan

[21] Appl. No.: 161,855

[22] Filed: Dec. 6, 1993

[30] Foreign Application Priority Data

Dec. 7, 1992 [JP] Japan ................... 4-326315
Dec. 10, 1992 [JP] Japan ................... 4-330297
Mar. 12, 1993 [JP] Japan ................... 5-052212
Jun. 21, 1993 [JP] Japan ................... 5-149311

[51] Int. Cl.$^6$ ............................................. F02B 3/00
[52] U.S. Cl. ............................... 123/531; 123/585
[58] Field of Search ..................... 123/531, 533, 585

[56] References Cited

U.S. PATENT DOCUMENTS

| | | | |
|---|---|---|---|
| 3,788,287 | 1/1974 | Falen et al. ............ | 123/52 MV |
| 4,387,696 | 6/1983 | Yogo et al. ............ | 123/585 |
| 4,465,050 | 8/1984 | Igashira et al. ......... | 123/585 |
| 4,475,486 | 10/1984 | Kessler ................. | 123/52 M |
| 4,756,293 | 7/1988 | Suzuki et al. .......... | 123/531 |
| 5,121,716 | 6/1992 | Takahashi et al. ..... | 123/531 |
| 5,148,788 | 9/1992 | Saikalis et al. ....... | 123/585 |
| 5,150,692 | 9/1992 | Trombley et al. ..... | 123/533 |

FOREIGN PATENT DOCUMENTS

| | | |
|---|---|---|
| 0153012 | 8/1985 | European Pat. Off. . |
| 0221312 | 5/1987 | European Pat. Off. . |
| 57-54624 | 11/1982 | Japan . |
| 57-191454 | 11/1982 | Japan . |
| 58-162262 | 10/1983 | Japan . |
| 0196457 | 12/1983 | Japan . |
| 58-206851 | 12/1983 | Japan . |
| 61-112773 | 5/1986 | Japan . |
| 2119971 | 11/1983 | United Kingdom . |
| 2168830 | 6/1986 | United Kingdom . |
| 2227580 | 8/1990 | United Kingdom . |

*Primary Examiner*—Noah P. Kamen
*Attorney, Agent, or Firm*—Cushman, Darby & Cushman

[57] ABSTRACT

In a fuel injection system for an internal combustion engine, engine cylinders are divided into a plurality of cylinder groups. An air passage is provided for supplying mixing air to areas near injection holes of fuel injection valves so as to facilitate atomization of fuel injected from the respective fuel injection valves. The air passage is opened synchronously with a fuel injection of each fuel injection valve such that the mixing air is selectively distributed to the above-noted areas per cylinder group. The mixing air is distributed for such a cylinder group that includes the engine cylinder being injected with the fuel from the corresponding fuel injection valve. The air passage includes a branch portion for the distribution of the mixing air to the above-noted areas. Capacities of the air passage from the branch portion to the respective fuel injection valves may be set substantially equal to each other so as to further facilitate the atomization of the injected fuel.

14 Claims, 35 Drawing Sheets

TO #1, #2    TO #3, #4

POSITION A

TO #1, #2

POSITION B

TO #3, #4

POSITION C

TO #1, #2    TO #3, #4

CLOSING POSITION

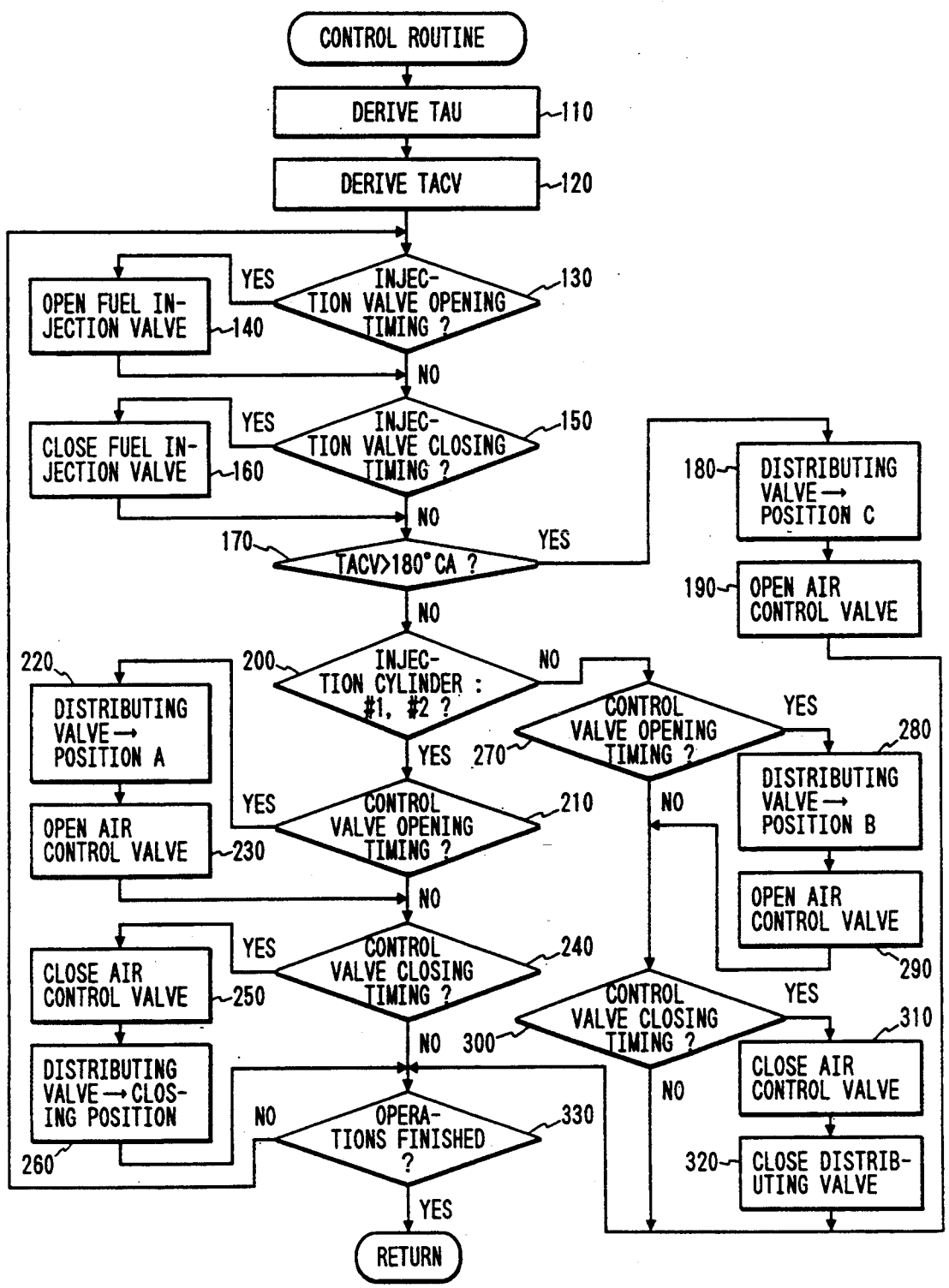

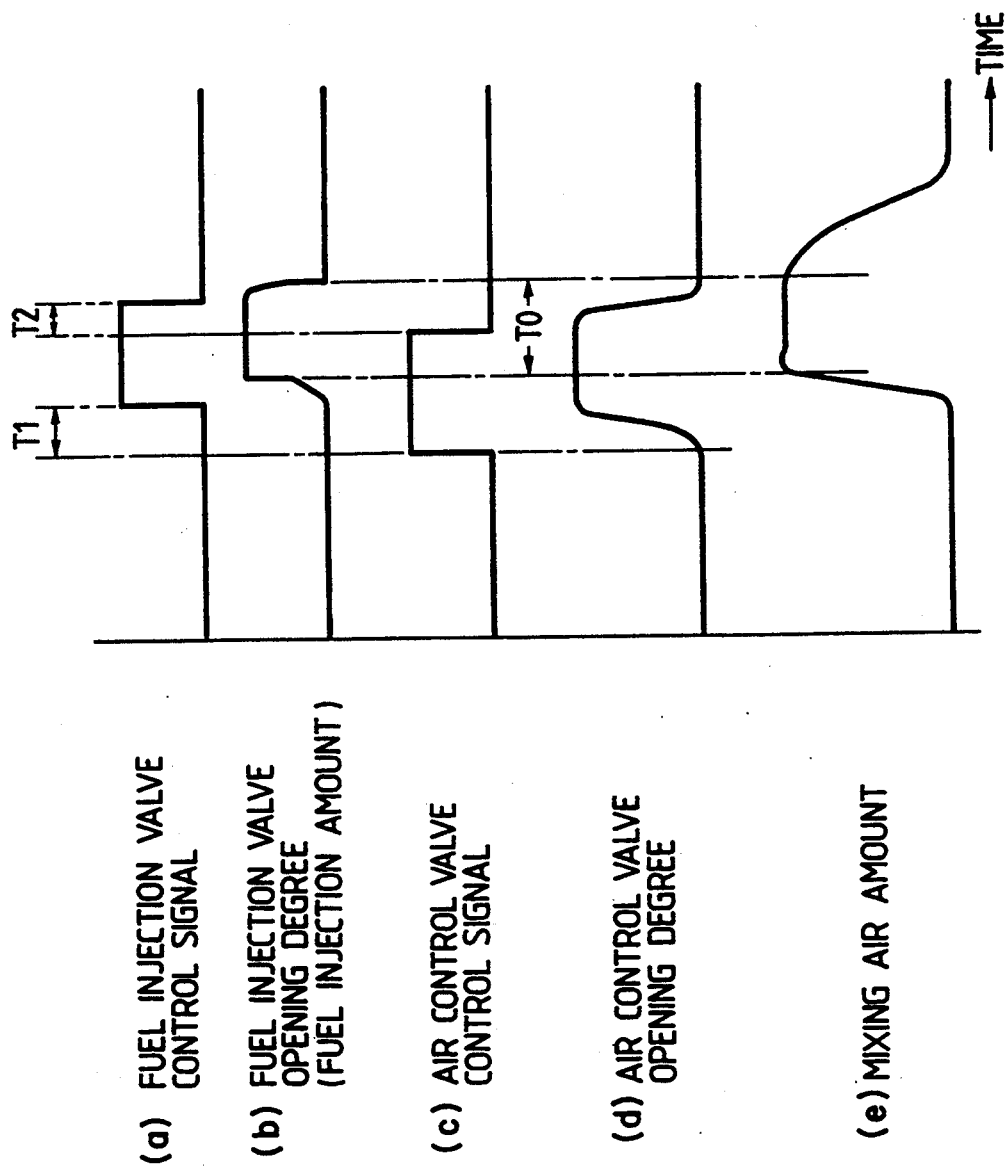

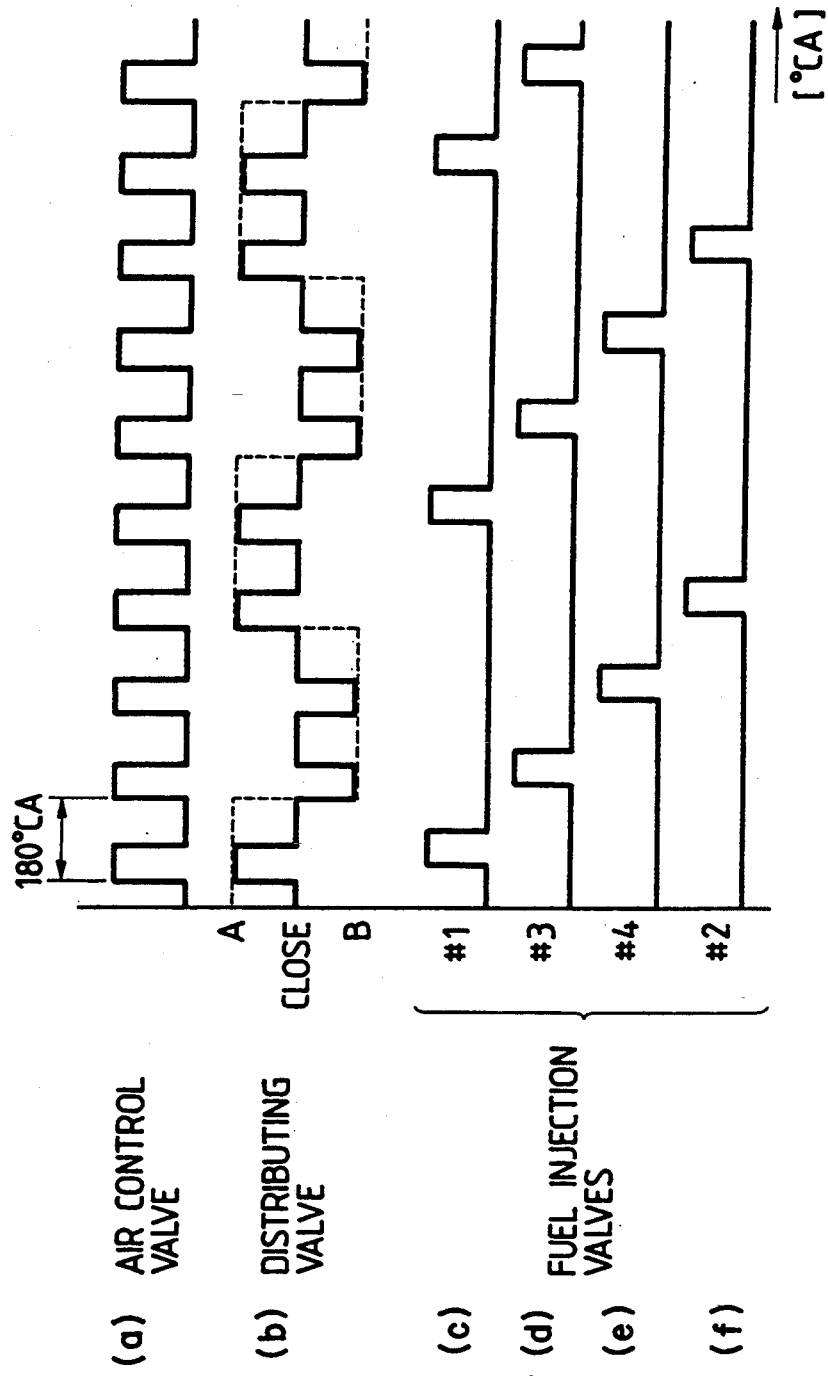

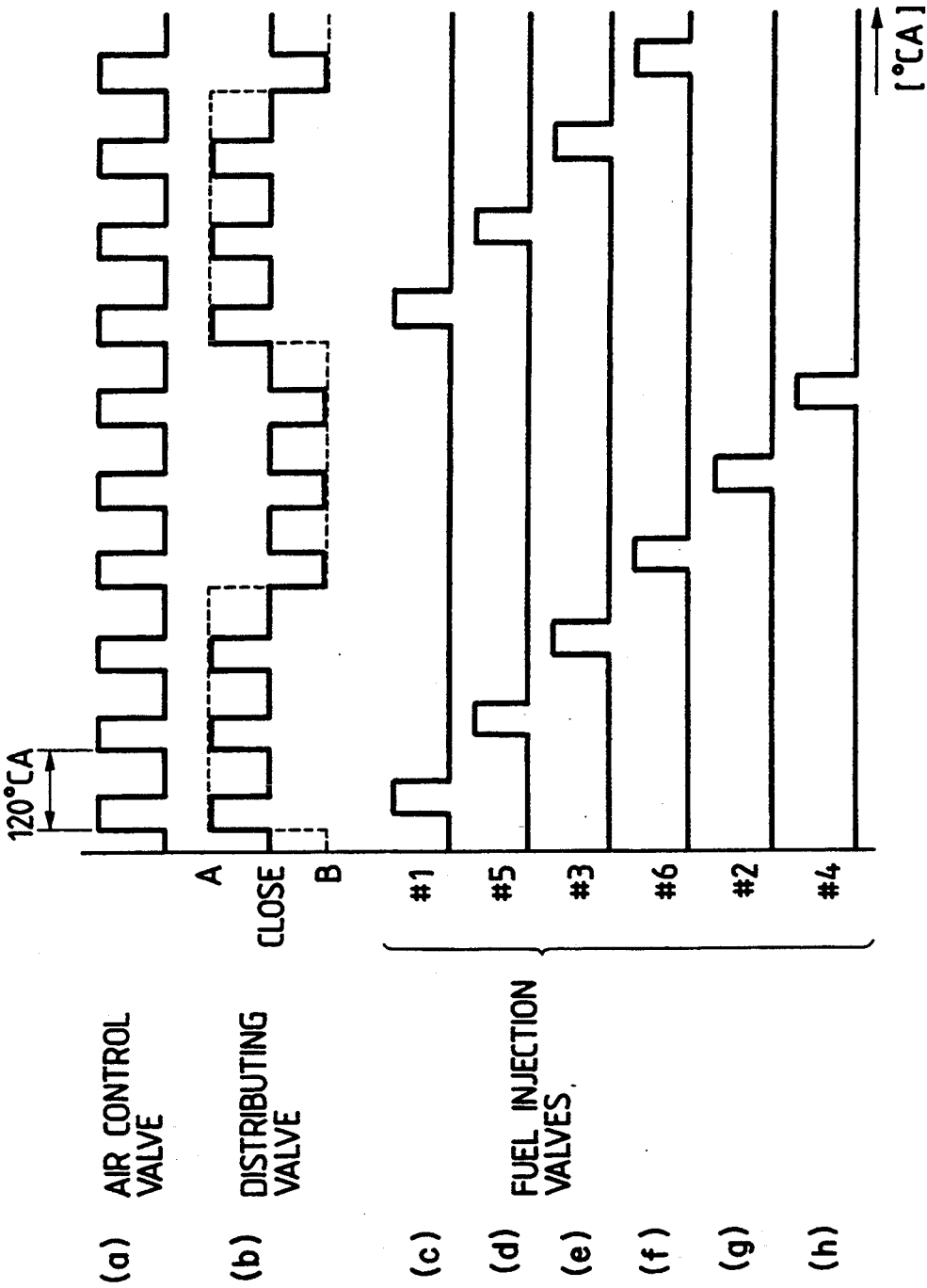

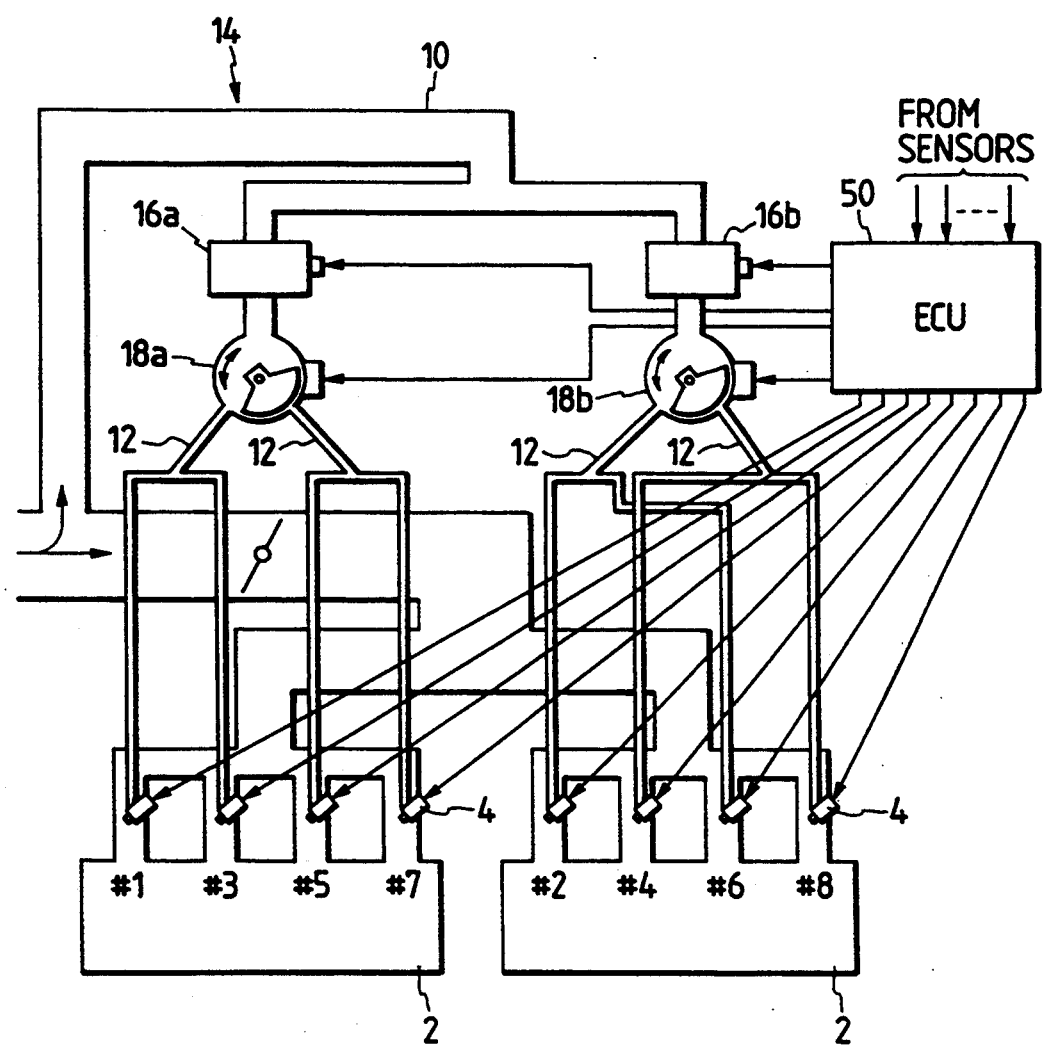

POSITION A

TO #1, #3
(TO #2, #6)

POSITION B

TO #5, #7
(TO #4, #8)

POSITION C

TO #1, #3    TO #5, #7
(TO #2, #6)  (TO #4, #8)

CLOSING POSITION

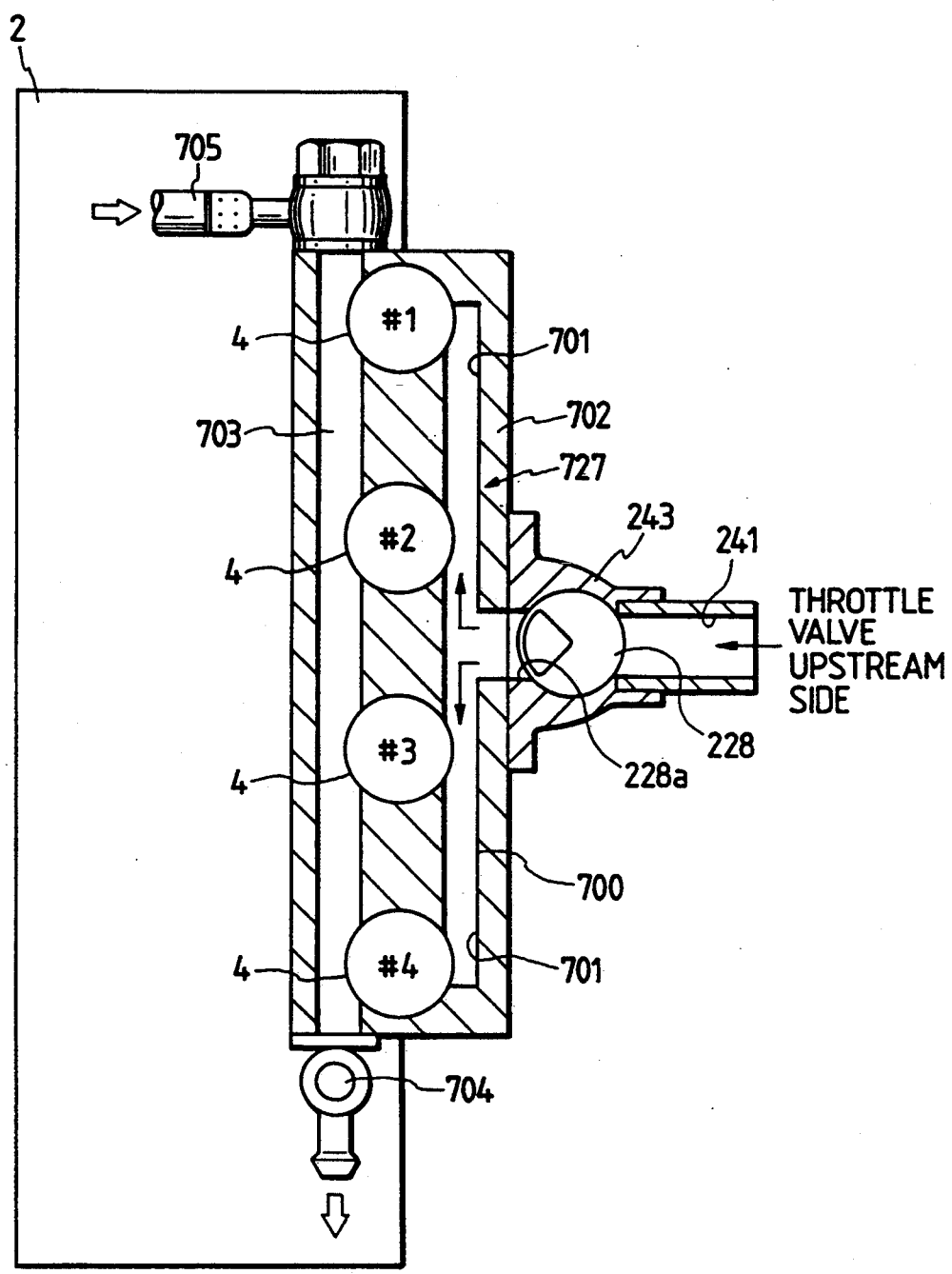

FUEL INJECTION SYSTEM FOR MULTI-CYLINDER INTERNAL COMBUSTION ENGINE

BACKGROUND OF THE INVENTION

1. Field of the Invention

The present invention relates generally to a fuel injection system for a multi-cylinder internal combustion engine having a fuel injection valve for each engine cylinder, and more specifically, in the fuel injection system, wherein air is introduced to the vicinities of injection holes of the fuel injection valves at times substantially synchronous with fuel injections, so as to facilitate atomization of the injected fuel.

2. Description of Related Art

In a fuel injection system which injects fuel into an induction system of an internal combustion engine via a fuel injection valve so as to control an operating condition of the engine, the facilitation of the atomization of the injected fuel has been strongly demanded so as to reduce injurious components involved in exhaust gas which are otherwise increased due to a deterioration of the combustion in the engine.

In order to satisfy this demand, so-called timed air mixture systems have been developed as disclosed, such as, in Japanese Second (examined) Patent Publication No. 57-54624. Specifically, in the induction system of the engine, the upstream side of a throttle valve is connected to the vicinity of an injection hole of a fuel injection valve via an air passage with an air control valve disposed therein. By opening the air control valve substantially in synchronism with fuel injection, air is supplied in the vicinity of the injection hole of the fuel injection valve at a time of the fuel injection so as to facilitate an atomization of the injected fuel.

Recently, in multi-cylinder internal combustion engines, the fuel injection systems of an individual-injection type have become predominant in consideration of the tightening of the emission gas regulation. In the individual-injection system, a fuel injection valve is provided for each engine cylinder, and a fuel injection is independently performed per engine cylinder. Accordingly, if the conventional timed air mixture system is applied to the individual-injection system as it is, the applied system includes the fuel injection valve and the air control valve for each engine cylinder.

When the air control valve is provided for each engine cylinder, since the air control valve can be opened synchronously with a valve opening of the fuel injection valve per engine cylinder, the air can be supplied only to the engine cylinder for which the fuel injection is being performed, so as to prevent the air from being wastefully fed to the other engine cylinders. Further, a time period corresponding to one cycle of the engine (720° CA for a four-cycle engine) can be fully used for one opening-closing operation of the air control valve so that, even when an opening-closing response characteristic of the air control valve is poor, i.e. not so fast, an air supply timing and a corresponding air amount for each engine cylinder cam be controlled to a sufficient level.

On the other hand, when the air control valve is provided for each engine cylinder, the number of the air control valves and corresponding drive circuits have to be increased according to the increased number of engine cylinders, and further, each air passage has to be significantly strong enough for mounting the air control valve therein.

Accordingly, when the conventional timed air mixture system is applied to the individual-injection system as it is as described above, the applied system becomes complicated with an increased weight so that the applicability of the system onto a vehicle is deteriorated.

On the other hand, in order to solve the above-noted problem, it may be arranged that a single air control valve is provided at a common air inlet side of the air passage, i.e. upstream of a branch point of the air passage so that the air is fed to all the engine cylinders at one time by opening the air control valve. With this structure, since the single air control valve is required irrespective of the number of engine cylinders, the applicability of the system onto the vehicle is not deteriorated.

However, since the air is fed to all the engine cylinders by opening the air control valve, the air is wastefully supplied to those engine cylinders for which the fuel injection is not performed. As a result, it may happen that, for example, an engine speed can not be sufficiently suppressed during the engine idling, or the engine brake becomes ineffective during deceleration of the engine to deteriorate the deceleration feeling.

On the other hand, apart from the foregoing problems, it has been confirmed by the present inventors that satisfying the following conditions can facilitate the atomization of the injected fuel:

(1) unifying supply timing and supply amounts of the air distributed to the fuel injection valves for the engine cylinders to equalize combustion states among the engine cylinders;

(2) suppressing a pressure loss of the air in the air passage to ensure a high supply pressure of the air; and (3) lowering a supply pressure of the air rapidly after the fuel injection to prevent wasteful consumption of the air.

However, in the conventional fuel injection systems, consideration has not been paid to satisfying the foregoing conditions.

SUMMARY OF THE INVENTION

Therefore, it is an object of the present invention to provide a fuel injection system for a multi-cylinder internal combustion engine that can eliminate one or more of the above-noted defects inherent in the conventional fuel injection systems.

It is another object of the present invention to provide a fuel injection system for a multi-cylinder internal combustion engine that can suppress wasteful air supply while ensuring high applicability of the system to a vehicle.

It is a further object of the present invention to provide a fuel injection system for a multi-cylinder internal combustion engine that can improve atomization of injected fuel.

To accomplish the above-mentioned and other objects, according to one aspect of the present invention, a fuel injection system for an internal combustion engine comprises engine cylinders divided into a plurality of cylinder groups; fuel injection valves each provided for one of the engine cylinders; an air passage having an introducing section for introducing air higher in pressure than that in an area near an injection hole of each fuel injection valve, and a plurality of air discharging sections each for conducting the air introduced via the introducing section to one of the areas; valve means, provided in the air passage, for opening and closing the air introducing section relative to the air discharging sections and for distributing the introduced air, when opening the air introducing section, to the air discharging sections selectively per cylinder group; and control means for controlling the valve means synchronously with a fuel injection of each fuel injection valve so as to open the air introducing section and for controlling the valve means to a valve position which can supply the introduced air to the air discharging sections for one of the cylinder groups which includes the engine cylinder being injected with the fuel by the corresponding fuel injection valve.

According to another aspect of the present invention, a fuel injection system for an internal combustion engine comprises engine cylinders divided into a plurality of cylinder groups; fuel injection valves each provided for one of the engine cylinders; an air passage having an introducing section for introducing air higher in pressure than that in an area near an injection hole of each fuel injection valve, and a plurality of air discharging sections each for conducting the air introduced via the introducing section to one of the areas; valve means, provided in the air passage, for opening and closing the air introducing section relative to the air discharging sections, the valve means having first valve positions for distributing the introduced air to the air discharging sections selectively per cylinder group when the air introducing section is opened; and control means for controlling the valve means synchronously with a fuel injection of each fuel injection valve so as to open the air introducing section and for controlling the valve means to one of the first valve positions so as to supply the introduced air to the air discharging sections for one of the cylinder groups which includes the engine cylinder being injected with the fuel by the corresponding fuel injection valve.

According to still another aspect of the present invention, a fuel injection system for an internal combustion engine comprises engine cylinders; fuel injection valves each provided for one of the engine cylinders; an air passage for supplying a portion of intake air, bypassing a throttle valve, to areas near injection holes of the respective fuel injection valves, the air passage having a branch portion, an air introducing section upstream of the branch portion for introducing the portion of the intake air, and a plurality of air discharging sections downstream of the branch portion for distributing the introduced air to the areas; and an opening/closing valve provided upstream of the branch portion for opening and closing the air passage synchronously with a fuel injection of each fuel injection valve, wherein capacities of the air passage from the branch portion to the respective fuel injection valves are set substantially equal to each other.

According to still another aspect of the present invention, a fuel injection system for an internal combustion engine comprises engine cylinders; fuel injection valves each provided for one of the engine cylinders; an air passage for supplying a portion of intake air, bypassing a throttle valve, to areas near injection holes of the respective fuel injection valves, the air passage having a branch portion, an air introducing section upstream of the branch portion for introducing the portion of the intake air, and a plurality of air discharging sections downstream of the branch portion for distributing the introduced air to the areas; and an opening/closing valve provided upstream of the branch portion for opening and closing the air passage synchronously with a fuel injection of each fuel injection valve, wherein a cross-sectional area of the air passage upstream of the branch portion is set substantially equal to a sum of cross-sectional area of the air passage downstream of the branch portion.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings:

FIG. 3($b$) is a sectional view taken along a line IIIb—IIIb in FIG. 3($a$);

FIG. 3($c$) is a bottom view showing a positional relationship between two air discharging holes of the distributing valve;

FIG. 5 is a flowchart showing a control routine to be executed by an ECU for controlling the operations of fuel injection valves, an air control valve and a distributing valve, according to the first preferred embodiment;

FIG. 6 graphs (a) to (e) are a time chart for explaining a response characteristic of the air control valve and its opening and closing timings;

FIG. 7 graphs (a) to (f) are explanatory diagrams for explaining a relationship of the operations among the fuel injection valves, the air control valve and the distributing valve realized by executing the control routine of FIG. 5;

FIG. 9 graphs (a) to (h) are explanatory diagrams for explaining a relationship of the operations among the fuel injection valves, the air control valve and the distributing valve realized in the fuel injection system of FIG. 8;

FIG. 10 is a schematic diagram showing the entire structure of a fuel injection system for an eight-cylinder internal combustion engine according to a third preferred embodiment of the present invention;

FIG. 37 is a plan sectional view schematically showing the structure of an air passage with the single air control valve disposed therein and with a fuel delivery device unified with a distributing body, according to a twelfth preferred embodiment of the present invention.

DESCRIPTION OF THE PREFERRED EMBODIMENT

Now, preferred embodiments of the present invention will be described hereinbelow with reference to the accompanying drawings.

Figure 1:
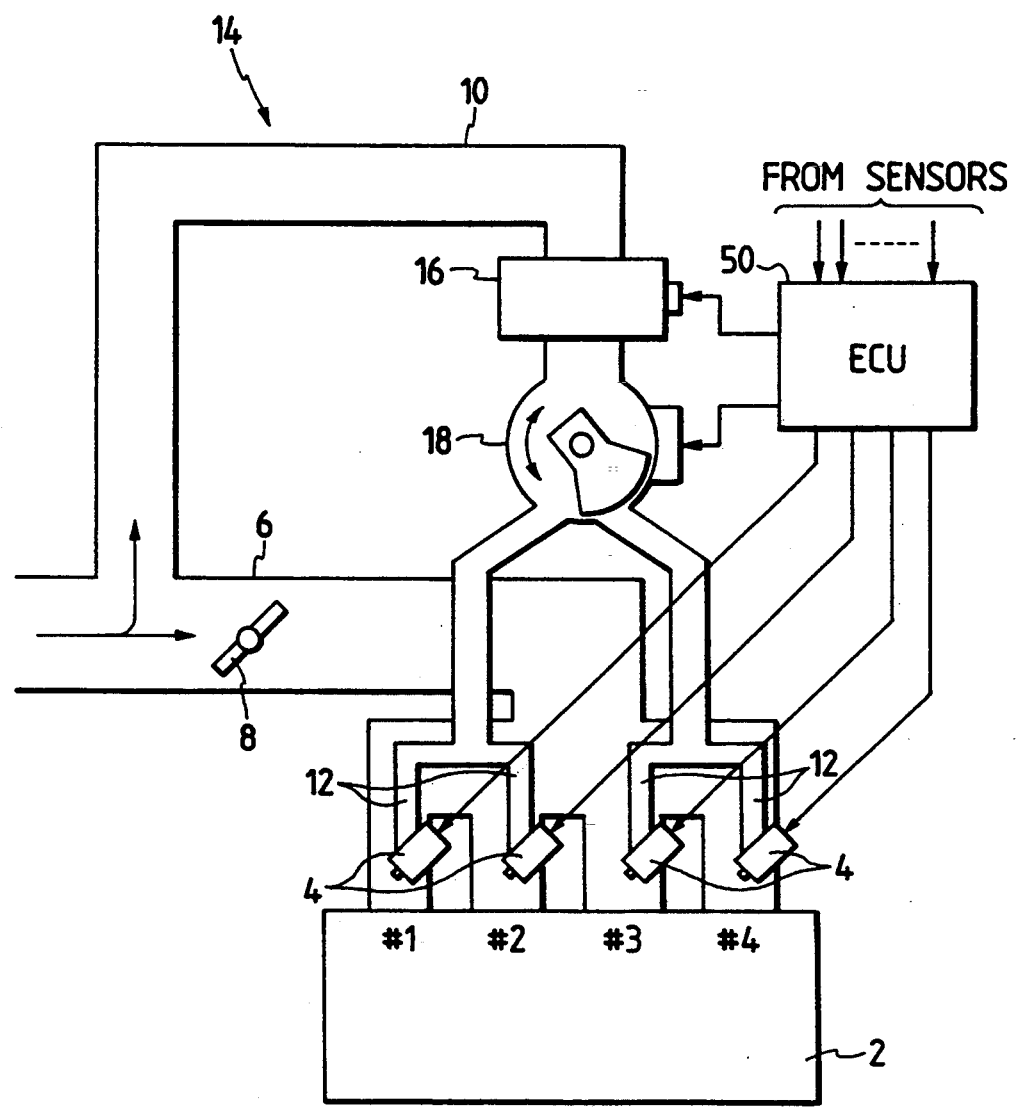
FIG. 1 is a schematic diagram showing the entire structure of a fuel injection system for a four-cylinder internal combustion engine according to a first preferred embodiment of the present invention.

FIG. 1 is a schematic diagram showing the entire structure of a fuel injection system for a multi-cylinder internal combustion engine according to a first preferred embodiment of the present invention. Specifically, in FIG. 1, fuel injection valves 4 are respectively provided for engine cylinders #1 to #4 of a four-cylinder internal combustion engine 2 and arranged to be driven independently of each other. An air passage 14 includes an air introducing section 10 for conducting air from an upstream side of a throttle valve 8 in an intake passage 6 of the engine 2 and air discharging sections 12 for respectively conducting the air introduced through the air introducing section 10 in the vicinities of injection holes of the fuel injection valves 4 for the engine cylinders #1 to #4.

An air control valve 16 is prodded in the air introducing section 10 of the air passage 14. The air control valve 16 is of a known type which is controlled by an electromagnetic valve in an on-off manner so as to open or close the air introducing section 10. A distributing valve 18 is further provided in the air passage 14 downstream of the air control valve 16 for distributing the air conducted via the air introducing section 10 to two cylinder groups, one including the cylinders #1 and #2 and the other including the cylinders #3 and #4. The reason why the air control valve 16 which is on-off controlled by the electromagnetic valve is used, is that such an air control valve 16 has a higher response characteristic than the distributing valve 18 which is open-close controlled by a rotary valve.

Figure 2:
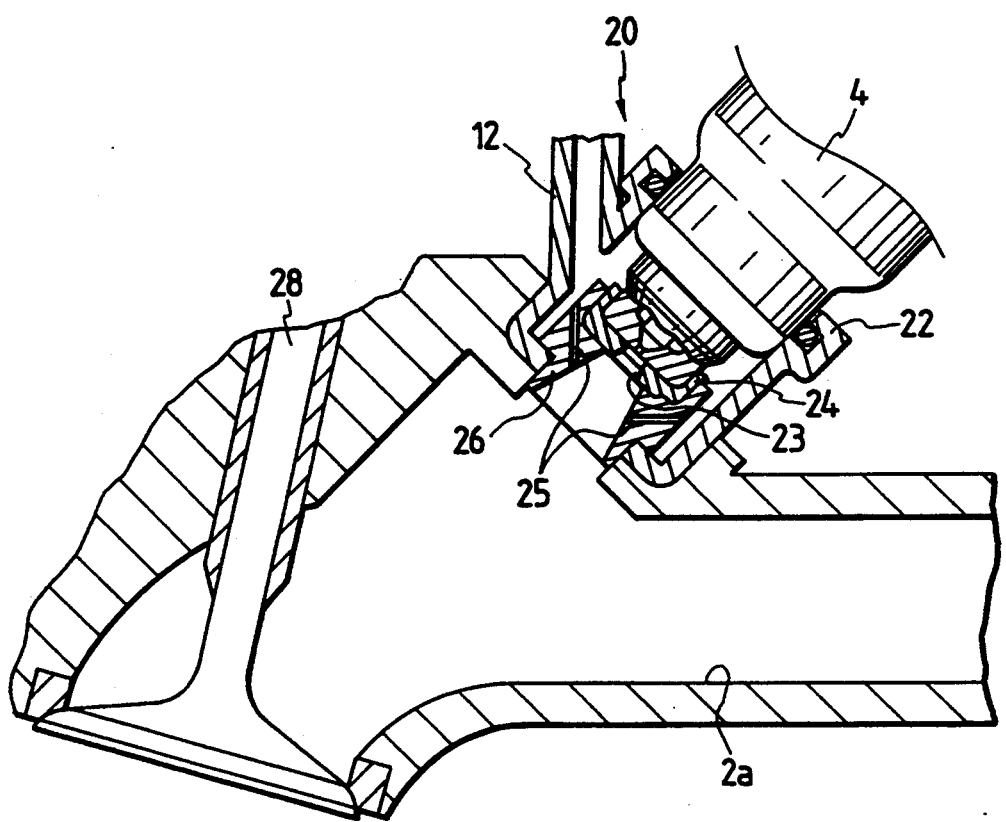
FIG. 2 is a sectional view showing the structure of an air mixture socket provided around an injection hole of each fuel injection valve.

FIG. 2 is a sectional view showing a structure of an air mixture socket 20 fixedly provided around the injection hole of the fuel injection valve 4 at an intake port 2a of each of the engine cylinders #1 to #4. As shown in FIG. 2, the air mixture socket 20 is provided at a downstream end (at a side of the fuel injection valve 4) of each air discharging section 12 for efficiently mixing the fuel injected via the fuel injection valve 4 and the air introduced via the air control valve 16 and the distributing valve 18 (hereinafter also referred to as "mixing air"). The air mixture socket 20 is composed of a holding section 22 for holding a tip portion of the fuel injection valve 4 in a hermetic condition, a fuel injecting section 24 having therein a through hole 23 for introducing the injected fuel via the fuel injection valve 4 into the intake port 2a, and an air injecting section 26 having therein a plurality of through holes 25 for conducting the mixing air having passed through the air passage 14 to an area downstream of the fuel injecting section 24. A sum of cross-sectional areas of the holes 25 of the air injecting section 26 of the air mixture socket 20 is set to about one-third (⅓) to one-fourth (¼) a cross-sectional passage area of the air discharging section 12.

During the engine running condition, the inside of the intake port 2a is maintained at a vacuum pressure, while the inside of the intake passage 6 upstream of the throttle valve 8 is maintained at a pressure close to the atmospheric pressure. As a result, due to a pressure differential therebetween, when the air control valve 16 and the distributing valve 18 are opened during the engine running condition, a portion of the air flowing into the intake passage 6 flows into the inside of the air mixture socket 20 via the air passage 14 to be injected through the holes 25 formed in the air injecting section 26 of the air mixture socket 20 so that the injected air hits and atomizes the injected fuel from the fuel injection valve 4.

As described above, since the total cross-sectional area of the holes 25 of the air injecting section 26 is set to about one-third to one-fourth the cross-sectional passage area of the air discharging section 12, each hole 25 works as a throttling against the mixing air to increase a flow velocity of the mixing air so that the atomization of the injected fuel is facilitated due to the large kinetic energy of the mixing air flow. The atomized fuel then flows into the intake port 2a as a jet flow.

In FIG. 2, numeral 28 denotes an intake valve for one of the engine cylinders #1 to #4.

Figure 3A:
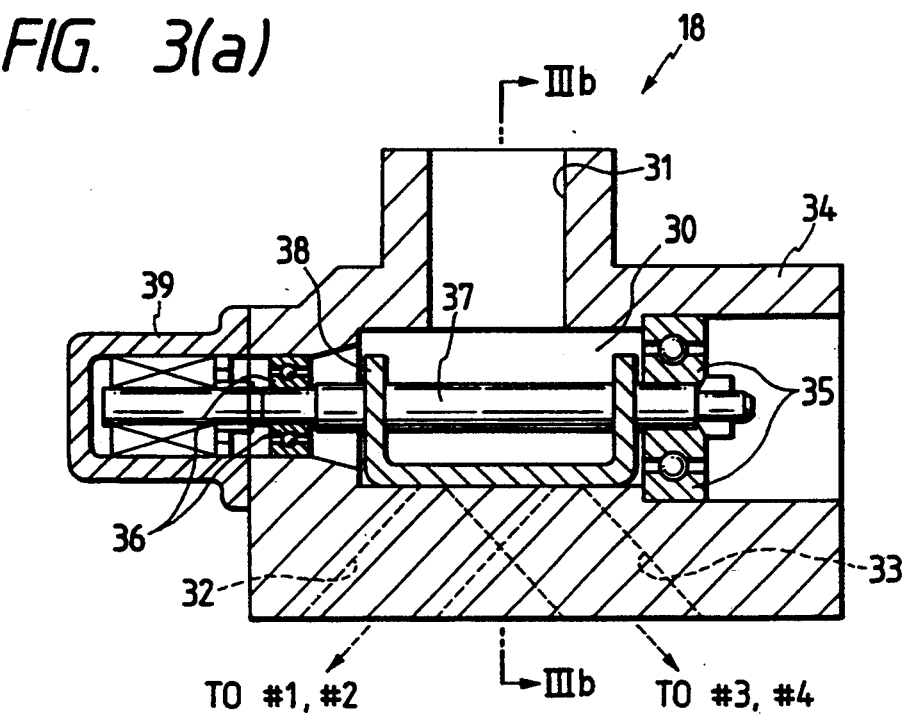
FIGS. 3($a$) is a sectional view schematically showing the entire structure of a distributing valve.
Figure 3B:
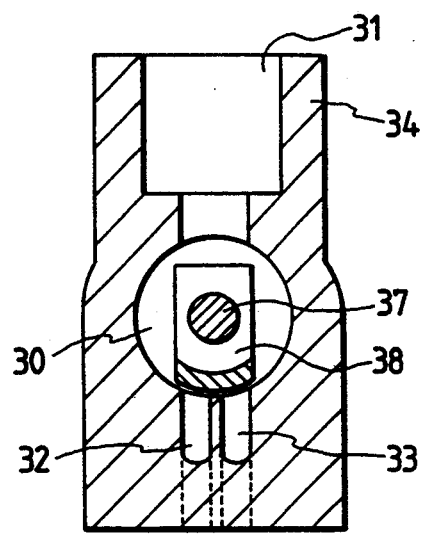
Figure 3C:
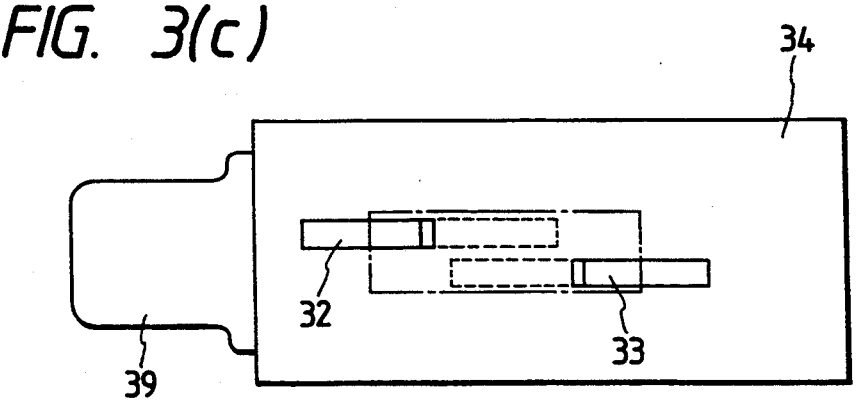

As shown in FIGS. 3(a), 3(b) and 3(c), the distributing valve 18 has a housing 34. The housing 34 is formed therein with a hollow portion 30 of a substantially cylindrical shape, an air introducing hole 31 for introducing the air having passed through the air control valve 16 into the hollow portion 30, an air discharging hole 32 for conducting the air introduced into the hollow portion 30 to the air discharging sections 12 for the engine cylinders #1 and #2, and an air discharging hole 33 for conducting the air introduced into the hollow portion 30 to the air discharging sections 12 for the engine cylinders #3 and #4. The distributing valve 18 further includes a rotation shaft 37 passing through the hollow portion 30 in an axial direction and rotatably supported by bearings 35 and 36 at its axially opposite ends, a valve member 38 of a rotary type fixedly mounted on the rotation shaft 37 for opening or closing one or both of the air discharging holes 32 and 33 in response to the rotation of the rotation shaft 37, and an actuator 39 connected to one end of the rotation shaft 37 for rotationally actuating the rotation shaft 37 so as to switch a valve position of the valve member 38 electromagnetically.

Figure 4A:
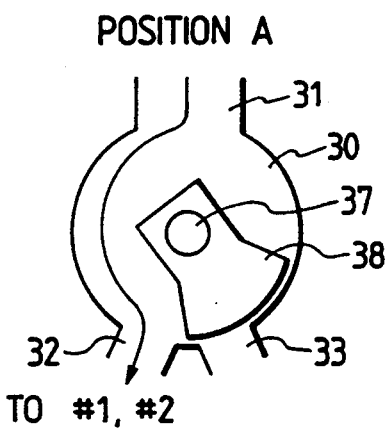
FIGS. 4($a$), 4($b$), 4($c$) and 4($d$) are explanatory diagrams, respectively, for explaining the valve position switching operation of the distributing valve.
Figure 4B:
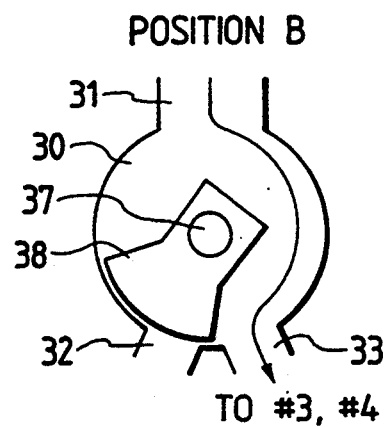
Figure 4C:
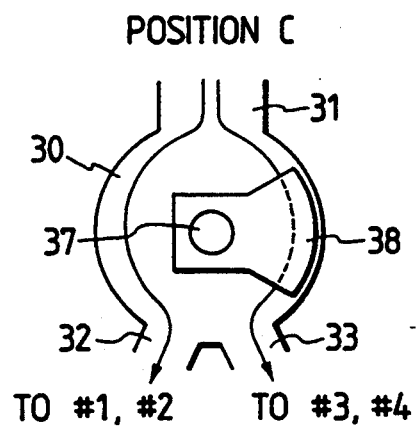
Figure 4D:
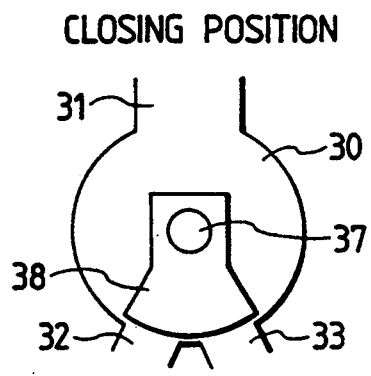

Specifically, by switching an exciting current to the actuator 39, the distributing valve 18 is arranged to control a position of the valve member 38 to a position A, as shown in FIG. 4(a), for opening only the air discharging hole 32 to supply the mixing air to the engine cylinders #1 and #2, to a position B, as shown in FIG. 4(b), for opening only the air discharging hole 33 to supply the mixing air to the engine cylinders #3 and #4, to a position C, as shown in FIG. 4(c), for opening both the air discharging holes 32 and 33 to supply the mixing air to all the engine cylinders #1 to #4 simultaneously, and to a closing position, as shown in FIG. 4(d), for closing both the air discharging holes 32 and 33 to inhibit the mixing air from flowing toward any of the engine cylinders #1 to #4.

Referring back to FIGS. 3(a), 3(b) and 3(c), FIG. 3(a) is a sectional view schematically showing an entire structure of the distributing valve 18, FIG. 3(b) is a sectional view taken along a line IIIb—IIIb in FIG. 3(a), and FIG. 3(c) is a bottom view showing a positional relationship between the air discharging holes 32 and 33 of the distributing valve 18. It is to be appreciated that dotted lines in FIGS. 3(a) and 3(b) merely represent a position of the air discharging hole 33 relative to the air discharging hole 32, and thus are not so-called hidden lines for indicating that the air discharging hole 33 is located behind a sheet of the figures. Further, a shape of the valve member 38 and positions of the air discharging holes 32 and 33 as illustrated in FIGS. 4(a) to 4(d) differ from those illustrated in FIGS. 3(a) to 3(c), which, however, is for purposes of better understanding of the operation of the distributing valve 18.

The operations of the air control valve 16 and the distributing valve 18 as structured above are controlled by an electronic control unit (hereinafter also referred to as "ECU") 50 composed of a microcomputer having, such as, a CPU, a ROM and a RAM.

The ECU 50 derives a valve opening duration or time (that is, a fuel injection mount) of the fuel injection valve 4 based on detection signals from various sensors, such as, an engine speed sensor for monitoring an engine speed, an airflow meter for monitoring an intake air quantity and an engine coolant temperature sensor for monitoring an engine coolant temperature so as to control the operation of the fuel injection valve 4 in a known manner. In this preferred embodiment, the ECU 50 further controls the operations of the air control valve 16 and the distributing valve 18.

FIG. 5 shows a flowchart of a control routine to be executed by the ECU 50 for controlling the operations of the fuel injection valves 4, the air control valve 16 and the distributing valve 18.

This control routine is executed per 180° CA of the engine 2. When the routine is started, a first step 110 derives an energization time of the fuel injection valve 4 (hereinafter also referred to as "injection valve opening time") TAU (TAUA+TAUV) which represents a total fuel injection mount. Specifically, as is well known, the ECU 50 derives a fuel injection time TAUA of the fuel injection valve 4 depending on an operating condition of the engine 2, using the monitored engine speed, intake air quantity, engine coolant temperature and the like. The ECU 50 further derives a dead injection time TAUV which is preset in terms of a battery voltage so as to derive the injection valve opening time TAU by adding TAUV to TAUA. Accordingly, the injection valve opening time TAU represents the energization time of the fuel injection valve 4 for allowing the fuel injection valve 4 to inject a fuel amount which corresponds to the fuel injection time TAUA.

The routine then proceeds to a step 120 which derives an energization time of the air control valve 16 (hereinafter also referred to as "control valve opening time") TACV which is required for feeding the mixing air to the vicinity of the injection hole of the fuel injection valve 4 during an actual fuel injection time of the fuel injection valve 4, that is, within a time period TO indicated in FIG. 6.

Specifically, as shown in FIG. 6 graphs (a) to (e) there exists a response delay after rising (a high level) of a control signal for the air control valve 16 for opening it until the air control valve 16 is actually opened, and there exists a further response delay until the mixing air is actually injected into the intake port 2a of the engine 2. Similarly, there exists a response delay after falling (a low level) of the control signal for the air control valve 16 for closing it until the air control valve 16 is actually closed, and there exists a further response delay until the injection of the mixing air is actually finished. Accordingly, at the step 120, the control valve opening time TACV is derived by adding a given rise point correction time T1 to the injection valve opening time TAU and by subtracting a given fall point correction time T2 from the injection valve opening time TAU. The rise point correction time T1 represents how long a valve opening timing of the air control valve 16 should be advanced relative to a valve opening timing of the fuel injection valve 4. On the other hand, the fall point correction time T2 represents how long a valve closing timing of the air control valve 16 should be retarded relative to a valve closing timing of the fuel injection valve 4.

The routine now proceeds to a step 130 which determines whether a preset valve opening timing (for example, per 5° CA BTDC for each engine cylinder) of the fuel injection valve 4 has been reached for the engine cylinder which is currently under an exhaust 5 stroke so as to be supplied with the fuel this time (hereinafter also referred to as "injection cylinder"). When the step 130 determines that the valve opening timing of the fuel injection valve 4 for the injection cylinder has been reached, a step 140 provides a high level in the control signal for opening the fuel injection valve 4 for the injection cylinder. The routine then proceeds to a step 150. On the other hand, when the step 130 determines that the valve opening timing of the fuel injection valve 4 has not been reached, the routine proceeds to the step 150 bypassing the step 140.

The step 150 determines whether a valve closing timing of the fuel injection valve 4 which is now being opened has been reached. The step 150 makes this decision by determining whether a valve opening time of such a being-opened fuel injection valve 4 (if existing) has reached the injection valve opening time TAU derived at the step 110. When the step 150 determines that the valve closing timing of the being-opened fuel injection valve 4 has been reached, a step 160 provides a low level in the control signal for the being-opened fuel injection valve 4 for closing it. The routine then proceeds to a step 170. On the other hand, when the step 150 determines that no such being-opened fuel injection valve 4 exists or that the valve closing timing of the being-opened fuel injection valve 4 has not been reached, the routine proceeds to the step 170 bypassing the step 160.

At the step 170, it is determined whether the control valve opening time TACV derived at the step 120 is greater than a time period which is required for the engine 2 to rotate by 180° CA. When TACV > 180° CA, a step 180 controls the distributing valve 18 to the position C for allowing the mixing air to be supplied to all the engine cylinders #1 to #4. Subsequently, a step 190 provides a high level in the control signal for the air control valve 16 for opening it. The routine then proceeds to a step 330. On the other hand, when TACV ≦ 180° CA at the step 170, the routine proceeds to a step 200 which determines whether the injection cylinder, that is, the engine cylinder which is to be supplied with the fuel this time, is one of the engine cylinders #1 and #2. When the injection cylinder is one of the engine cylinders #1 and #2, a step 210 determines whether a valve opening timing of the air control valve 16 has been reached. As described above, the valve opening timing of the air control valve 16 is advanced relative to the valve opening timing of the fuel injection valve 4 for the injection cylinder by the rise point correction time T1.

When the step 210 determines that the valve opening timing of the air control valve 16 has been reached, then the routine proceeds to a step 220 where the distributing valve 18 is controlled to the position A for allowing the mixing air to be supplied to only the engine cylinders #1 and #2. Subsequently, a step 230 provides a high level in the control signal for the air control valve 16 for opening it. The routine then proceeds to a step 240. On the other hand, when the step 210 determines that the valve opening timing of the air control valve 16 has not been reached, the routine proceeds to the step 240 bypassing the steps 220 and 230.

At the step 240, it is determined whether a valve closing timing of the air control valve 16 has been reached. The step 240 makes this decision by determining whether a valve opening time of the being-opened air control valve 16 has reached the control valve opening time TACV derived at the step 120. When the step 240 determines that the valve closing timing of the air control valve 16 has been reached, a step 250 provides a low level in the control signal for the air control valve 16 for closing it. Thereafter, a step 260 controls the distributing valve 18 to the closing position for blocking both the air discharging holes 32 and 33. The routine then proceeds to the step 330. On the other hand, when the step 240 determines that the valve closing timing of the air control valve 16 has not been reached, the routine proceeds to the step 330 bypassing the steps 250 and 260.

Referring back to the step 200, when it is determined that the injection cylinder is neither the engine cylinder #1 nor the engine cylinder #2, that is, the injection cylinder is one of the engine cylinders #3 and #4, the routine proceeds to a step 270 which determines, as the foregoing step 210, whether the valve opening timing of the air control valve 16 has been reached. When the step 270 determines that the valve opening timing of the air control valve 16 has been reached, a step 280 controls the distributing valve 18 to the position B for allowing the mixing air to be supplied to only the engine cylinders #3 and #4. Subsequently, a step 290 provides a high level in the control signal for the air control valve 16 for opening it. The routine then proceeds to a step 300. On the other hand, when the step 270 determines that the valve opening timing of the air control valve 16 has not been reached, the routine proceeds to the step 300 bypassing the steps 280 and 290.

The step 300 determines, as the foregoing step 240, whether the valve closing taming of the air control valve 16 has been reached. The step 300 makes this decision by determining whether a valve opening time of the being-opened air control valve 16 has reached the control valve opening time TACV derived at the step 120. When the step 300 determines that the valve closing timing of the air control valve 16 has been reached, a step 310 provides a low level in the control signal for the air control valve 16 for closing it. Subsequently, a step 320 controls the distributing valve 18 to the closing position for blocking both the air discharging holes 32 and 33. The routine then proceeds to the step 330. On the other hand, when the step 300 determines that the valve closing timing of the air control valve 16 has not been reached, the routine proceeds to the step 330 by-passing the steps 310 and 320.

At the step 330, it is determined whether all the opening/closing operations of the fuel injection valve 4, the air control valve 16 and the distributing valve 18 to be performed within a time period during which the engine 2 rotates by 180° CA, have been finished. When the step 330 determines that all such operations have been finished, this routine is temporarily terminated. On the other hand, when all such operations have not been finished, the routine returns to the step 130.

As described above, in the first preferred embodiment, the air control valve 16 and the distributing valve 18 are provided in the air passage 14 which is for conducting the mixing air to the vicinity of the injection hole of the fuel injection valve 4. The air control valve 16 works to open or close the air introducing section 10 of the air passage 14, and the distributing valve 18 works to distribute the mixing air to the two cylinder groups of all the engine cylinders #1 to #4, that is, the distributing valve 18 can switch the engine cylinders per cylinder group for supplying the mixing air to one of the cylinder groups including the engine cylinder being supplied with the fuel. As shown in FIG. 7 graphs (a) to (f) the air control valve 16 is opened synchronously with the fuel injection of the fuel injection valve 4, and the distributing valve 18 is switched to a position (the position A or B), in synchronism with the valve opening of the air control valve 16, for allowing the mixing air to be supplied to one of the cylinder groups including the engine cylinder being supplied with the fuel.

Accordingly, since the mixing air is supplied per cylinder group, an amount of the wasteful air sucked into the engine 2 can be suppressed in comparison with a case where the air passage 14 includes only the air control valve 16 and no distributing valve 18. As a result, the first preferred embodiment can provide a proper idling engine speed and a reliable engine brake during the deceleration.

Further, although the fuel injection system of the first preferred embodiment is unable to completely prevent the supply of the wasteful air as the fuel injection system having the air control valve for each engine cylinder so as to selectively supply the mixing air per engine cylinder, since only two electromagnetic valves (the air control valve 16 and the distributing valve 18) are required to be arranged in the air passage 14, the structure of the system can be simplified so that the size-reduction and the weight-reduction of the system can be realized.

Further, in the first preferred embodiment, by switching the distributing valve 18 to the position C, the mixing air can be supplied to all the engine cylinders #1 to #4 simultaneously. The distributing valve 18 is switched to the position C when the valve opening time TACV of the air control valve 16 exceeds the time period which is required for the engine 2 to rotate by 180° CA.

Accordingly, when the control valve opening time TACV is greater than the time period corresponding to the rotation of the engine 2 by 180° CA during the engine 2 being operated under the warming-up condition, the high-speed condition, the high-load condition and the like to continuously open the air control valve 16, that is, it is required to supply the mixing air to, such as, all the engine cylinders simultaneously, the position C of the distributing valve 18 fully satisfies this condition as opposed to the position A or B of the distributing valve 18 where the mixing air can not be supplied to one of the cylinder groups.

It is to be appreciated that, since the magnitude of the control valve opening time TACV depends on a magnitude of the injection valve opening time TAU, the step 170 in FIG. 5 may determine whether the injection valve opening time TAU exceeds the time period which is required for the engine 2 to rotate by 180° CA.

Further, in the first preferred embodiment, when the air control valve 16 is closed, the distributing valve 18 is also controlled to the closing position simultaneously. Accordingly, a supply line of the mixing air is arranged to be double blocked. With this structure, even when the air control valve 16 fails to be open, the distributing valve 18 can control the supply of the mixing air.

Further, since the supply line of the mixing air can be opened or closed solely by the air control valve 16, it may be arranged that the distributing valve 18 is switched between the positions A and B per 360° CA of the engine 2. Specifically, as indicated by a dotted line in FIG. 7, the distributing valve 18 may be controlled to and maintained at the position A for sequential fuel injections to the engine cylinders #2 and #1, while it may be controlled to and maintained at the position B for sequential fuel injections to the engine cylinders #3 and #4.

It is to be appreciated that, although the present invention is applied to the fuel injection system of the individual-injection type for the four-cylinder internal combustion engine in the first preferred embodiment, the present invention may also be applied to another type of a fuel injection system for another type of a multi-cylinder internal combustion engine as long as the fuel injection valve is provided for each engine cylinder, such as, a fuel injection system for a multi-cylinder internal combustion engine having the engine cylinders other than four or a fuel injection system of a group-injection type.

Figure 8:
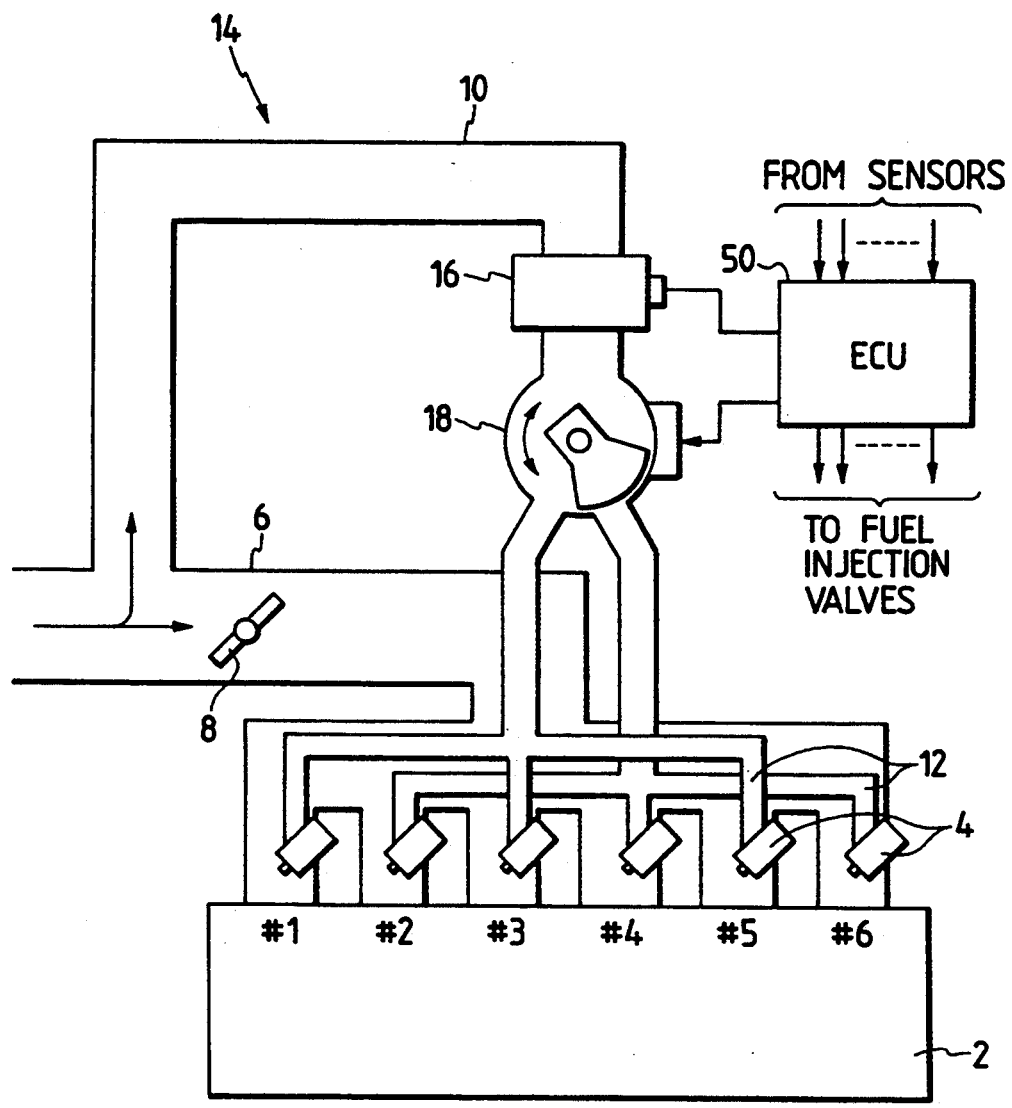
FIG. 8 is a schematic diagram showing the entire structure of a fuel injection system for a six-cylinder internal combustion engine according to a second preferred embodiment of the present invention.

For example, FIG. 8 is a schematic diagram showing an entire structure of a fuel injection system according to a second preferred embodiment, wherein the fuel injection system is of an individual-injection type and applied to a six-cylinder internal combustion engine. In FIG. 8, components which are the same as or similar to those in FIG. 1 are represented by the same reference symbols as those in FIG. 1.

As shown in FIG. 8, the engine 2 includes six cylinders #1 to #6 which are grouped into two cylinder groups, one group including the engine cylinders #1, #3 and #5 and the other group including the engine cylinders #2, #4 and #6. The air discharging hole 32 of the distributing valve 18 is connected to the air discharging sections 12 for one cylinder group including the engine cylinders #1, #3 and #5, and the air discharging hole 33 of the distributing valve 18 is connected to the air discharging sections 12 for the other cylinder group including the engine cylinders #2, #4 and #6. As shown in FIG. 9 graphs (a) to (h) the distributing valve 18 is controlled to the position A or B correspondingly to the injection cylinder, in synchronism with the valve opening timing of the air control valve 16 as indicated by a solid line in FIG. 9 graph (a). This arrangement can provide advantageous effects similar to those in the first preferred embodiment.

In the second preferred embodiment, since the continuous valve opening of the air control valve 16 is required when the control valve opening time TACV exceeds, due to the increasing injection valve opening time TAU, a time period which is required for the engine 2 to rotate by 120° CA, it may be arranged to switch the distributing valve 18 to the position C when the control valve opening time TACV (or the injection valve opening time TAU) exceeds the time period corresponding to the rotation of the engine 2 by 120° CA.

Further, as described above, the engine cylinders #1 to #6 are grouped into the two cylinder groups, one group including the engine cylinders #1, #3 and #5 and the other group including the engine cylinders #2, #4 and #6. This is because, since the order of the fuel injections in the six-cylinder internal combustion engine is #1→#5→#3→#6→#2→#4, the fuel injections are sequentially performed for the engine cylinders of each of the cylinder groups as defined above. By grouping the engine cylinders this way, as indicated by a dotted line in FIG. 9 graph (b), the distributing valve 18 may be switched between the positions A and B per three fuel injections (per 360° CA) so that the operation number of the distributing valve 18 can be reduced, as described before in the first preferred embodiment.

The structure not described above is the same as that of the first preferred embodiment.

FIG. 10 is a schematic diagram showing an entire structure of a fuel injection system according to a third preferred embodiment, wherein the fuel injection system is of an individual-injection type and applied to a V-type eight-cylinder internal combustion engine. In FIG. 10, components which are the same as or similar to those in FIG. 1 are represented by the same reference symbols as those in FIG. 1.

In FIG. 10, air control valves 16a and 16b and distributing valves 18a and 18b are arranged in the air passage 14. The distributing valve 18a works to distribute the mixing air to the engine cylinders #1, #3, #5 and #7 while the distributing valve 18b works to distribute the mixing air to the engine cylinders #2, #4, #6 and #8. The air control valves 16a and 16b are respectively provided upstream of the distributing valves 18a and 18b for controlling the supply of the mixing air to the distributing valves 18a and 18b. The operations of the distributing valves 18a and 18b and the air control valves 16a and 16b are controlled by the ECU 50.

FIGS. 11(a) to 11(d) are explanatory diagrams respectively showing the relation between positions of the distributing valve 18a and corresponding engine cylinders to which the mixing air can be supplied. In these figures, the cylinder numbers in brackets represents those engine cylinders to which the distributing valve 18b can supply the mixing air at the corresponding positions.

Figure 11A:
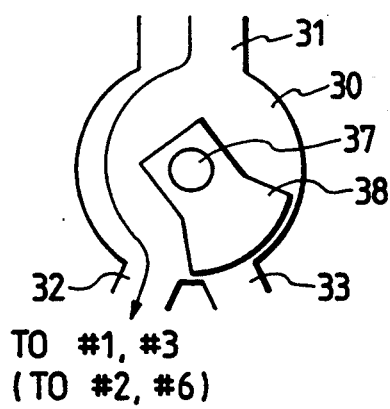
FIGS. 11($a$), 11($b$), 11($c$) and 11($d$) are explanatory diagrams, respectively, for explaining the valve position switching operation of the distributing valve.
Figure 11B:
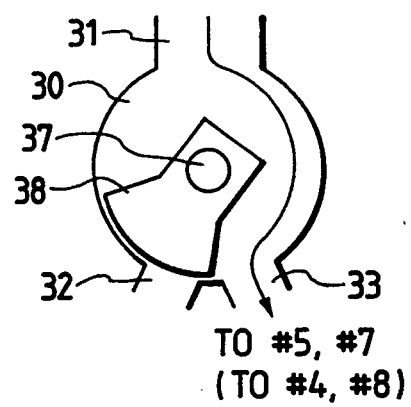
Figure 11C:
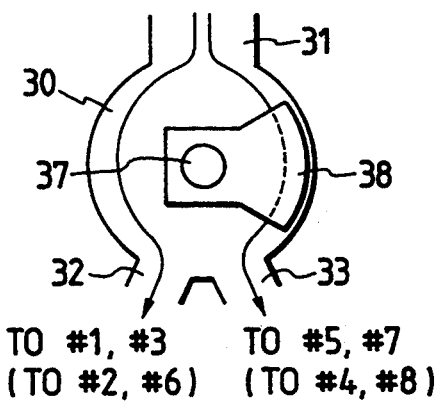
Figure 11D:
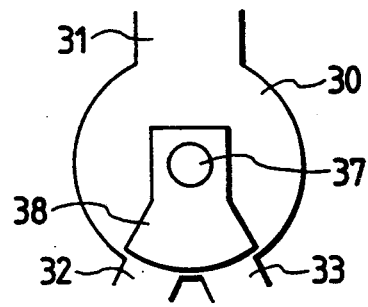

When the distributing valve 18a (18b) is at a position A as shown in FIG. 11(a), the mixing air is supplied to a cylinder group including the engine cylinders #1 and #3 (#2 and #6). When the distributing valve 18a (18b) is at a position B as shown in FIG. 11(b), the mixing air is supplied to a cylinder group including the engine cylinders #5 and #7 (#4 and #8). Further, when the distributing valve 18a (18b) is at a position C as shown in FIG. 11(c), the mixing air is supplied to all the engine cylinders #1, #3, #5 and #7 (#2, #4, #6 and #8). On the other hand, when the distributing valve 18a (18b) is at a closing position as shown in FIG. 11(d), the mixing air is supplied to no engine cylinders.

Figure 12:
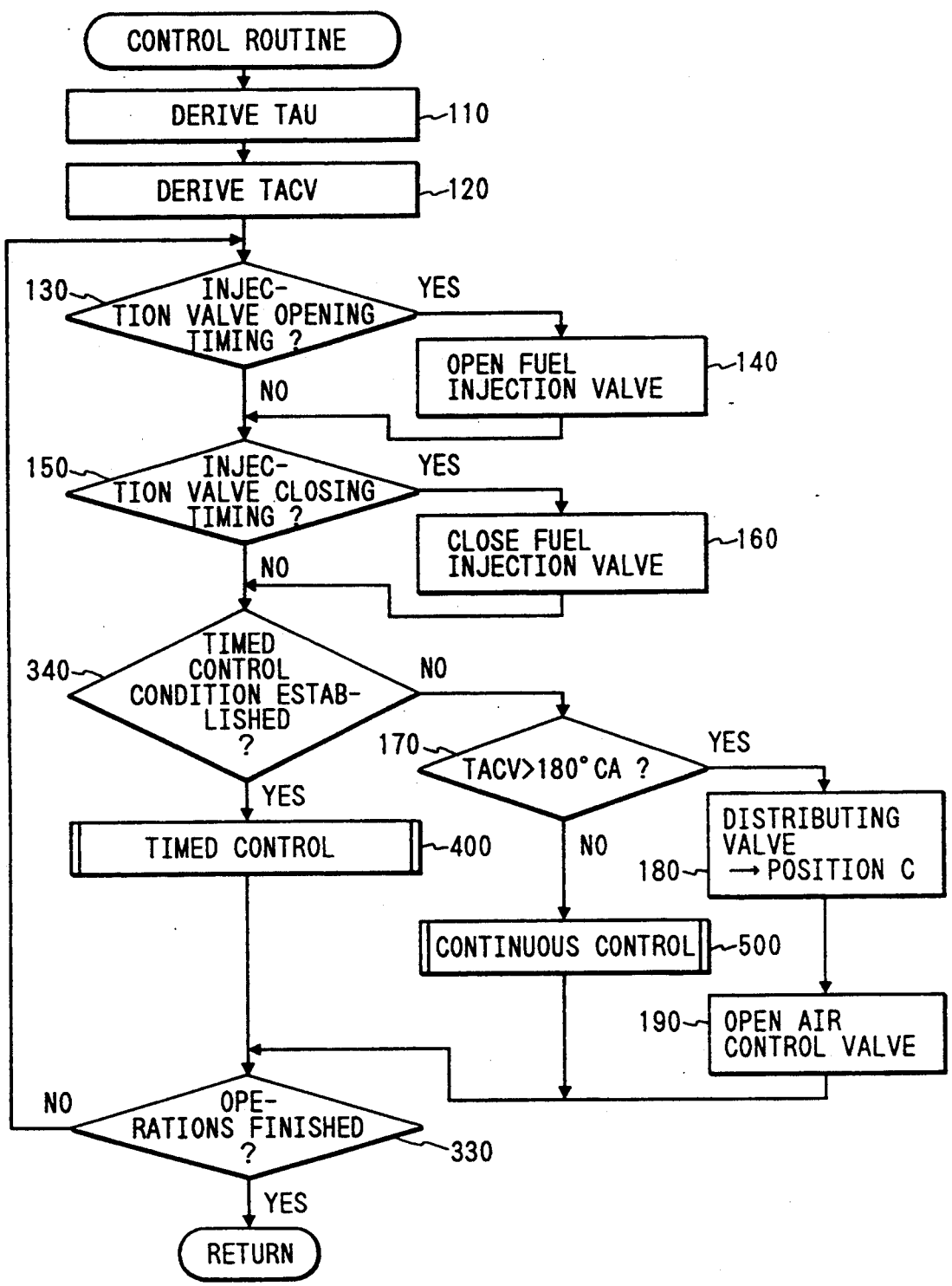
FIGS. 12, 13 and 14 show flowcharts of a control routine to be executed by the ECU for controlling the operations of the fuel injection valves, the air control valve and the distributing valve, according to the third preferred embodiment of the present invention.
Figure 13:
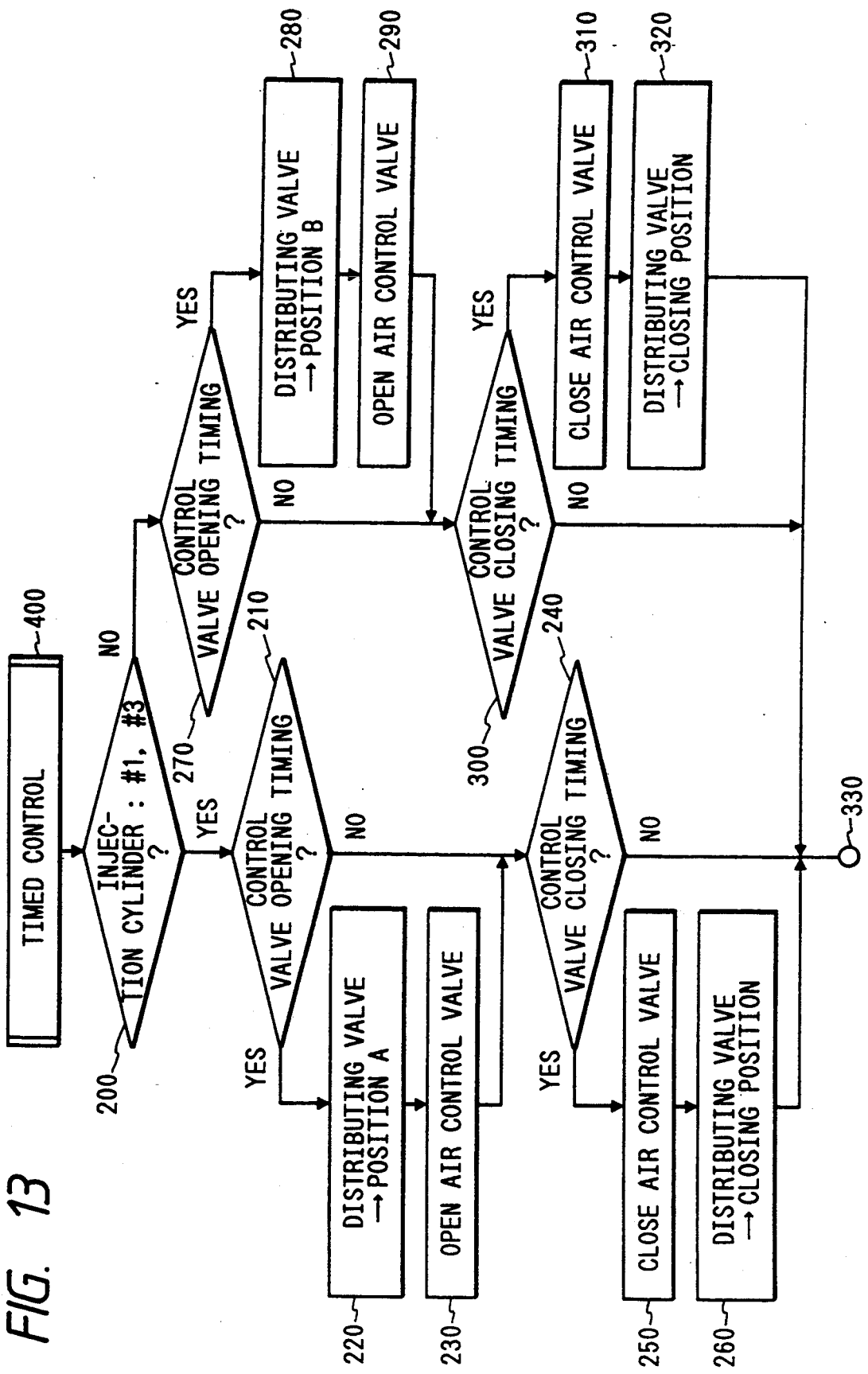
Figure 14:
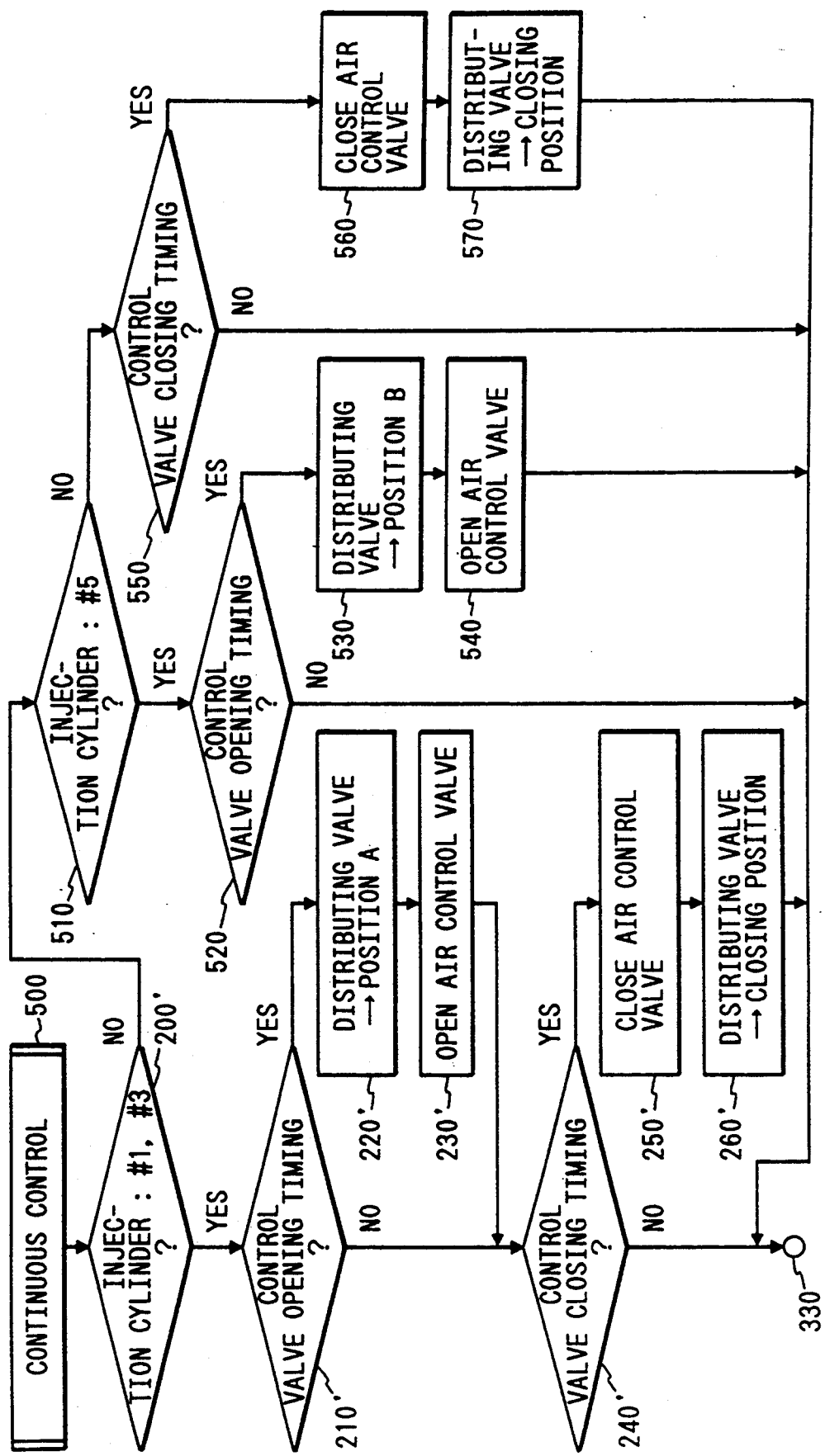

FIGS. 12 to 14 show flowcharts of a control routine to be executed by the ECU 50 for controlling the operations of the fuel injection valves 4, the air control valve 16a and the distributing valve 18a. This control routine is executed as an interruption per 90° CA of the engine 2. Since the operations of the air control valve 16b and the distributing valve 18b are controlled in the same manner as the air control valve 16a and the distributing valve 18a by changing the cylinder numbers from #1, #3, #5 and #7 to #2, #4, #6 and #8 in the flowcharts of FIGS. 12 to 14, explanation thereof will be omitted so as to avoid the redundant disclosure. Further, in the flowcharts of FIGS. 12 to 14, those steps which execute the same processes as those in the flowchart of FIG. 5, including those steps in which only the cylinder numbers are different, are assigned the same step numbers for omitting explanation thereof.

When the routine is started, the first step 110 derives the valve opening time TAU of the fuel injection valve 4. Subsequently, the step 120 derives the valve opening time TACV of the air control valve 16a. As described before in the first preferred embodiment, through the steps 130 to 160, the opening/closing control of the fuel injection valves 4 are executed. The routine then proceeds to a step 340.

At the step 340, it is determined whether a condition for a timed control is satisfied. The timed control in this control routine represents such a control in which the mixing air is independently supplied to each cylinder group in synchronism with a valve opening time of the corresponding fuel injection valve 4. This corresponding fuel injection valve 4 is for one of the engine cylinders included in that cylinder group to which the mixing air is supplied. The condition for the timed control is satisfied, for example, when the engine 2 is idling or when the valve opening time TACV of the air control valve 16a is less than a time period which is required for the engine 2 to rotate by 90° CA. If the step 340 determines that the condition for the timed control is satisfied, the routine proceeds to a step 400 which performs the timed control, and further to the step 330.

As shown in FIG. 13, the processes to be executed at the step 400 for the timed control are the same as those executed through the steps 200 to 320 in FIG. 5 except that the cylinder numbers are changed from #1 and #2 to #1 and #3. Accordingly, explanation thereof will be omitted for avoiding the redundant disclosure.

On the other hand, if the step 340 determines that the condition for the timed control is not satisfied, the routine proceeds to the step 170. At the step 170, it is determined whether the control valve opening time TACV derived at the step 120 is greater than a time period which is required for the engine 2 to rotate by 180° CA. If TACV > 180° CA, the routine proceeds to the step 180 and then to the step 190. Through the steps 180 and 190, the distributing valve 18a is controlled to the position C, and the air control valve 16a is opened so that the mixing air is fed to the cylinders #1, #3, #5 and #7. The routine then proceeds to the step 330.

On the other hand, if TACV < 180° CA at the step 170, the routine proceeds to a step 500 where a continuous control is executed.

FIG. 14 shows the flowchart of the continuous control to be executed at the step 500. In FIG. 14, a first step 200' determines whether the injection cylinder, that is, the engine cylinder which is to be supplied with the fuel this time as described before, is one of the engine cylinders #1 and #3. When the injection cylinder is one of the engine cylinders #1 and #3, the proceeds through steps 210' to 260'. Since the processes to be executed through the steps 210' to 260' are the same as those executed through the steps 210 to 260 in FIG. 13, explanation thereof will be omitted.

On the other hand, when the injection cylinder is not one of the engine cylinders #1 and #3 at the step 200', that is, when the injection cylinder is one of the engine cylinders #5 and #7, the routine proceeds to a step 510 which then determines whether the injection cylinder is the engine cylinder #5. When the injection cylinder is the engine cylinder #5, a step 520 determines whether the valve opening timing of the air control valve 16a has been reached. If the step 520 determines that the valve opening timing of the air control valve 16a has been reached, a step 530 controls the distributing valve 18a to the position B for allowing the mixing air to be supplied only to the engine cylinders #5 and #7. Thereafter, a step 540 provides a high level in the control signal for the air control valve 16a for opening it. On the other hand, when the step 520 determines that the valve opening timing of the air control valve 16a has not been reached, the routine proceeds to the step 330 bypassing the steps 530 and 540.

Referring back to the step 510, when the injection cylinder is not the engine cylinder #5, that is, when the injection cylinder is the engine cylinder #7, the routine proceeds to a step 550 which determines whether the valve closing timing of the air control valve 16a has been reached. The step 550 makes this decision by determining whether a valve opening time of the air control valve 16a has reached the control valve opening time TACV derived at the step 120. If the step 550 determines that the valve closing timing of the air control valve 16a has been reached, a step 560 provides a low level in the control signal for the air control valve 16a for closing it. Subsequently, a step 570 controls the distributing valve 18a to the closing position. The routine then proceeds to the step 330. On the other hand, if the step 550 determines that the valve closing timing of the air control valve 16a has not been reached, the routine proceeds to the step 330 bypassing the steps 560 and 570.

By executing the continuous control as shown in FIG. 14, the timed control is performed for the engine cylinders #1 and #3, and the continuous control is performed for the engine cylinders #5 and #7.

At the step 330, as described with reference to FIG. 5, it is determined whether the operations of the fuel injection valve 4, the air control valve 16a and the distributing valve 18a have been finished. If not finished, the routine returns to the step 130 to repeat the foregoing processes. On the other hand, if finished, this control routine is temporarily terminated.

As appreciated from the foregoing description about the control routine of FIGS. 12 to 14, in the timed control of FIG. 13, the mixing air is supplied per cylinder group in synchronism with the fuel injection of the corresponding fuel injection valve 4 (which fuel injection valve 4 is for one of the engine cylinders included in that cylinder group to which the mixing air is supplied). On the other hand, in the continuous control of FIG. 14, the mixing air is supplied in synchronism with the fuel injection of the corresponding fuel injection valve 4 to such a cylinder group that includes the engine cylinders #1 and #3 (#6 and #2) for which the fuel injections are not sequentially performed as seen from FIGS. 15 and 16, while the mixing air is continuously supplied to such a cylinder group that includes the engine cylinders #5 and #7 (#8 and #4) for which the fuel injections are sequentially performed as also seen from FIGS. 15 and 16, from a time point of the start of the fuel injection for the engine cylinder #5 (#8) which is to be supplied with the fuel first to a time point of the termination of the fuel injection for the engine cylinder #7 (#4) which is to be supplied with the fuel later. Further, when the valve opening time TACV of the air control valve 16a (16b) is greater than the time period required for the engine 2 to rotate by 180° CA, the mixing air can be supplied to all the engine cylinders.

Now, the foregoing processes will be described with reference to time charts of FIGS. 15 and 16.

Figure 15:
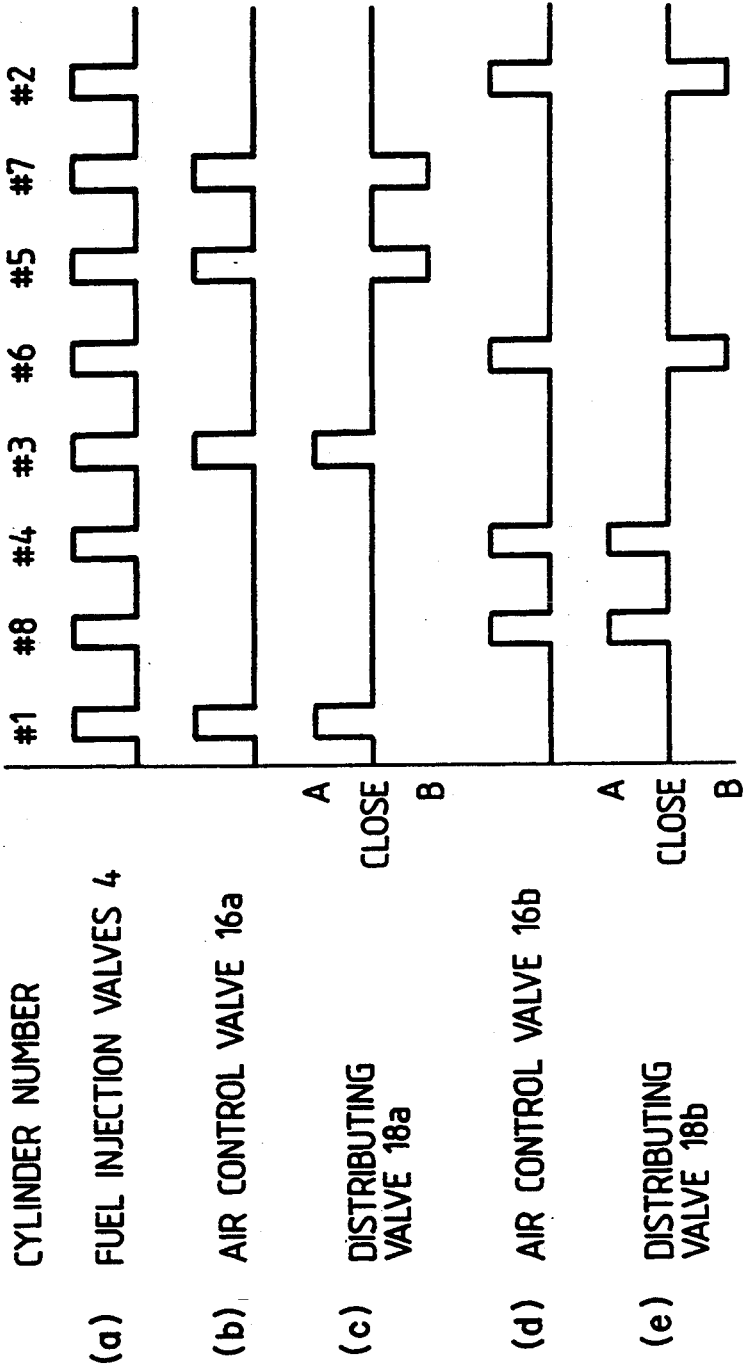
FIG. 15 graphs (a) to (e) are explanatory diagrams for explaining a relationship of the operations among the fuel injection valves, the air control valve and the distributing valve realized by executing the control routine of FIGS. 12, 13 and 14.

FIG. 15 is a time chart in the timed control executed during, for example, the idling operation of the engine 2, showing a relationship among control pulses for the fuel injection valves 4, control pulses for the air control valves 16a and 16b and controlled positions of the distributing valves 18a and 18b. As seen from FIG. 15 graphs (a) to (e), the air control valve 16a (16b) is opened when the fuel invention valve 4 for a particular engine cylinder is injecting the fuel, and the distributing valve 18a (18b) is controlled to a position which allows the mixing air to be supplied to that particular engine cylinder.

Figure 16:
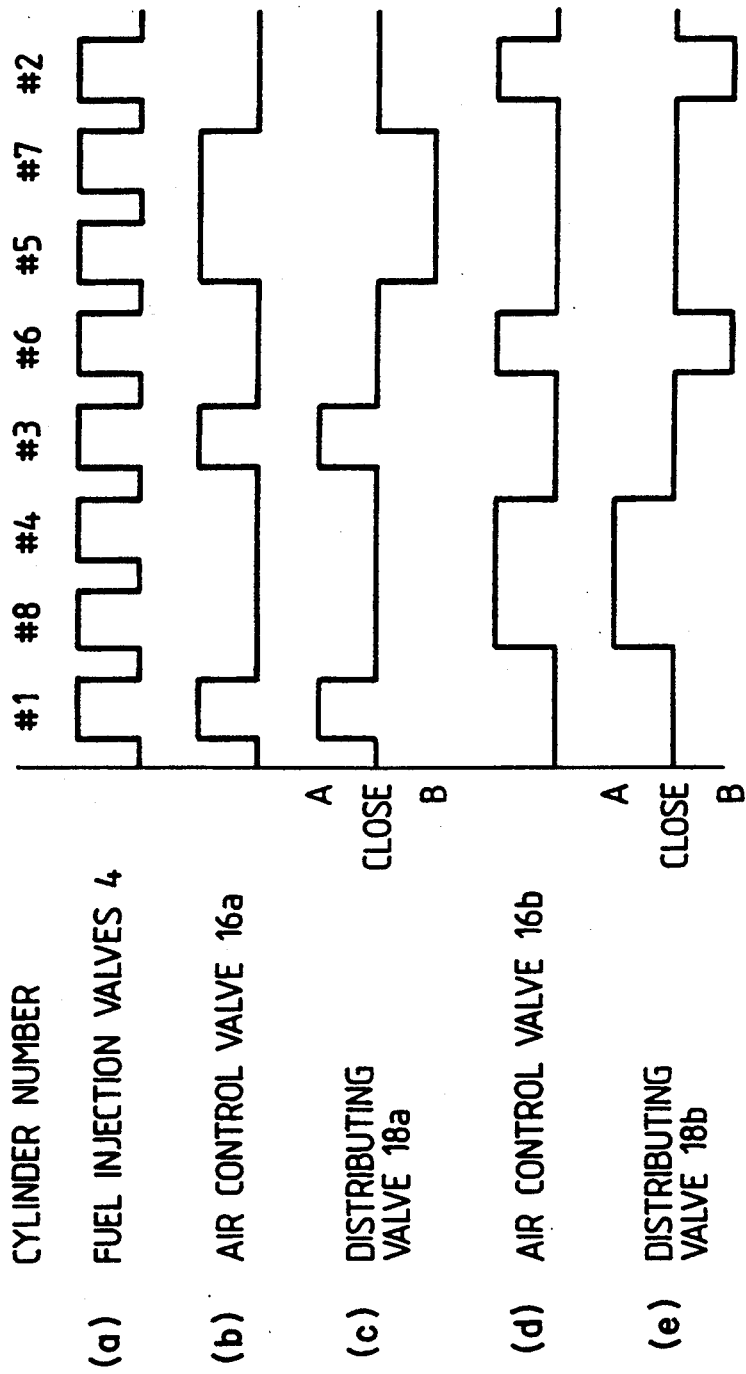
FIG. 16 graphs (a) to (e) are explanatory diagrams for explaining a relationship of the operations among the fuel injection valves, the air control valve and the distributing valve realized by executing the control routine of FIGS. 12, 13 and 14.

On the other hand, FIG. 16 graphs (a) to (e) are a time chart in the continuous control executed when the engine is under the off-idling and the fuel injection time TAU (the control valve opening time TACV) is less than the time period required for the engine 2 to rotate by 180° CA, showing a relationship among control pulses for the fuel injection valves 4, control pulses for the air control valves 16a and 16b and controlled positions of the distributing valves 18a and 18b. As seen from FIG. 16 graphs (a) to (e), the air control valve 16a (16b) and the distributing valve 18a (18b) are controlled such that the mixing air is supplied to the engine cylinders #1 and #3 (#6 and #2) in the same cylinder group, for which the fuel injections are not sequentially performed, in synchronism with the fuel injection for each engine cylinder in that same cylinder group, as also shown in FIG. 15 graphs (a) to (e).

On the other hand, for those cylinders #5 and #7 (#8 and #4) in the same group for which the fuel injections are sequentially performed, the air control valve 16a (16b) and the distributing valve 18a (18b) are controlled to such positions as to allow the mixing air to be supplied to those cylinders when the fuel injection for one of those cylinders #5 (#8) for which the fuel injection is first performed is started, and these controlled positions of the air control valve 16a (16b) and the distributing valve 18a (18b) are maintained until the fuel injection for the other cylinder #7 (#8) is finished. This control arrangement can prevent a supply delay of the mixing air when the fuel injections are likely to overlap between two engine cylinders. Further, since the operation number of the air control valves and the distributing valves can be reduced, the long-term duration of those valves as well as the operation noise reduction can be realized.

The structure not described above is the same as that in the first preferred embodiment.

In the foregoing first to third preferred embodiments, the air control valve 16 (16a, 16b) and the distributing valve 18 (18a, 18b) are separately arranged. However, those valves may be unified to form one valve.

Figure 17:
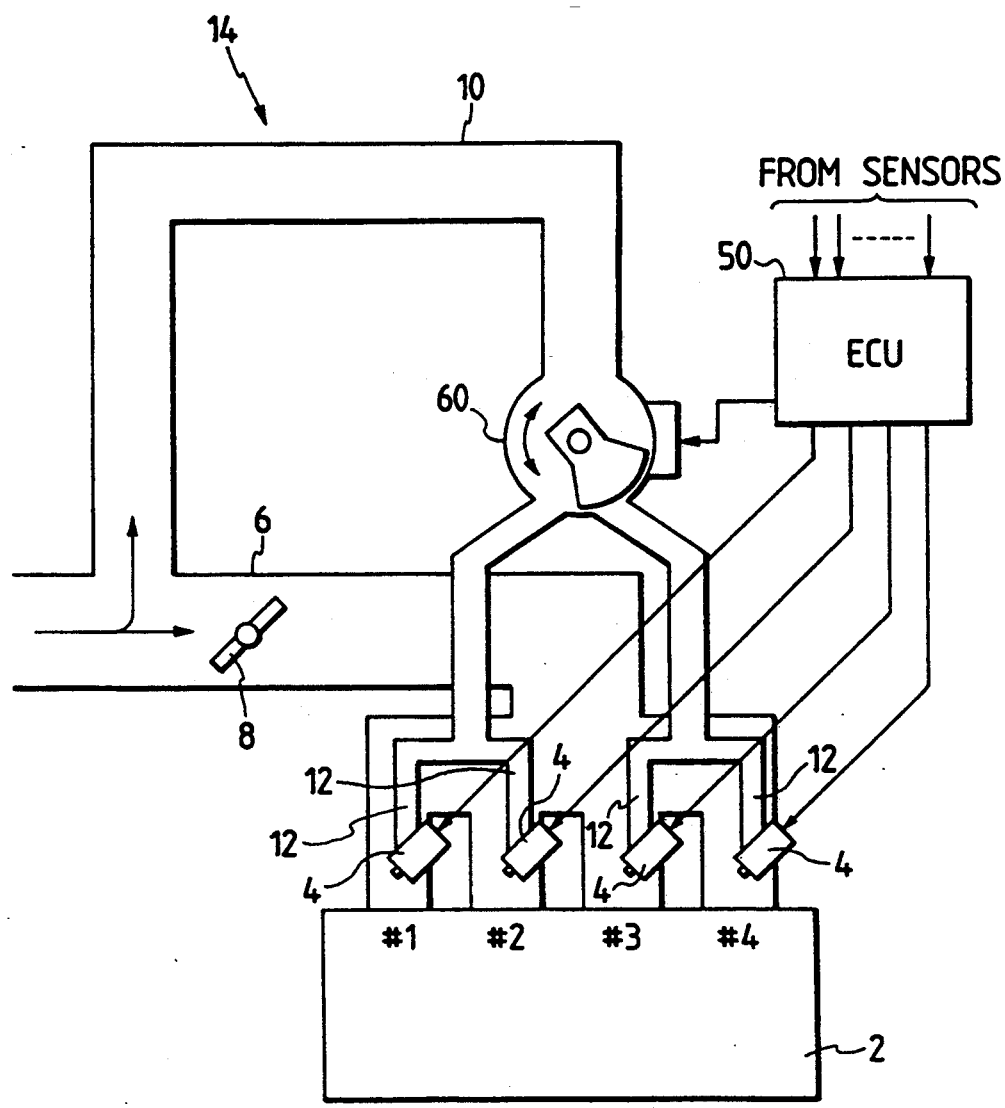
FIG. 17 is a schematic diagram showing the entire structure of a fuel injection system for a four-cylinder internal combustion engine according to a fourth preferred embodiment of the present invention.

FIG. 17 is a schematic diagram showing an entire structure of a fuel injection system according to a fourth preferred embodiment. The structure shown in FIG. 17 is the same as that shown in FIG. 1 except that a single control valve 60 is provided in the air passage 14 instead of the air control valve 16 and the distributing valve 18. The control valve 60 is the same in structure as the distributing valve 18, and is controlled by the ECU 50 so as to supply the mixing air in synchronism with the fuel injection.

Figure 18:
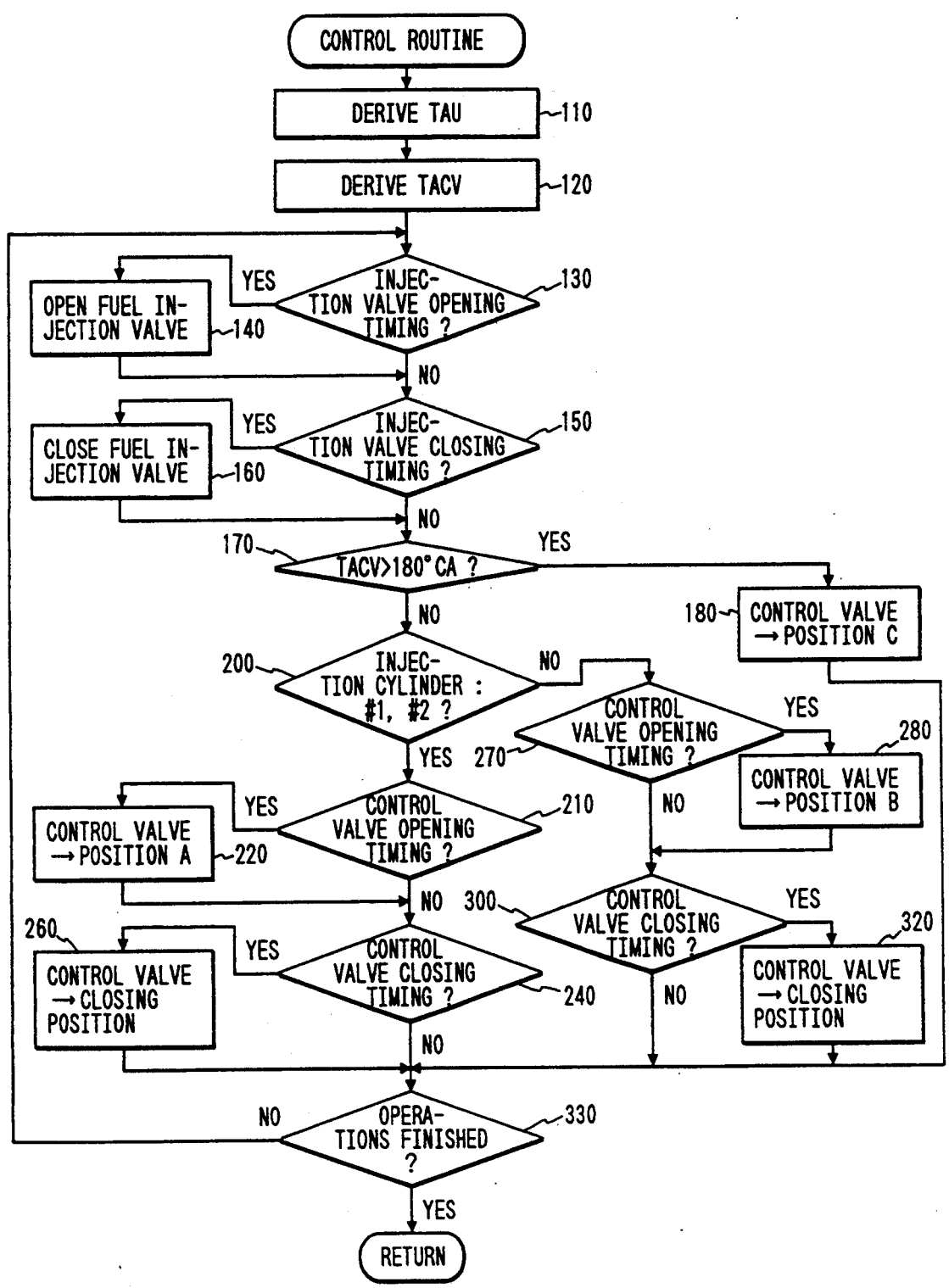
FIG. 18 is a flowchart of a control routine to be executed by the ECU for controlling the operations of the fuel injection valves and a control valve according to the fourth preferred embodiment.

FIG. 18 is a flowchart of a control routine to be executed by the ECU 50 for controlling the operations of the fuel injection valve 4 and the control valve 60.

Since the flowchart of FIG. 18 differs from that of FIG. 5 only in that the steps 190, 230, 250, 290 and 310 in FIG. 5 are eliminated, explanation thereof will be omitted. As appreciated, in this preferred embodiment, the control valve 60 functions both as the air control valve 16 and the distributing valve 18 in the first preferred embodiment.

The structure not described above is the same as that in the first preferred embodiment.

The reason for separately arranging the air control valve and the distributing valve in the first to third preferred embodiments is, as described in the first preferred embodiment, for providing a high response characteristic for supplying the mixing air.

Now, a fifth preferred embodiment of the present invention will be described hereinbelow.

Figure 19:
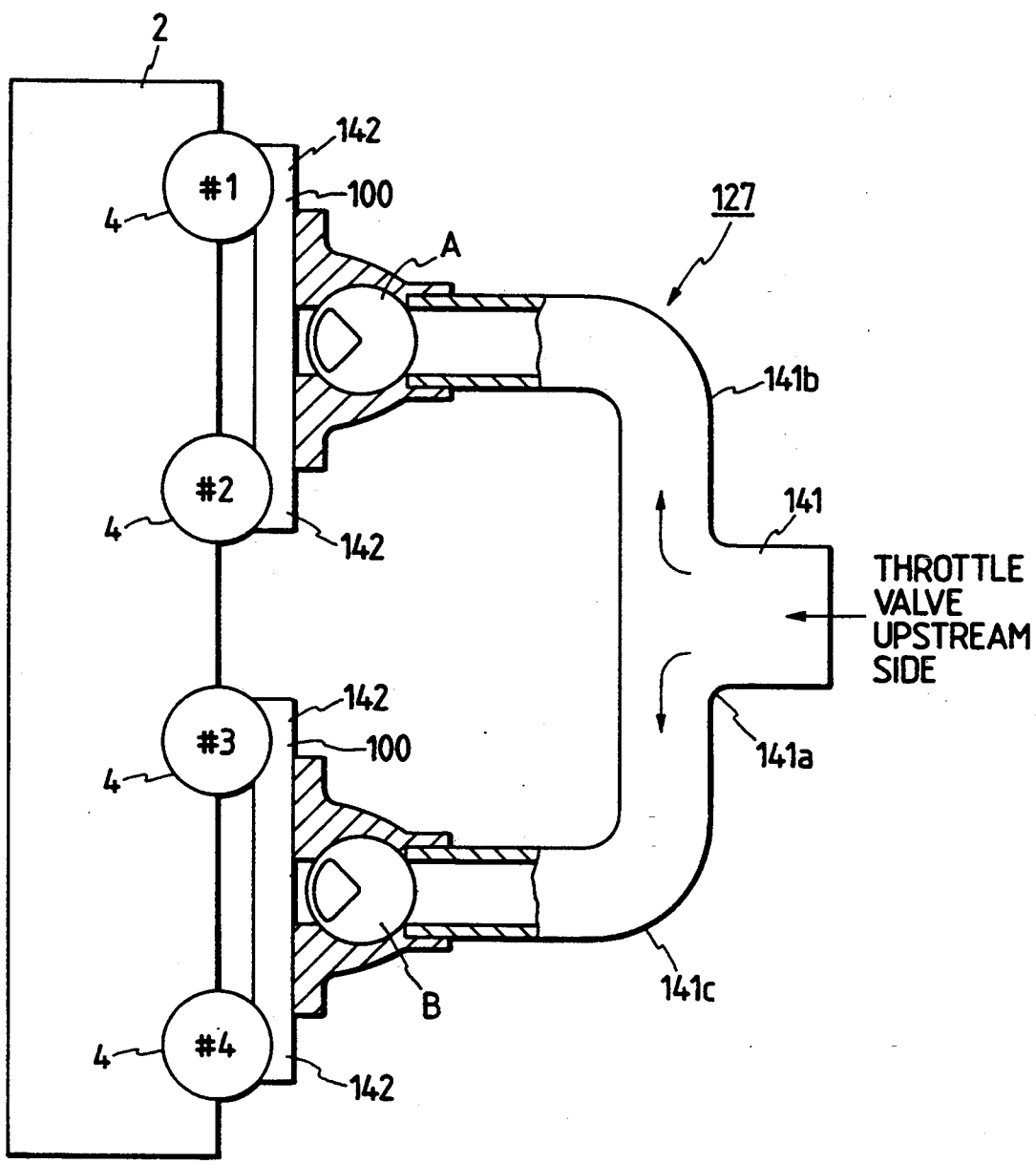
FIG. 19 is a diagram schematically showing the structure of an air passage with air control valves disposed therein, according to a fifth preferred embodiment of the present invention.

FIG. 19 is a diagram schematically showing the structure of an air passage 127 with air control valves A and B disposed therein, according to the fifth preferred embodiment. The structure not illustrated in FIG. 19 is substantially the same as that shown in FIGS. 1 and 2 of the first preferred embodiment. In FIG. 19, the air passage 127, an air introducing section 141 and air discharging sections 142 correspond to the air passage 14, the air introducing section 10 and the air discharging sections 12, respectively, in FIGS. 1 and 2. The same reference symbols in FIG. 19 represent the same components in FIGS. 1 and 2. Further, for simplicity, the fuel injection valves 4 and the corresponding engine cylinders #1 to #4 are illustrated in a unified manner, respectively, in FIG. 19.

In FIG. 19, the engine cylinders #1 to #4 are divided into two cylinder groups, one group including the engine cylinders #1 and #2 and the other including the engine cylinders #3 and #4. The air passage 127 includes the air introducing section 141 for conducting the air from the upstream side of the throttle valve 8 in the intake passage 6 of the engine 2 and two air distributing sections 100 each having the two air discharging sections 142 for distributing the air conducted through the air introducing section 141 to the vicinities of the injection holes of the fuel injection valves 4 for the engine cylinders #1 to #4. The air introducing section 141 has a branch portion 141a where the air introducing section 141 branches into two branch passages 141b and 141c for the respective cylinder groups. Air control valves A and B are provided at downstream ends of the branch passages 141b and 141c, respectively. The air control valves A and B are each in the form of a two-port two-position electromagnetic valve.

Each of the two air distributing sections 100 connects the fuel injection valves 4 for the engine cylinders (#1 and #2; #3 and #4) in the same group at a minimum distance, and each of the air control valves A and B is connected at the middle portion of the corresponding air distributing section 100. Accordingly, the fuel injection valves 4 for the engine cylinders in each cylinder group are connected or blocked relative to the upstream side of the throttle valve 8 by the opening/closing operation of the corresponding air control valve A or B.

In FIG. 19, lengths of the branch passages 141b and 141c are set equal to each other, that is, passage lengths from the branch portion 141a to the respective air control valves A and B are set equal to each other. Further, passage lengths from the air control valve A to the corresponding fuel injection valves 4 and passage lengths from the air control valve B to the corresponding fuel injection valves 4 are all set equal to each other. Accordingly, the mixing air can be uniformly supplied to the respective fuel injection valves 4 via the air passage 127.

With reference to FIG. 2, a sum of cross-sectional areas of the holes 25 of the air injecting section 26 of the air mixture socket 20 is set to about one-third ($\frac{1}{3}$) to one-fourth ($\frac{1}{4}$) a cross-sectional passage area of the air discharging section 142 as in the first preferred embodiment.

Further, in case of the four-cylinder engine, a sum of the cross-sectional areas of the air injecting holes 25 for the engine cylinders #1 to #4 is set to such a magnitude that can supply an air amount as required for the fast idle at the cold temperature, for example, 30 m$^3$/h so as to ensure the engine idle operation solely by the mixing air introduced by the air passage 127 since no other air supply passage for an exclusive use for the idle running of the engine 2 is provided in this preferred embodiment.

As appreciated, the above-noted dimensional arrangement for the air injecting holes 25 is readily applicable to the foregoing first to fourth preferred embodiments.

Now, a control routine to be executed by the ECU 50 for controlling the operations of the fuel injection valves 4 and the air control valves A and B will be described hereinbelow according to the fifth preferred embodiment of the present invention.

Figure 20:
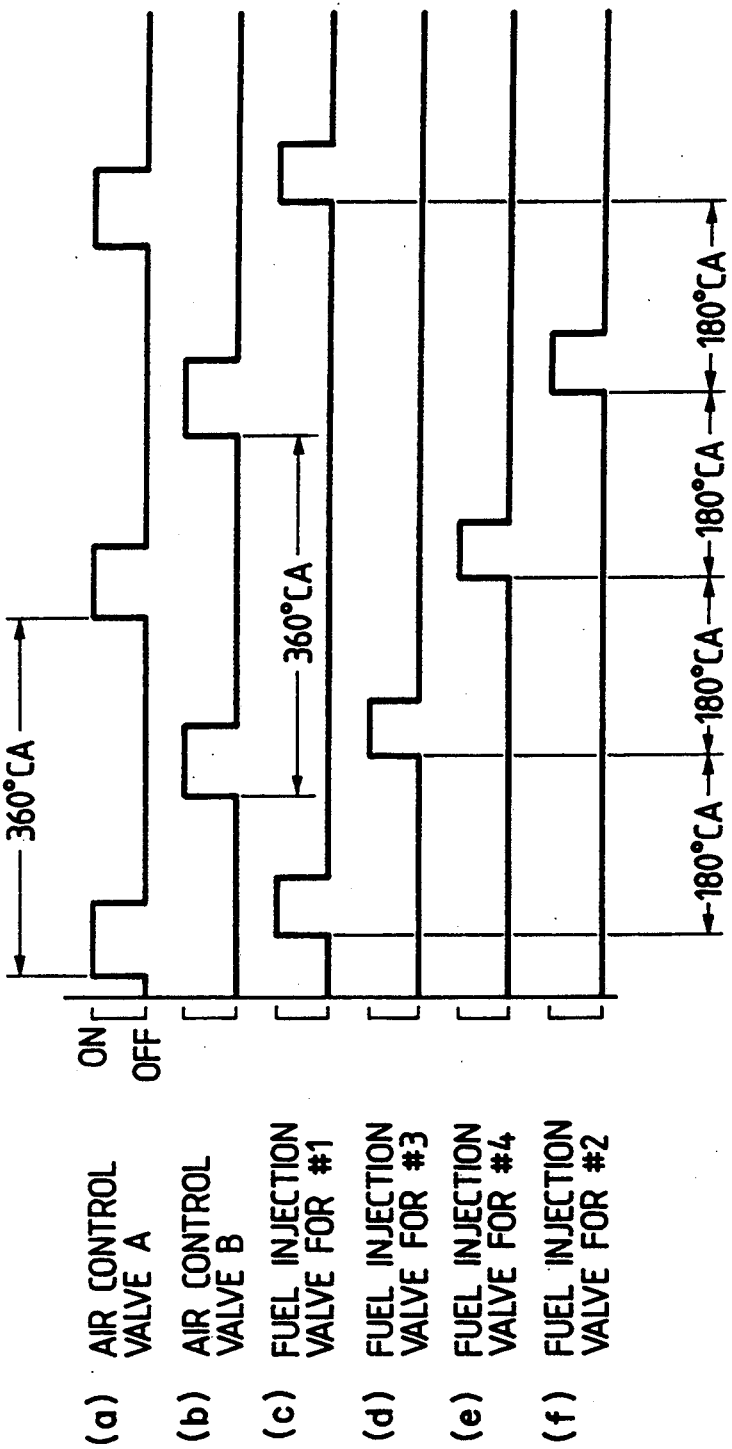
FIG. 20 graphs (a) to (f) are a time chart showing opening and closing timings of the air control valves relative to the fuel injections.
Figure 21:
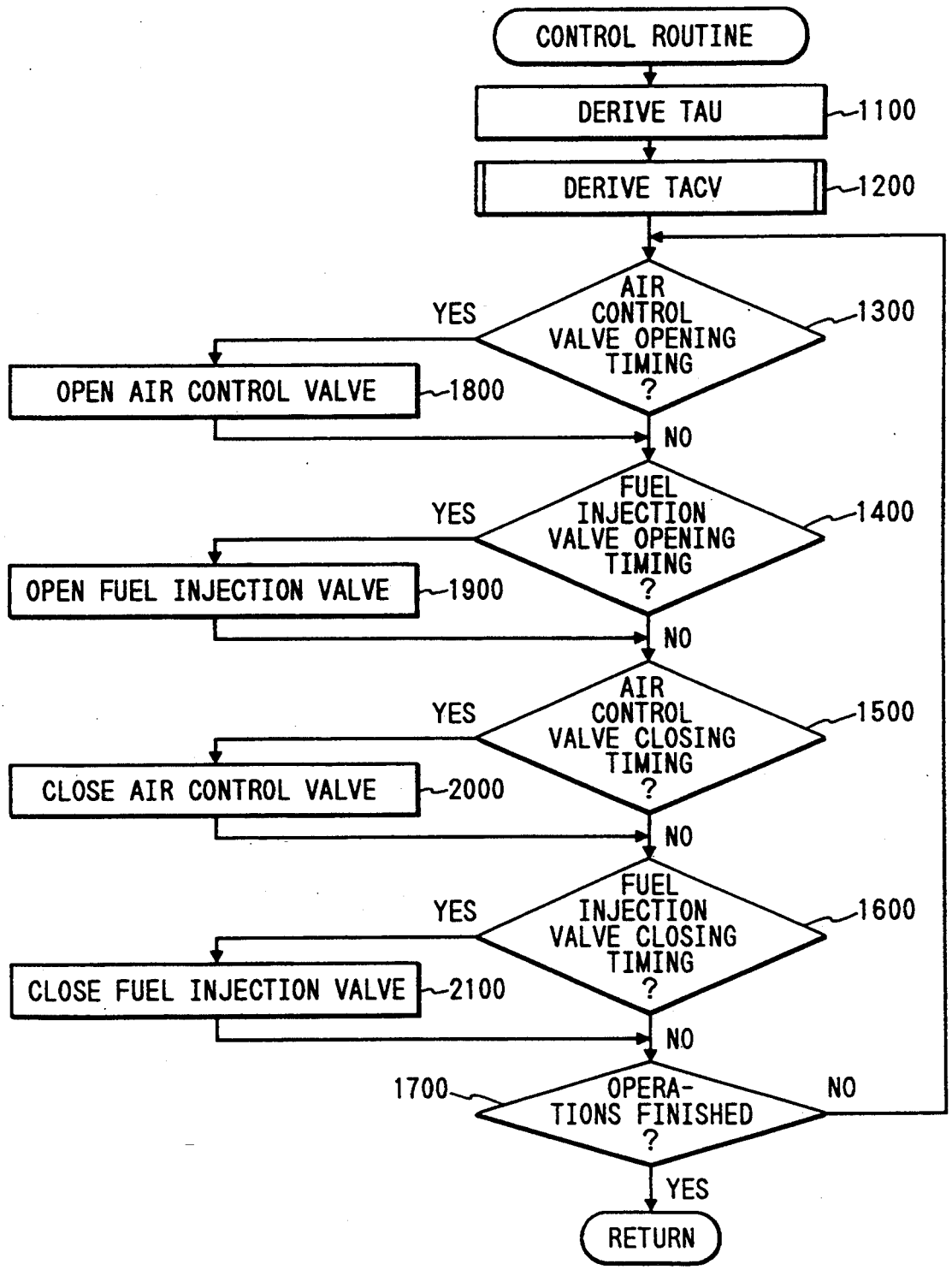
FIG. 21 is a flowchart of a control routine to be executed by the ECU for controlling the operations of the fuel injection valves and the air control valves according to the fifth preferred embodiment.
Figure 22:
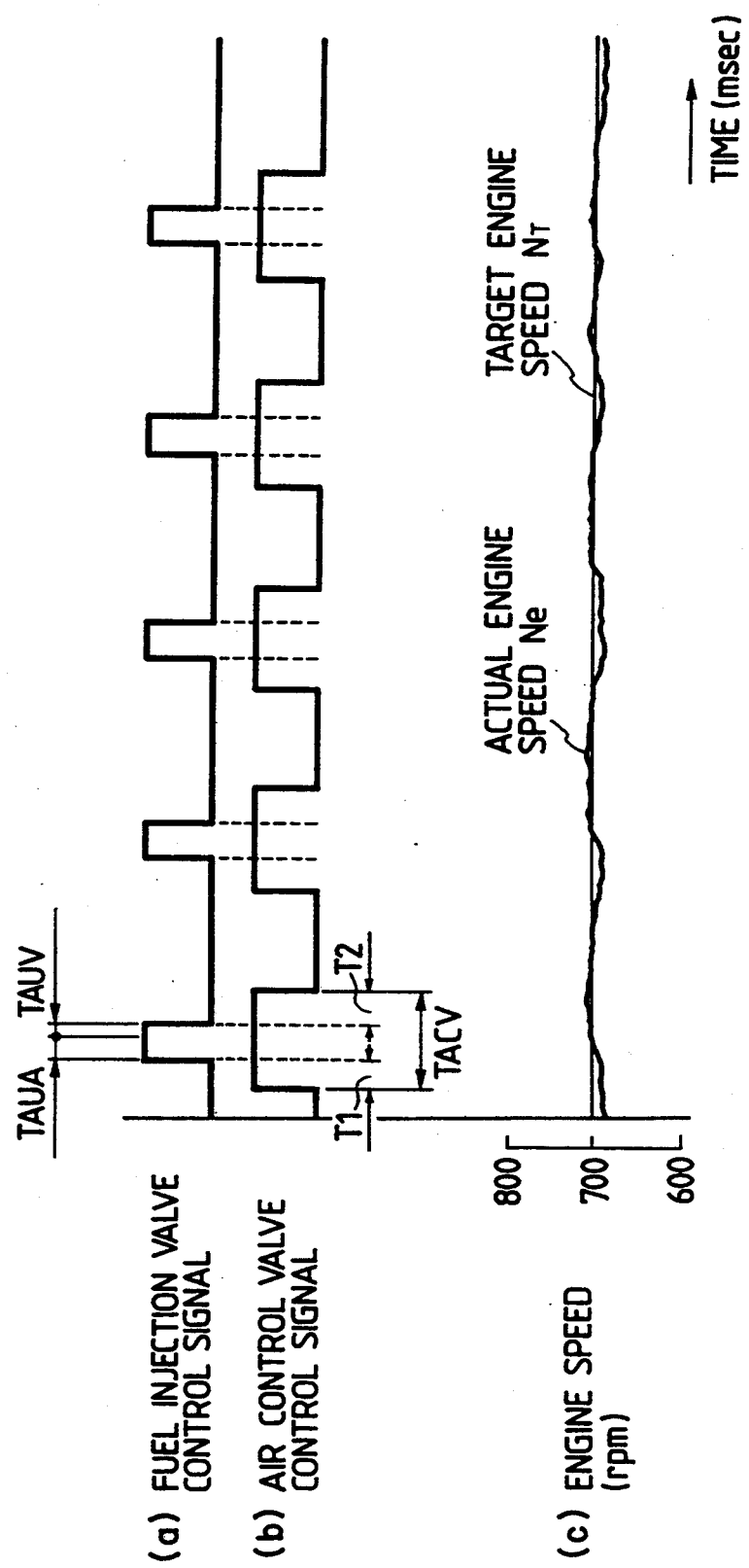
FIG. 22 graphs (a) to (c) are a time chart of control signals for the fuel injection valves and the air control valves under a condition where an actual engine speed is converged to a target engine speed.

FIG. 20 graphs (a) to (f) is a time chart showing opening and closing timings of the air control valves A and B relative to the fuel injections for the respective engine cylinders #1 to #4. FIG. 21 shows a flowchart of the control routine to be executed by the ECU 50 for controlling the operations of the fuel injection valves 4 and the air control valves A and B. FIG. 22 graphs (a) to (c) shows a time chart of control signals for the fuel injection valves 4 and the air control valves A and B under a condition where an actual engine speed Ne is converged to a target engine speed N$_T$.

Hereinbelow, the basic opening and closing timings of the air control valves A and B will be explained with reference to FIG. 20 graphs (a) to (f). In this preferred embodiment, each of the air control valves A and B is opened and closed in synchronism with opening and closing of the fuel injection valve 4 for the corresponding cylinder group. Specifically, since the air control valve A corresponds to the cylinder group of the cylinders #1 and #2, it is controlled to be opened and closed in synchronism with the opening and the closing of the fuel injection valves 4 for the cylinders #1 and #2. Similarly, since the air control valve B corresponds to the cylinder group of the cylinders #3 and #4, it is controlled to be opened and closed in synchronism with the opening and the closing of the fuel injection valves 4 for the cylinders #3 and #4.

Now, the control routine of FIG. 21 will be described assuming that the next fuel injection will be performed for the engine cylinder #1, that is, the cylinder #1 is assumed to be the injection cylinder.

The control routine of FIG. 21 is executed per predetermined timing, such as, per 180° CA.

At a first step 1100, the ECU 50 calculates a valve opening time TAU in the same manner as at the step 110 in FIG. 5. Subsequently, a step 1200 derives a valve opening time TACV of the air control valve A corresponding to the fuel injection valve 4 for the engine cylinder #1. The valve opening time TACV of the air control valve A is derived by adding a rise point correction time T1 and a fall point correction time T2 to the valve opening time TAU of the fuel injection valve 4 derived at the step 1100. The rise point correction time T1 represents how long a valve opening timing of the air control valve A should be advanced relative to a valve opening timing of the fuel injection valve 4. On the other hand, the fall point correction time T2 represents how long a valve closing timing of the air control valve A should be retarded relative to a valve closing timing of the fuel injection valve 4. The details of the process at the step 1200 will be described later with reference to FIGS. 23 to 27.

The routine now proceeds to a step 1300 which determines whether the valve opening timing of the air control valve A has been reached, i.e. whether a timing which is advanced by the aforementioned rise point correction time T1 relative to the preset valve opening timing of the fuel injection valve 4 (for example, per 5° CA BTDC for each engine cylinder), has been reached. When answer at the step 1300 is NO, then the routine proceeds to a step 1400 which determines whether the valve opening timing of the fuel injection valve 4 has been reached. As described above, since the valve opening timing of the fuel injection valve 4 is always delayed relative to that of the air control valve A, the step 1400 produces a negative answer by determining that the valve opening timing of the fuel injection valve 4 has not been reached.

The routine now proceeds to a step 1500 which determines whether the valve closing timing of the air control valve A has been reached. Since the air control valve A has not even opened yet, the step 1500 produces a negative answer by determining that the valve closing timing of the air control valve A has not been reached. At a subsequent step 1600, it is determined whether the valve closing timing of the fuel injection valve 4 has been reached. Similarly, since the fuel injection valve 4 has not even opened yet, the step 1600 produces a negative answer by determining that the valve closing timing of the fuel injection valve 4 has not been reached.

The routine now proceeds to a step 1700 which determines whether the valve opening and closing operations of the air control valve A and the fuel injection valve 4 have been finished or completed. Since answer at the step 1700 at this time is NO, the routine returns to the step 1300 to repeat the process at the steps 1300 through 1700.

On the other hand, when answer at the step 1300 becomes YES, i.e. the valve opening timing of the air control valve A has been reached, a step 1800 provides a high level in a control signal for the air control valve A to open the air control valve A. Thereafter, the process at the steps 1300 through 1700 is repeated until the rise point correction time T1 has elapsed since the valve opening timing of the air control valve A. When the rise point correction time T1 has been reached, the step 1400 produces a positive answer, i.e. the valve opening timing of the fuel injection valve 4 has been reached. In response to this positive answer, a step 1900 produces a high level in a control signal for the fuel injection valve 4 to open the fuel injection valve 4. Thereafter, when the valve opening time TAU has elapsed since the valve opening timing of the fuel injection valve 4, a step 1600 produces a positive answer, i.e. the valve closing timing of the fuel injection valve 4 has been reached. In response to this positive answer, a step 2100 produces a low level in the control signal for the fuel injection valve 4 to close the fuel injection valve 4. Thereafter, when the valve opening time TACV of the air control valve A has elapsed since the valve opening timing of the air control valve A, the step 1500 produces a positive answer, i.e. the valve closing timing of the air control valve A has been reached. In response to this positive answer, a step 2000 produces a low level in the control signal for the air control valve A to close the air control valve A. Subsequently, the routine proceeds to the step 1700 which determines at this time that the opening and closing operations of the air control valve A and the fuel injection valve 4 have been completed to terminate this control routine.

The ECU changes or switches the fuel injection valve 4 to be controlled in the order of the cylinders #1, #3, #4 and #2 per execution of the control routine of FIG. 21 and further switches the corresponding air control valve to be controlled in the order of A, B, A and B.

It is to be appreciated that, although the fall point correction time T2 is set to a positive value in the foregoing description to close the air control valve A, B after the fuel injection valve 4 has been closed, the fall point correction time T2 may be set to a negative valve depending on the monitored engine conditions. As appreciated, in this case, the air control valve A, B is closed at the step 2000 in advance of the valve closing of the fuel injection valve 4 performed at the step 2100.

Now, the process at the foregoing step 1200 to be executed by the ECU 50 for deriving the valve opening time TACV of the air control valve A, B will be described in detail hereinbelow with reference to FIGS. 23 to 27.

Figure 23:
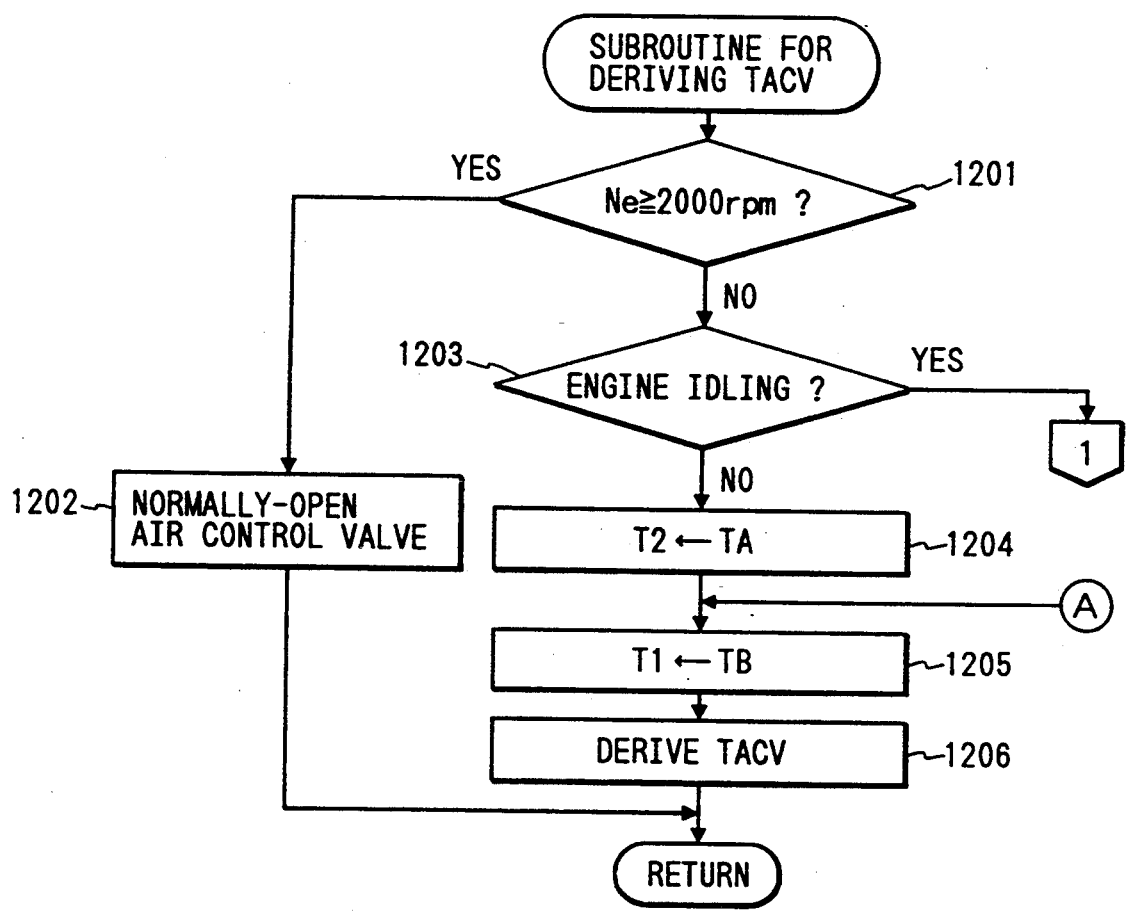
FIGS. 23 and 24 are flowcharts showing a subroutine of the control routine of FIG. 21, to be executed by the ECU for deriving a valve opening time of the air control valve.
Figure 24:
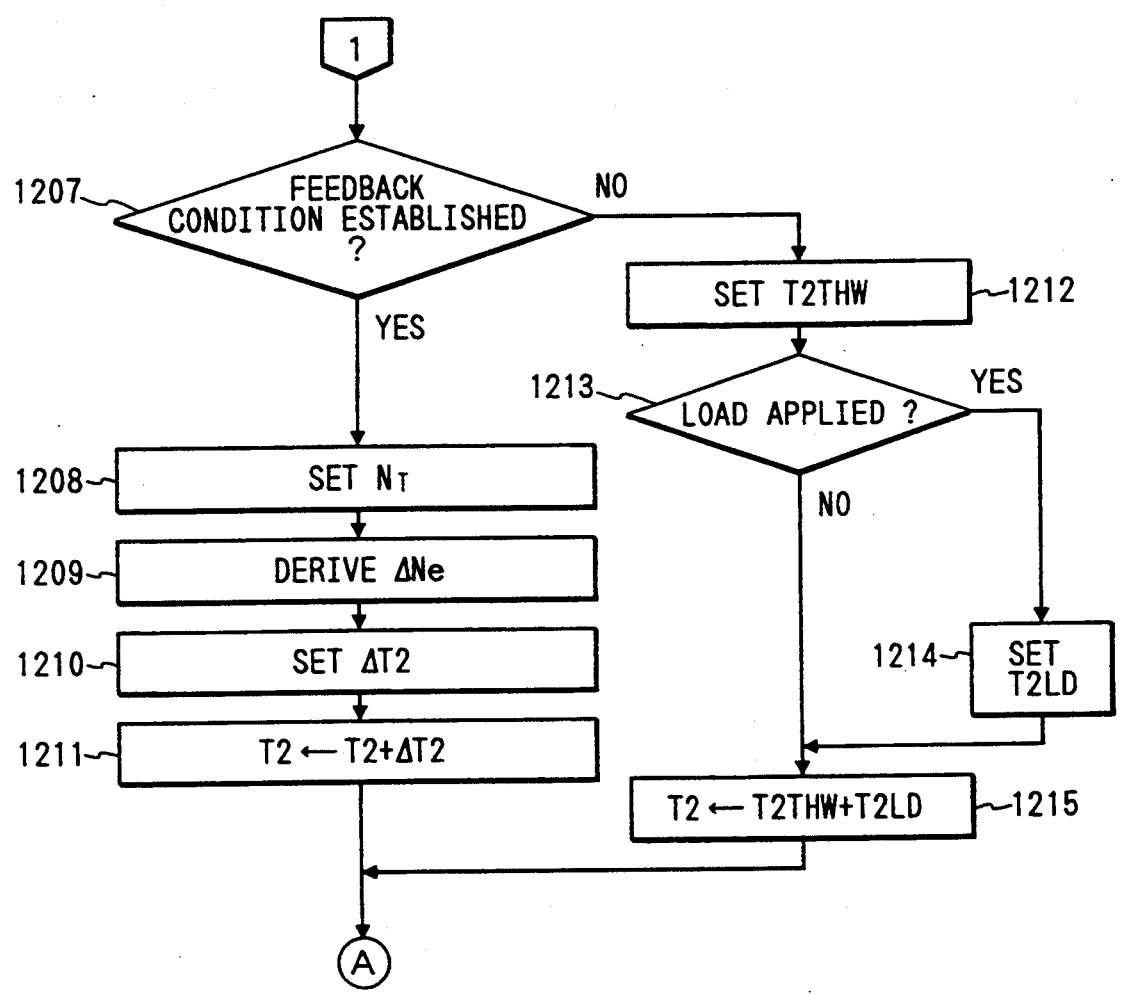
Figure 25:
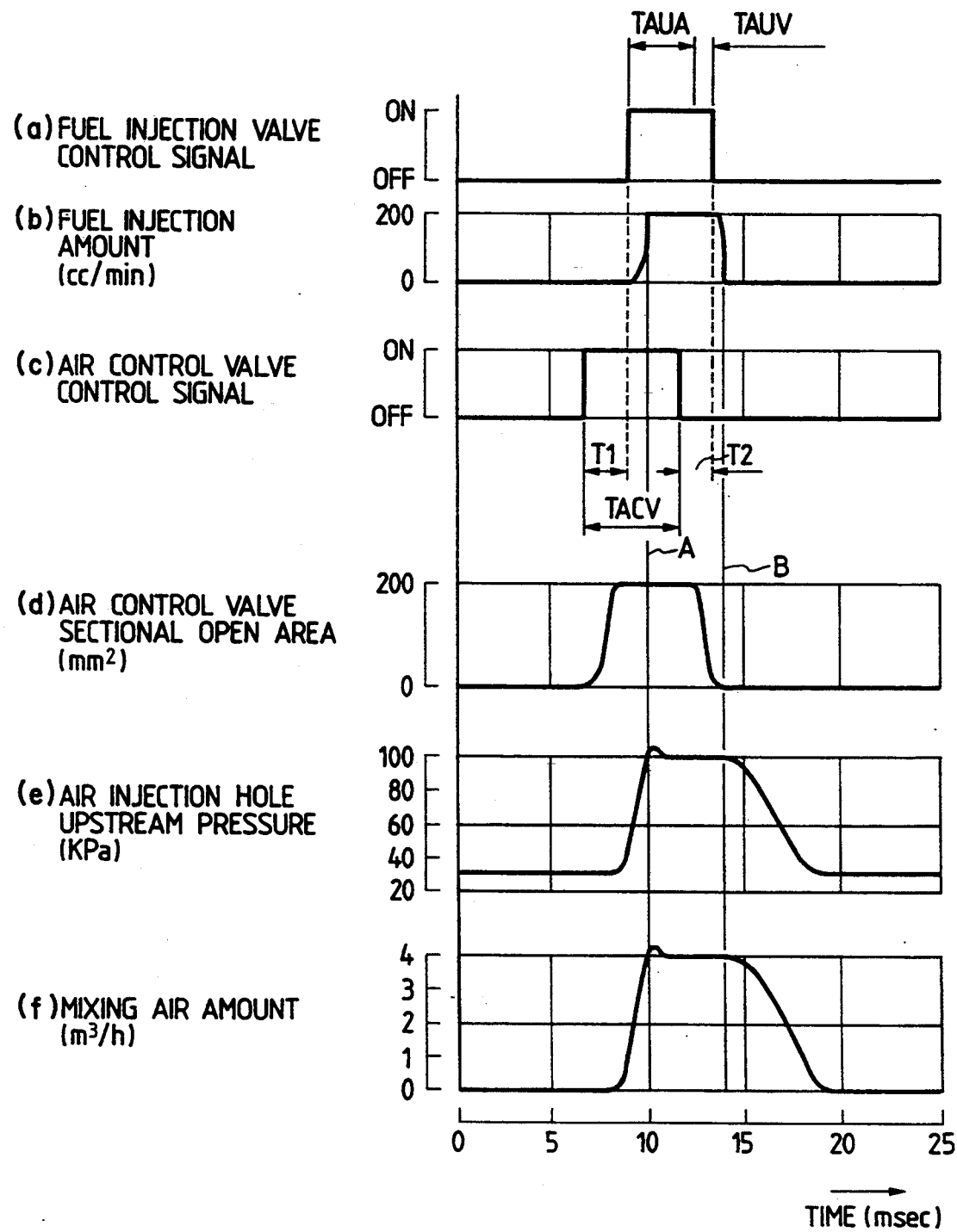
FIG. 25 graphs (a) to (f) are a time chart showing a state, wherein a supply of mixing air is substantially synchronous with an actual fuel injection.
Figure 26:
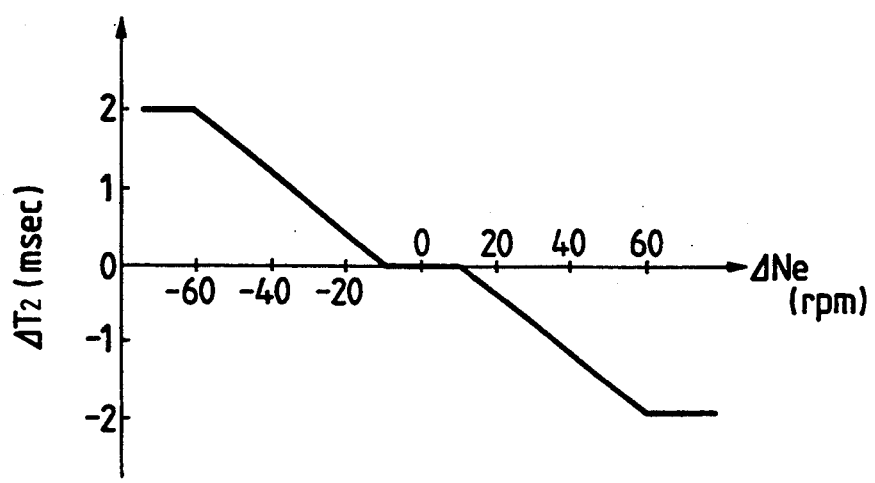
FIG. 26 is a map for setting a correction value for a fall point correction time based on a speed differential between a monitored engine speed and a target engine speed.
Figure 27:
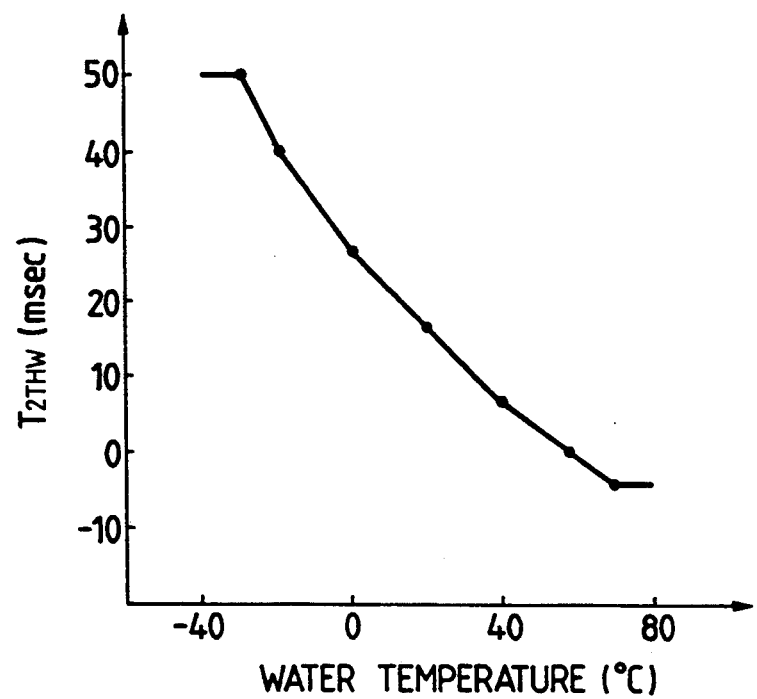
FIG. 27 is a map for setting a correction value for the fall point correction time based on a monitored engine coolant temperature, particularly during the fast idle of the engine.

FIGS. 23 and 24 show a flowchart of a subroutine corresponding to the step 1200 in FIG. 21 for deriving the valve opening time TACV of the air control valve A, B. FIG. 25 graphs (a) to (f) are a time chart showing a state, wherein a supply of the mixing air is substantially synchronous with an actual fuel injection from the fuel injection valve 4. FIG. 26 is a map for setting a correction value AT2 for the fall point correction time T2 based on a speed differential $\Delta Ne$ between the monitored engine speed Ne and the target engine speed NT. FIG. 27 is a map for setting a correction value $T2_{THW}$ for the fall point correction time T2 based on the monitored engine coolant temperature, particularly during the fast idle of the engine.

In FIGS. 23 and 24, a first step 1201 decides whether the engine speed Ne monitored by the engine speed sensor is equal to or greater than 2,000 rpm. When answer at the step 1201 is YES, a step 1202 controls the air control valve A, B as being normally open and terminates this subroutine without deriving the valve opening time TACV of the air control valve A, B. Accordingly, during the monitored engine speed Ne being equal to or larger than 2,000 rpm, the air control valve A, B Is maintained to be open. As appreciated, since the valve opening time TACV is not derived at the step 1200 in FIG. 21 when the step 1202 in FIG. 23 is executed, the steps 1300 and 1500 respectively produce negative answers, while, the steps 1400, 1900, 1600 and 2100 are executed based on the aforementioned preset valve opening timing of the fuel injection valve 4 and the valve opening time TAU derived at the step 1100, and the step 1700 produces a positive answer after the step 2100 has been executed.

Since the mixing air is continuously introduced into the area near the fuel injecting hole 23 of the fuel injecting section 24 via the air injecting holes 25 of the air injecting section 26, the atomization of the fuel injected through the fuel injecting hole 23 is highly facilitated.

On the other hand, when answer at the step 1201 in FIG. 23 is NO, i.e. the monitored engine speed Ne is less than 2,000 rpm, a step 1203 determines whether the engine 2 is idling. The step 1203 makes this decision based on an ON/OFF state of an idle switch in a known manner. When answer at the step 1203 is NO, i.e. the engine is not idling at a speed less than 2,000 rpm, the routine proceeds to a step 1204 where a preset negative value TA is set as the fall point correction time T2. Subsequently, at a step 1205, a preset positive value TB is set as the rise point correction time T1, and at a step 1206, the valve opening time TACV of the air control valve A, B is derived using the following equation:

$$TACV = T1 + TAU + T2$$

After the execution of the step 1206, this subroutine is terminated to proceed to the step 1300 in FIG. 21.

Accordingly, when the air control valve A, B and the fuel injection valve 4 are opened at the respective steps 1800 and 1900, a rise point (leading edge) in the control signal for the air control valve A, B is advanced relative to that for the fuel injection valve 4 by the fixed rise point correction time T1 as shown in FIG. 25. As result, a pressure on the upstream side of the air injecting holes 25 becomes maximum when the fuel injection is actually started as indicated by symbol A in FIG. 25 graph (d). Similarly, when the air control valve A, B and the fuel injection valve 4 are closed at the respective steps 2000 and 2100, a fall point (trailing edge) in the control signal for the air control valve 4 is advanced relative to that for the fuel injection valve 4 by the fixed fall point correction time T2. As a result, the maximum pressure on the upstream side of the air injecting holes 25 is maintained until the fuel injection is actually finished as indicated by symbol B in FIG. 25 graph (d), and thereafter the pressure on the upstream side of the air injecting holes 25 drops rapidly.

Accordingly, during the non-idle or off-idle running of the engine at a speed less than 2,000 rpm, the mixing air is mainly supplied during the actual fuel injection so as to facilitate the atomization of the injected fuel.

On the other hand, when the step 1203 produces a positive answer, i.e. the engine is idling, the routine proceeds to a step 1207 in FIG. 24 which determines whether a condition for a feedback control of an idling engine speed is established. As is well known, this feedback control condition represents a condition where the feedback control of the idling engine speed is necessary, and is thus satisfied when, for example, the monitored engine coolant temperature is no less than 80° C., or a vehicle speed is less than 3 km/h. The step 1207 produces a positive answer when it determines that the feedback control condition for the engine idling is established. The step 1207 makes this decision based on the engine coolant temperature monitored by the coolant temperature sensor and the vehicle speed monitored by a vehicle speed sensor, in a known manner.

At a subsequent step 1208, a target idling engine speed $N_T$ is set based on operating conditions of equipped electrical loads, i.e. current consumers such as an air conditioner, and a gear position of a gear shift lever such as an N-range (neutral rage) and a D-rage (drive range) in case of an automatic power transmission mounted vehicle. The target engine speed $N_T$ may be set to, for example, 700 rpm. Thereafter, a step 1209 derives a speed differential $\Delta Ne$ between the engine speed Ne monitored by the engine speed sensor and the target engine speed $N_T$ based on the following equation:

$$\Delta Ne = Ne - N_T$$

Subsequently, at a step 1210, a correction value $\Delta T2$ is set based on the derived speed differential $\Delta Ne$, using the map as shown in FIG. 26. This map is prestored in the ROM in the ECU 50 and defines the correction value $\Delta T2$ in terms of the speed differential $\Delta Ne$. A subsequent step 1211 derives a new value of the fall point correction time T2 by adding the correction value $\Delta T2$ derived at the step 1210 to a last or previous value of the fall point correction time T2, i.e. using the following equation:

$$T2 \leftarrow T2 + \Delta T2$$

Now, the routine proceeds to the step 1205 where the rise point correction time T1 is set to the preset positive value TB which is identical as in case of the engine off-idling at a speed less than 2,000 rpm. Thereafter, the step 1206 derives the valve opening time TACV of the air control valve A, B by adding the rise point correction time T1, the fall point correction time T2 and the valve opening time TAU of the fuel injection valve 4 in the same manner as described before.

Accordingly, when the air control valve A, B and the fuel injection valve 4 are respectively closed at the steps 2000 and 2100 with the fall point correction time T2 being set to a positive value at the step 1211, a fall point in the control signal for the air control valve A, B is delayed relative to that for the fuel injection valve 4 by the fall point correction time T2, as shown in FIG. 22 graph (b). As appreciated, the fall point correction time T2 is corrected by the correction value $\Delta T2$ in such a manner as to reduce the speed differential $\Delta Ne$ between the monitored engine speed Ne and the target engine speed $N_T$ so that the actual engine speed Ne is converged to and maintained at the target engine speed $N_T$, such as, 700 rpm.

For example, when a load applied to a power steering pump is increased due to the rapid steering of the vehicle to sharply drop the engine speed Ne, the step 1209 derives the speed differential $\Delta Ne$ as a negative value so that the step 1210 sets the correction value $\Delta T2$ as a positive value as shown in FIG. 26. Accordingly, the fall point correction time T2 is corrected to a larger value at the step 1211 to prolong the valve opening time TACV. As a result, a supply amount of the mixing air is increased to restore the engine speed Ne to the target engine speed $N_T$ of 700 rpm. On the other hand, when the air conditioner is activated, the step 1208 sets the target engine speed $N_T$ to, for example, 900 rpm. The actual engine speed Ne is controlled to increase to the target engine speed $N_T$ through the steps 1209 to 1211 in the same manner as described above.

The fall point correction time T2 may have a positive or negative value. When, for example, the load applied to the power steering pump is decreased to increase the engine speed Ne, the fall point correction time T2 may be set to a negative value to shorten the valve opening time TACV of the air control valve A, B so that the actual engine speed Ne is converged to the target engine speed $N_T$.

As appreciated from the foregoing description, when the engine is idling with the feedback control condition being satisfied, the valve opening time TACV of the air control valve A, B is suitably corrected by the fall point correction time T2 so as to converge the engine speed Ne to the target engine speed $N_T$ which is variably set depending on the operations of the equipped current consumers and the gear shift lever position. Accordingly, the mixing air works not only to facilitate the atomization of the injected fuel, but also to control the idling engine speed.

Referring back to the step 1207, when the step 1207 produces a negative answer, i.e. the feedback control condition is not established, a step 1212 sets a correction value $T2_{THW}$ based on the monitored engine coolant temperature, using the map as shown in FIG. 27. This map is prestored in the ROM in the ECU 50 and defines the correction value $T2_{THW}$ in terms of the engine coolant temperature. Subsequently, a step 1213 checks whether any preselected loads for lowering the engine speed Ne is applied or not, i.e. whether the current consumers such as the air conditioner are activated or not, or whether a gear shift lever position is shifted to such as the D-range in case of the vehicle with the automatic power transmission. When answer at the step 1213 is YES, then the routine proceeds to a step 1214 where a correction value $T2_{LD}$ is set depending on the applied loads as checked at the step 1213. Thereafter, at a step 1215, the fall point correction time T2 is derived based on the correction values $T2_{THW}$ and $T2_{LD}$, using the following equation:

$$T2 \leftarrow T2_{THW} + T2_{LD}$$

Now, the routine proceeds to the step 1205 which sets the rise point correction time T1 in the same manner as described before, and then to the step 1206 which derives the valve opening time TACV by adding the rise point correction time T1 set at the step 1205, the fall point correction time T2 derived at the step 1215 and the valve opening time TAU of the fuel injection valve 4 in the same manner as described before.

When the step 1213 produces a negative answer, i.e. no preselected load is applied, then the step 1215 sets the fall point correction time T2 to the correction value $T2_{THW}$ derived at the step 1212.

After the execution of the step 1206, this subroutine is terminated to proceed to the steps 1300 through 2100 as described before.

As shown in FIG. 27, the correction value $T2_{THW}$ is set to a larger positive value as the monitored engine coolant temperature decreases, and to a negative value when the engine coolant temperature is higher than about 70° C. where the engine warming up is substantially completed. As a result, when the air control valve A, B and the fuel injection valve 4 are respectively closed at the steps 2000 and 2100 in FIG. 21, the fall point in the control signal for the air control valve A, B is retarded by the fall point correction time T2 at a low engine temperature as shown in FIG. 22 graph (b) so that the engine speed Ne is increased due to an increasing supply of the mixing air for the fast engine idling. On the other hand, after the engine warming up has been completed, the fall point in the control signal for the air control valve A, B is advanced by the fall point correction time T2 as shown in FIG. 25 graph (c) so that the engine speed is decreased due to a decreasing supply of the mixing air to finish the fast idle operation of the engine.

On the other hand, the correction value $T2_{LD}$ is set at the step 1214 to a positive value which is predetermined for each of the loads. Since the correction value $T2_{LD}$ is a positive value, the valve opening time TACV is prolonged when the correction value $T2_{LD}$ is added. As a result, due to an increasing supply of the mixing air, dropping of the idling engine speed Ne is prevented which is otherwise caused due to, for example, a load applied from a torque converter when the gear position is shifted to the D-range from the N-range, or the idling engine speed Ne is increased to some extent for ensuring, for example, the cooling power when the air conditioner is activated.

As appreciated from the foregoing description, when the feedback control condition is not established during the engine idling, the valve opening time TACV is increased or decreased by the fall point correction time T2 so as to control the idling engine speed depending on the engine coolant temperature. In addition, the valve opening time TACV is increased by the fall point correction time T2 when at least one of the preselected loads is applied to the engine, so as to control the idling engine speed depending on the load applied to the engine. As a result, the mixing air under this engine idling condition also works not only to facilitate the atomization of the injected fuel, but also to control the idling engine speed to an optimum level as in case where the feedback control condition is established under the engine idling.

As described above, in this preferred embodiment, each of the air control valves A and B controls the supply of the mixing air to the fuel injection valves 4 for the two engine cylinders. Accordingly, in case of the four-cylinder engine, the supply of the mixing air for all the engine cylinders can be controlled by the two air control valves A and B. This reduces the number of the air control valves by half in comparison with the case where the air control valve is provided for each engine cylinder.

Further, since, when one of the air control valves A and B is opened, the other valve is held closed, the wasteful consumption of the mixing air is suppressed accordingly in comparison with the case where the single air control valve controls the supply of the mixing air as in the prior art fuel injection system. Further, since the air control valves A and B are operated alternately, an opening/closing operation period of each of the air control valves A and B can be prolonged to 360° CA as shown in FIG. 20 graphs (a) to (f) so that the response characteristic of the air control valve is not so strictly required.

Now, a sixth preferred embodiment of the present invention will be described hereinbelow, wherein the fuel injection system is applied to an in-line six-cylinder internal combustion engine 2. The six preferred embodiment is the same as the foregoing fifth preferred embodiment except that the structure of an air passage 127' and the valve opening and closing timings of the air control valves A and B are changed so as to correspond to the six-cylinder engine 2. Accordingly, the following description mainly deals with what differs from the fifth preferred embodiment.

Figure 28:
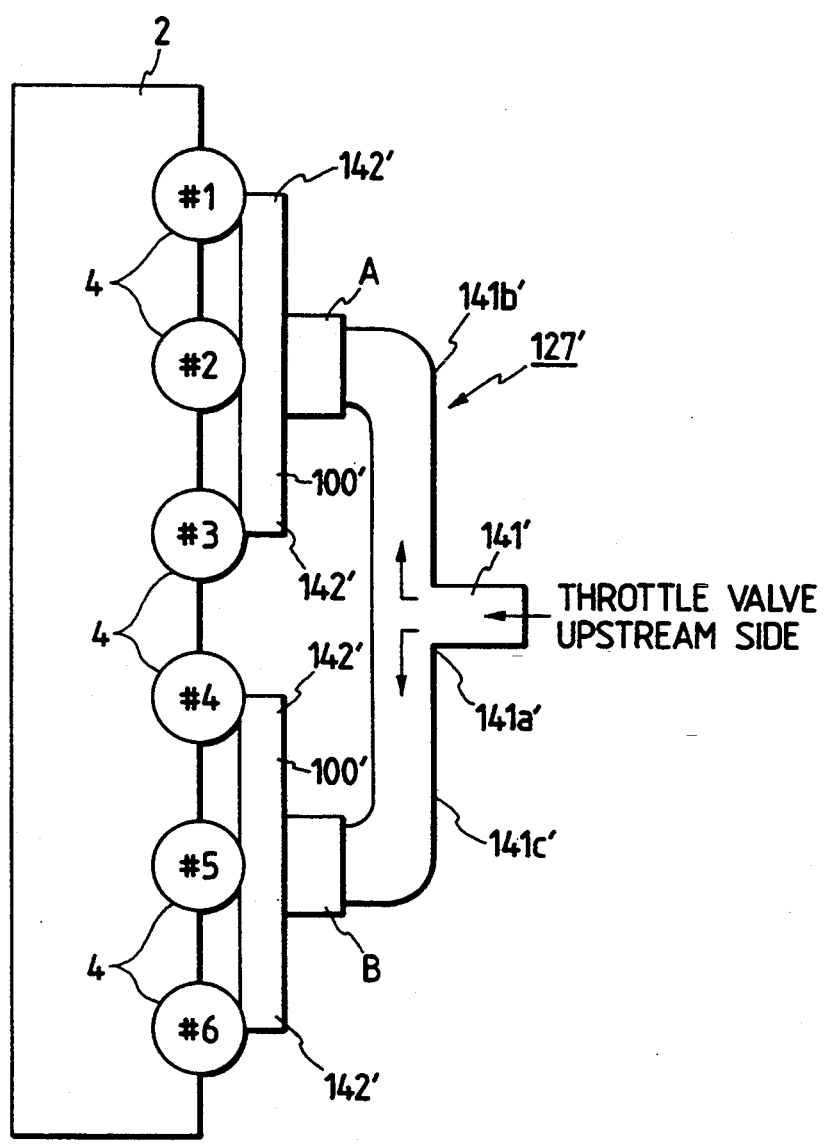
FIG. 28 is a diagram schematically showing the structure of an air passage with the air control valves disposed therein, according to a sixth preferred embodiment of the present invention.
Figure 29:
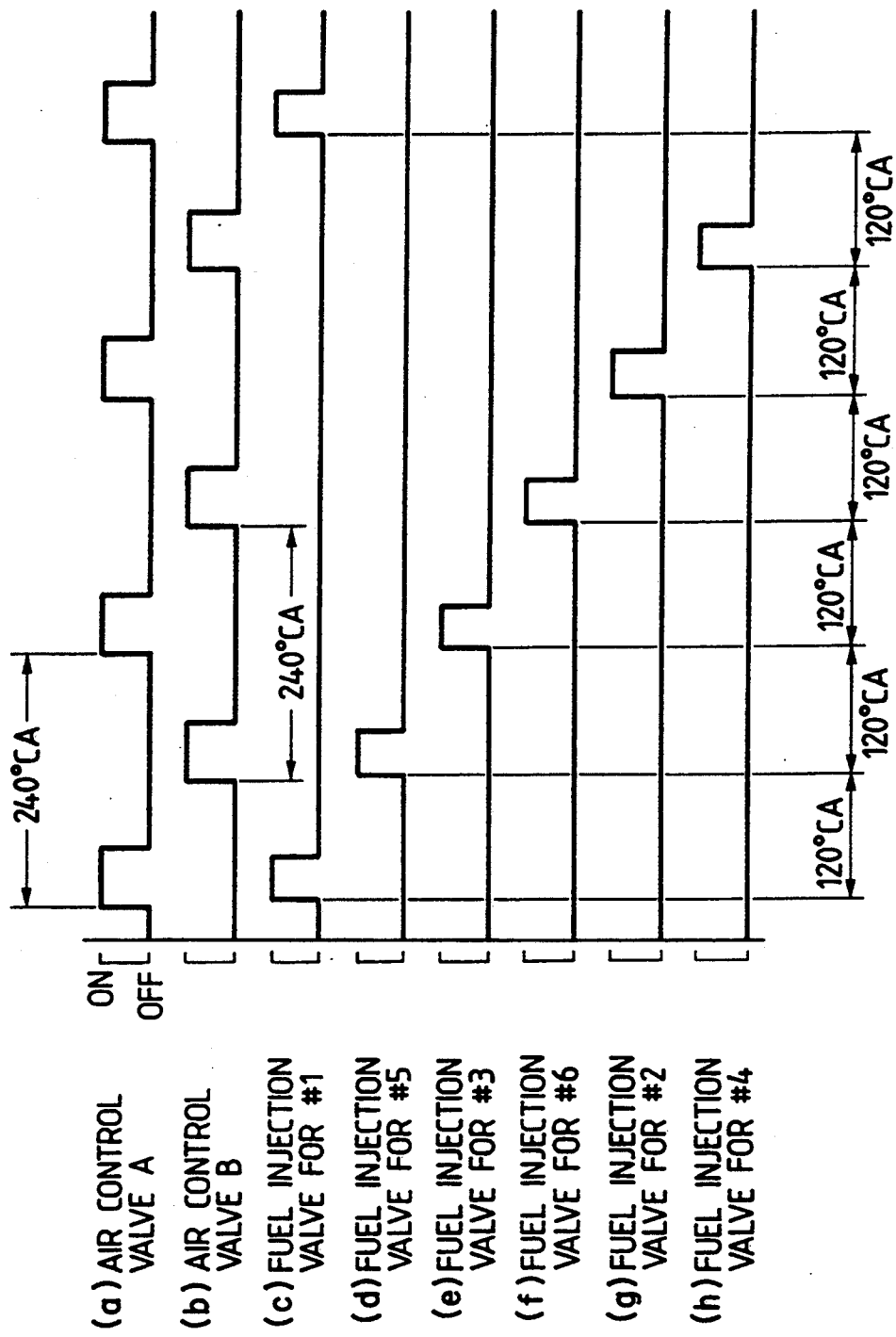
FIG. 29 graphs (a) to (h) are a time chart showing opening and closing timings of the air control valves relative to the fuel injections.

FIG. 28 is a diagram schematically showing the structure of the air passage 127' with the air control valves A and B disposed therein, according to the sixth preferred embodiment. FIG. 29 graphs (a) to (h) are a time chart showing opening and closing timings of the air control valves A and B relative to the fuel injections for the respective engine cylinders #1 to #6.

In the sixth preferred embodiment, as shown in FIG. 28, the engine cylinders #1 to #6 are divided into two cylinder groups, one group including the engine cylinders #1, #2 and #3 and the other including the engine cylinders #4, #5 and #6. The air passage 127' includes the air introducing section 141' and two air distributing sections 100' each having two air discharging sections 142' for distributing the air conducted through the air introducing section 141' to the vicinities of the injection holes of the fuel injection valves 4 for the engine cylinders #1 to #6. The air introducing section 141' has a branch portion 141a' where the air introducing section 141' branches into two branch passages 141b' and 141c' for the respective cylinder groups. The air control valves A and B are provided at downstream ends of the branch passages 141b' and 141c', respectively.

Each of the two air distributing sections 100' connects the fuel injection valves 4 for the engine cylinders (#1, #2 and #3; #4, #5 and #6) in the same group at a minimum distance, and each of the air control valves A and B is connected at the middle portion of the corresponding air distributing section 100'. Accordingly, the fuel injection valves 4 for the engine cylinders in each cylinder group are connected or blocked relative to the upstream side of the throttle valve 8 by the opening/closing operation of the corresponding air control valve A or B.

As shown in FIG. 29 graph (a) to (h), the opening/closing operation of the air control valve A is controlled in synchronism with the opening and closing of the fuel injection valve 4 for each of the engine cylinders #1 to #3. Similarly, the opening/closing operation of the air control valve B is controlled in synchronism with the opening and closing of the fuel injection valve 4 for each of the engine cylinders #4 to #6.

Accordingly, as in the fifth preferred embodiment, since the air control valve is provided for each cylinder group, the number of the air control valves can be reduced. Further, since, when one of the air control valves A and B is opened, the other valve is held closed, the wasteful consumption of the mixing air is suppressed accordingly. Still further, since the air control valves A and B are operated alternately, an opening/closing operation period of each of the air control valves A and B can be set to 240° CA as shown in FIG. 29 graphs (a) and (b) so that the response characteristic of the air control valve is not so strictly required.

In the first to sixth preferred embodiments, the number of the cylinder groups and a grouping manner of the cylinders may be changed according to the number and the arrangement of the engine cylinders. For example, in the sixth preferred embodiment, the engine cylinders #1 to #6 may be divided into three groups and the air control valve may be provided for each of the three cylinder groups.

Now, a seventh preferred embodiment of the present invention will be described hereinbelow.

Figure 30:
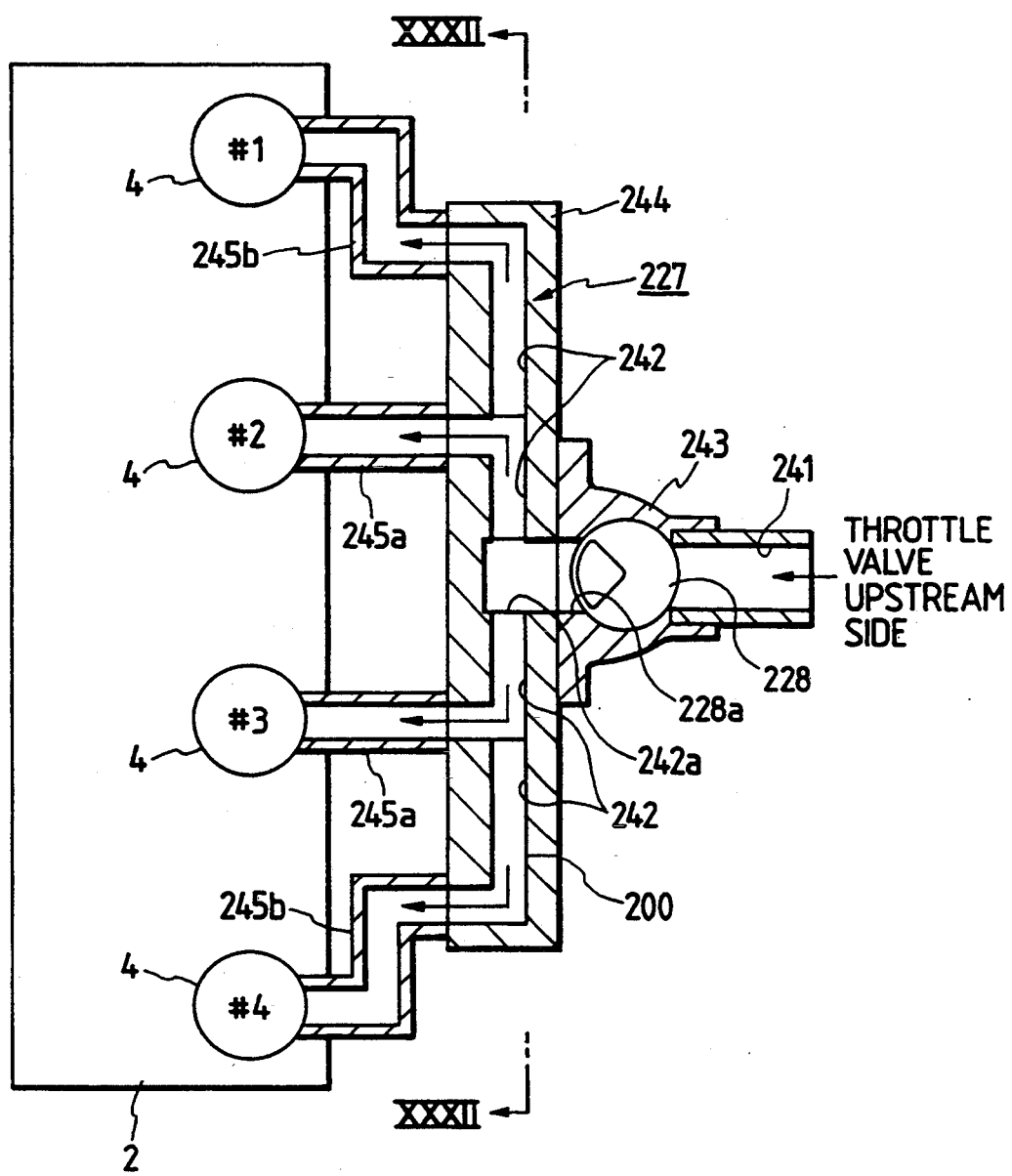
FIG. 30 is a plan sectional view schematically showing the structure of an air passage with a single air control valve disposed therein, according to a seventh preferred embodiment of the present invention.

FIG. 30 is a plan sectional view showing the structure of an air passage 227 with a single air control valve 228 disposed therein, according to the seventh preferred embodiment. The seventh preferred embodiment is substantially the same as the foregoing fifth preferred embodiment except for the structure of the air passage 227 instead of the air passage 127 and the single air control valve 228 instead of the air control valves A and B. The structure of FIG. 2 is applied to this preferred embodiment. As will be appreciated from the following description, the structure of the air passage 227 is readily applicable to the foregoing first to sixth preferred embodiments.

Figure 31:
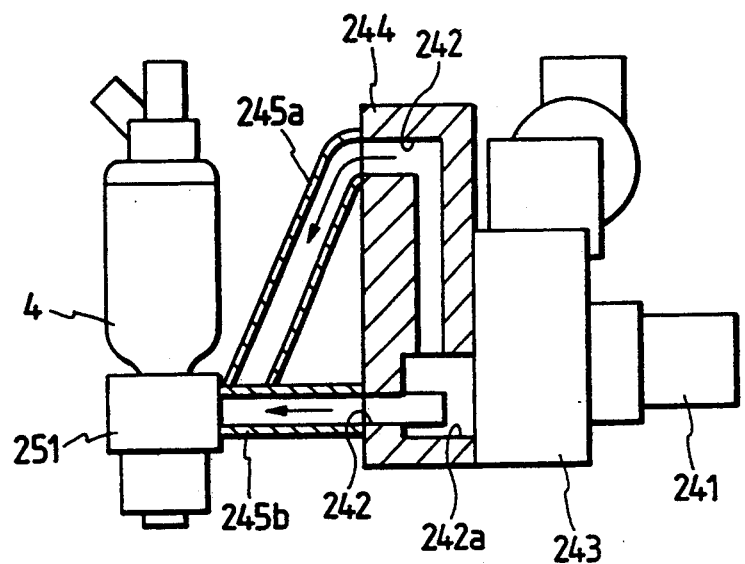
FIG. 31 is a side sectional view of FIG. 30.
Figure 32:
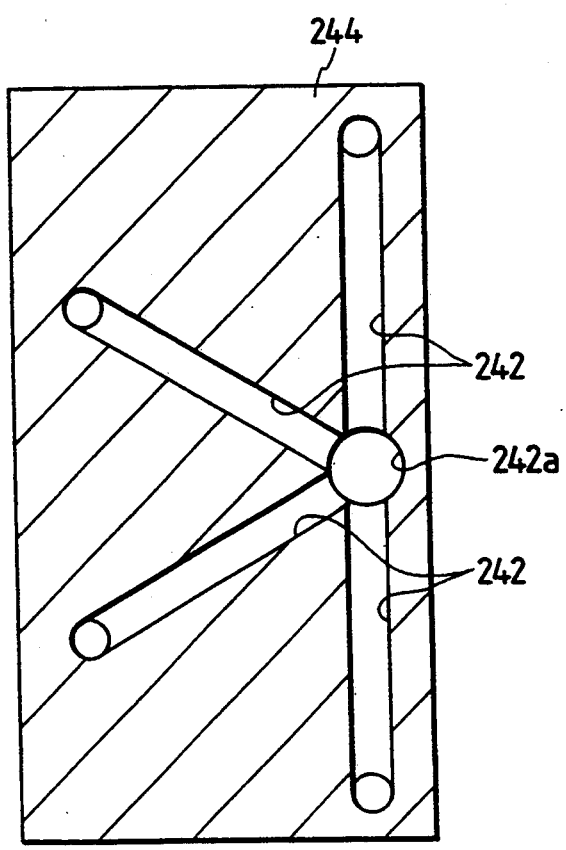
FIG. 32 is a sectional view taken along a line XXXII—XXXII in FIG. 30.

FIG. 31 is a side sectional view of FIG. 30, and FIG. 32 is a sectional view taken along a line XXXII—XXXII in FIG. 30.

As shown in FIGS. 30 to 32, the air passage 227 includes an air introducing section 241 connecting the upstream side of the throttle valve 8 in the intake passage 6 to the air control valve 228, and an air distributing section 200 having a branch portion 242a and four air discharging sections 242 branching from the branch portion 242a. The air control valve 228 is accommodated in a valve body 243 which is fixed to the middle portion of a distributing body 244 in the form of a thick plate. The branch portion 242a is formed in the distributing body 244 with a predetermined depth into the distributing body 244. The branch portion 242a is formed as being continuous with an outlet port 228a of the air control valve 228. As seen from FIG. 32, the air discharging sections 242 are formed in the distributing body 244 as extending radially. As seen from FIGS. 31 and 32, a downstream end portion of each air discharging section 242 in the distributing body 244 is bent toward the engine 2 so as to open at a side surface of the distributing body 244. The air discharging sections 242 of the air passage 227 further extend through the inside of connecting pipes 245a, 245a, 245b and 245b, respectively, to the corresponding fuel injection valves 4 for the engine cylinders #1 to #4. The connecting pipes 245a, 245b are coupled to the distributing body 244 at the respective open ends of the air discharging sections 242 on the side surface of the distributing body 244.

In the distributing body 244, lengths of all the air discharging sections 242 of the air passage 227 are set equal to each other. Further, lengths of all the air discharging sections 242 of the air passage 227 in the connecting pipes 245a, 245a, 245b and 245b are set equal to each other although the connecting pipes 245a, 245a each have a linear shape and the connecting pipes 245b, 245b each have a crank shape as seen from FIGS. 30 and 31. In addition, each air discharging section 242 has a circular shape in cross section and its cross-sectional area is set equal all over its length, i.e. in its longitudinal direction. Further, the cross-sectional areas of all the air discharging sections 242 are set equal to each other. Since the lengths and the cross-sectional areas of all the air discharging sections are set equal to each other, capacities of all the air discharging sections 242 are set equal to each other in this preferred embodiment. Moreover, in this preferred embodiment, a cross-sectional passage area of the branch portion 242a is set equal to a sum of the cross-sectional areas of the four air discharging sections 242.

The operation of the single air control valve 228 is controlled using the control routine shown in FIGS. 21, 23 and 24 as described in the fifth preferred embodiment. Accordingly, in this preferred embodiment, the opening/closing operation of the single air control valve 228 is controlled in synchronism with the fuel injection for each of the engine cylinders #1 to #4. On the other hand, the control routine of FIGS. 21, 23 and 24 may be executed per 360° CA. In this case, one cyclic execution of the control routine controls two of the four fuel injection valves 4, and the air control valve 228 is controlled in synchronism with the two simultaneous fuel injections per 360° CA.

As appreciated from the foregoing description, during the engine running, the mixing air from the upstream side of the throttle valve 8 is injected through the air injecting holes 25 via the air introducing section 241 and the air discharging sections 242 in response to the opening of the air control valve 228, and the atomization of the injected fuel and the control of the idling engine speed are performed using this mixing air. Although the mixing air conducted to the branch portion 242a is distributed to the respective air discharging sections 242, since the lengths and the cross-sectional areas of all the air discharging sections 242 of the air passage 227 located downstream of the branch portion 242a are set equal to each other, the mixing air is injected through the air injecting holes 25 at substantially the same timing and in substantially the same amount so that uniform combustion states can be realized among all the engine cylinders to further facilitate the atomization of the injected fuel.

Further, as described before, the cross-sectional passage area of the branch portion 242a is set equal to the sum of the cross-sectional passage areas of the four air discharging sections 242. Specifically, when the cross-sectional passage area of the branch portion 242a is reduced from the current value, a pressure loss is generated when the mixing air passes therethrough. On the other hand, when it is increased from the current value, a capacity of the air passage from the air control valve 228 to the fuel injection valves 4 is unnecessarily increased. In order to satisfy these contradictory conditions, the cross-sectional passage area of the branch portion 242a is selected as the acceptable minimum value. By setting the cross-sectional passage area as described above, the lowering of a supply pressure of the mixing air due to the pressure drop at the branch portion 242a is effectively prevented, and further, the capacity of the air passage 227 from the air control valve 228 to the fuel injection valves 4 is suppressed to the acceptable minimum value so that the supply pressure of the mixing air is allowed to rapidly drop after the fuel injection so as to suppress the wasteful consumption of the mixing air. This further facilitates the atomization of the injected fuel.

Now, an eighth preferred embodiment of the present invention will be described hereinbelow. The eighth preferred embodiment is the same as the foregoing seventh preferred embodiment except for the structure of an air distributing section 300 of an air passage 327 instead of the air distributing section 200 of the air passage 227. Accordingly, the structure of the air distributing section 300 will be mainly described hereinbelow.

The structure of the air passage 327 is also readily applicable to the foregoing first to sixth preferred embodiments.

Figure 33:
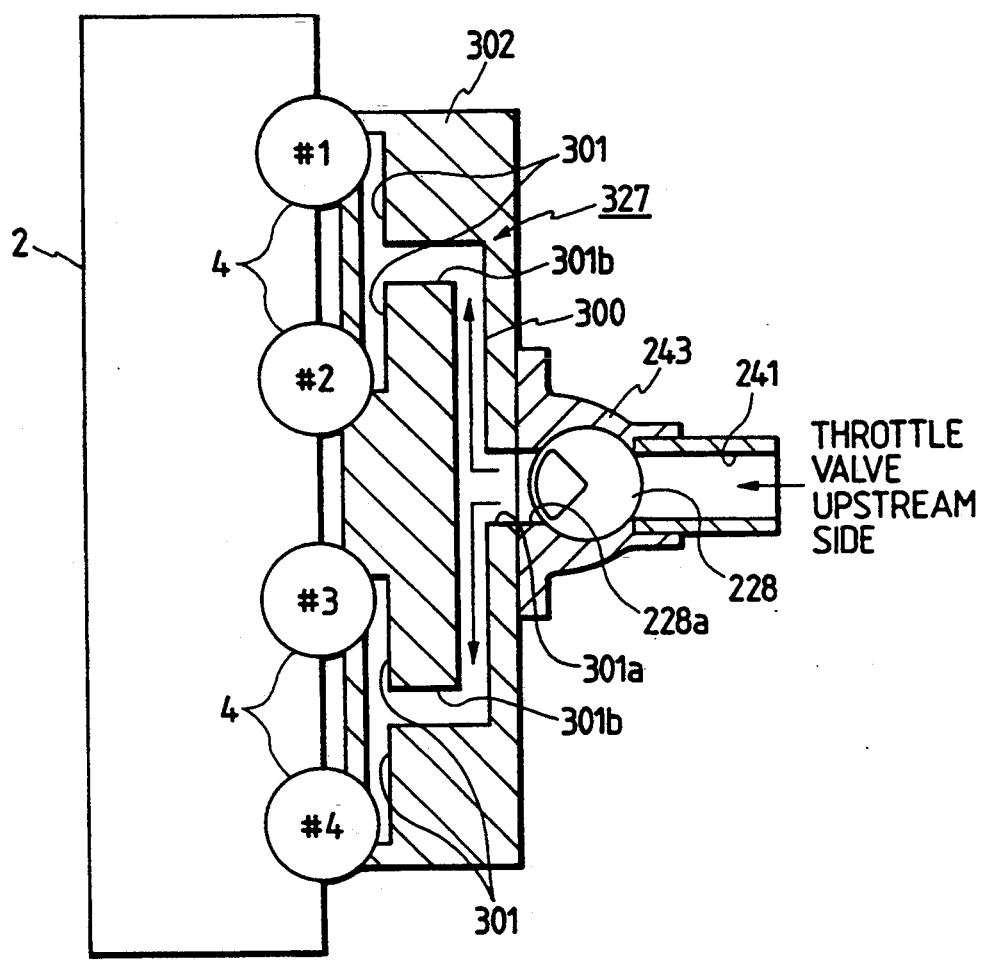
FIG. 33 is a plan sectional view schematically showing the structure of an air passage with the single air control valve disposed therein, according to an eighth preferred embodiment of the present invention.

FIG. 33 is a plan sectional view showing the structure of the air passage 327 with the air control valve 228 disposed therein, according to the eighth preferred embodiment. In FIG. 33, the same reference symbols as those in FIG. 30 represent the same components as those in FIG. 30.

As shown in FIG. 33, a distributing body 302 is directly fixed to the fuel injection valve 4 for each of the engine cylinders #1 to #4 in this preferred embodiment. The air distributing section 300 including air discharging sections 301 is formed in the distributing body 302 in a horizontal plane, i.e. in a plane parallel with the drawing sheet, as opposed to the seventh preferred embodiment where the air discharging sections 242 are formed radially relative to the branch portion 242a. In the distributing body 302, a first branch portion 301a is formed as being continuous with the outlet port 228a. The air distributing section 300 is bifurcated from the first branch portion 301a into two branch passages. Each of the two branch passages is then bent toward the engine 2 to form a second branch portion 301b. Each of the two branch passages of the air distributing section 300 is further bifurcated from the second branch portion 301b to form the air discharging sections 301 each being connected to the fuel injection valve 4 for the corresponding engine cylinder. As appreciated, the structure of FIG. 2 is applied to this preferred embodiment.

Accordingly, when the air control valve 228 is opened during the engine running, the mixing air conducted through the air introducing section 241 to the air distributing section 300 is distributed in two opposite directions from the first branch portion 301a, and is further distributed in two opposite directions from the respective second branch portions 301b so as to be respectively supplied via the air discharging sections 301 to the areas where the fuel is injected from the corresponding fuel injection valves 4.

In this preferred embodiment, passage lengths of the air distributing section 300 from the first branch portion 301a to the respective second branch portion 301b are set equal to each other. Further, passage lengths of the air distributing section 300 from the second branch portion 301b to the fuel injection valves 4 for the engine cylinders #1 and #2 and those from the second branch portion 301b to the fuel injection valves 4 for the engine cylinders #3 and #4 are all set equal to each other. In addition, the air distributing section 300 has a circular shape in cross section all along its length, and a cross-sectional passage area of the air distributing section 300 from the first branch portion 301a to the second branch portion 301b for the engine cylinders #1 and #2 is set equal to that for the engine cylinders #3 and #4. Moreover, cross-sectional passage areas of the air distributing section 300 from the respective second branch portion 301b to the corresponding fuel injection valves 4, that is, cross-sectional areas of the air discharging sections 301, are all set equal to each other. Accordingly, as in the seventh preferred embodiment, passage lengths from the first branch portion 301a to the respective fuel injection valves 4 are all equal to each other and corresponding cross-sectional passage areas are also all equal mutually. As a result, the mixing air is injected through all the air injecting holes 25 at substantially the same timing and in substantially the same amount so that the combustion states in the engine cylinders #1 to #4 can be unified to further facilitate the atomization of the injected fuel.

Further, in this preferred embodiment, a cross-sectional passage area of the first branch portion 301a is set equal to a sum of cross-sectional areas of the branch passages bifurcated therefrom. In addition, a cross-sectional area of each of the second branch portions 301b is set equal to a sum of cross-sectional passage areas of the air discharging sections 301 bifurcated therefrom. Accordingly, as in the seventh preferred embodiment, the lowering of a supply pressure of the mixing air due to the pressure drop at the first branch portion 301a and the second branch portions 301b is effectively prevented, and further, the capacity of the air passage 327 from the air control valve 228 to the fuel injection valves 4 is suppressed to the acceptable minimum value so that the supply pressure of the mixing air is allowed to rapidly drop after the fuel injection so as to suppress the wasteful consumption of the mixing air. This further facilitates the atomization of the injected fuel.

Now, a ninth preferred embodiment of the present invention will be described hereinbelow. The ninth preferred embodiment is the same as the foregoing seventh preferred embodiment except for the structure of an air distributing section 400 of an air passage 427 instead of the air distributing section 200 of the air passage 227. Accordingly, the structure of the air distributing section 400 will be mainly described hereinbelow.

The structure of the air passage 427 is also readily applicable to the foregoing first to sixth preferred embodiments.

Figure 34:
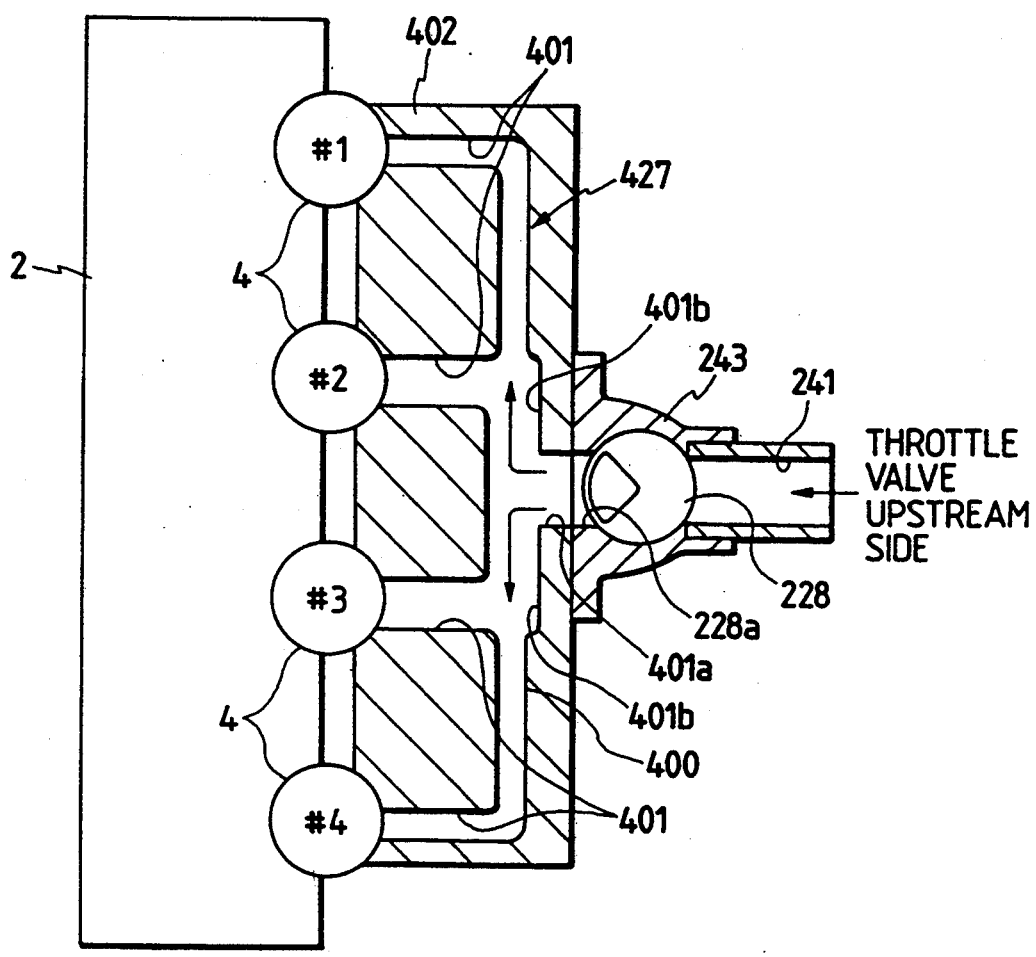
FIG. 34 is a plan sectional view schematically showing the structure of an air passage with the single air control valve disposed therein, according to a ninth preferred embodiment of the present invention.

FIG. 34 is a plan sectional view showing the structure of the air passage 427 with the air control valve 228 disposed therein, according to the ninth preferred embodiment. In FIG. 34, the same reference symbols as those in FIG. 30 represent the same components as those in FIG. 30.

As shown in FIG. 34, the air distributing section 400 of the air introducing passage 427 is formed in a distributing body 402 in a horizontal plane, i.e. in a plane parallel with the drawing sheet, as in the eighth preferred embodiment. In tile distributing body 402, a first branch portion 401a is formed as being continuous with the outlet port of the air control valve 228. The air distributing section 400 is bifurcated from the first branch portion 401a into two branch passages which are then bent toward the engine 2 at positions corresponding to the engine cylinders #2 and #3 so as to form air discharging sections 201, respectively, for supplying the mixing air through the air injecting holes 25 to the areas where the fuel is injected from the fuel injection valves 4 for the engine cylinder #2 and #3. The bending portions of the branch passages are defined as second branch portions 401b, respectively. The air distributing section 400 further extends through the second branch portions 401b to positions corresponding to the engine cylinders #1 and #4 where the air distributing section 400 is bent toward the engine 2 to form air distributing sections 401 for the engine cylinders #1 and #4, respectively, for supplying the mixing air as in the manner described above.

Accordingly, when the air control valve is opened during the engine running, the mixing air is distributed from the first branch portion 401a in two directions, and is further distributed from each of the second branch portions 401b in two directions so as to be supplied to the corresponding fuel injection valves 4.

As seen from FIG. 34, in this preferred embodiment, passage lengths of the air passage 427 from the first branch portion 401a to the respective fuel injection valves 4 are not set equal, as opposed to the foregoing seventh and eighth preferred embodiments, in consideration of simplification of the structure and applicability to the vehicle. Specifically, the passage lengths from the first branch portion 401a to the fuel injection valves 4 for the engine cylinders #1 and #4 are equal to each other. Similarly, the passage lengths from the first branch portion 401a to the fuel injection valves 4 for the engine cylinders #2 and #3 are equal to each other. On the other hand, the passage lengths for the engine cylinders #1 and #4 are not equal to those for the engine cylinders #2 and #3. However, in this preferred embodiment, cross-sectional areas of the air passage 427 extending from the second branch portions 401b for the engine cylinders #1 and #4 are reduced such that capacities of the air passage 427 extending from the second branch portions 401b to the fuel injection valves for the engine cylinders #1 and #4 are set equal to those for the engine cylinders #2 and #3. Accordingly, as in the seventh preferred embodiment, the mixing air is injected through the air injecting holes 25 at substantially the same timing and in substantially the same amount for the engine cylinders #1 to #4 so that the combustion states in all the cylinders are unified to further facilitate the atomization of the injected fuel.

Further, in this preferred embodiment, a cross-sectional passage area of the first branch portion 401a is set equal to a sum of cross-sectional areas of the branch passages bifurcated therefrom. In addition, a cross-sectional area of each of the second branch portions 401b is set equal to a sum of cross-sectional areas of the air passage 427 bifurcated therefrom. Accordingly, as in the seventh preferred embodiment, the lowering of a supply pressure of the mixing air due to the pressure drop at the first branch portion 401a and the second branch portions 401b is effectively prevented, and further, the capacity of the air passage 427 from the air control valve 228 to the fuel injection valves 4 is suppressed to the acceptable minimum value so that the supply pressure of the mixing air is allowed to rapidly drop after the fuel injection so as to suppress the wasteful consumption of the mixing air. This further facilitates the atomization of the injected fuel.

As appreciated, the structure of FIG. 2 is applied to this preferred embodiment.

Now, a tenth preferred embodiment of the present invention will be described hereinbelow. The tenth preferred embodiment is the same as the foregoing seventh preferred embodiment except for the structure of an air distributing section 500 of an air passage 527 instead of the air distributing section 200 of the air passage 227. Accordingly, the structure of the air distributing section 500 will be mainly described hereinbelow.

The structure of the air passage 527 is also readily applicable to the foregoing first to sixth preferred embodiments.

Figure 35:
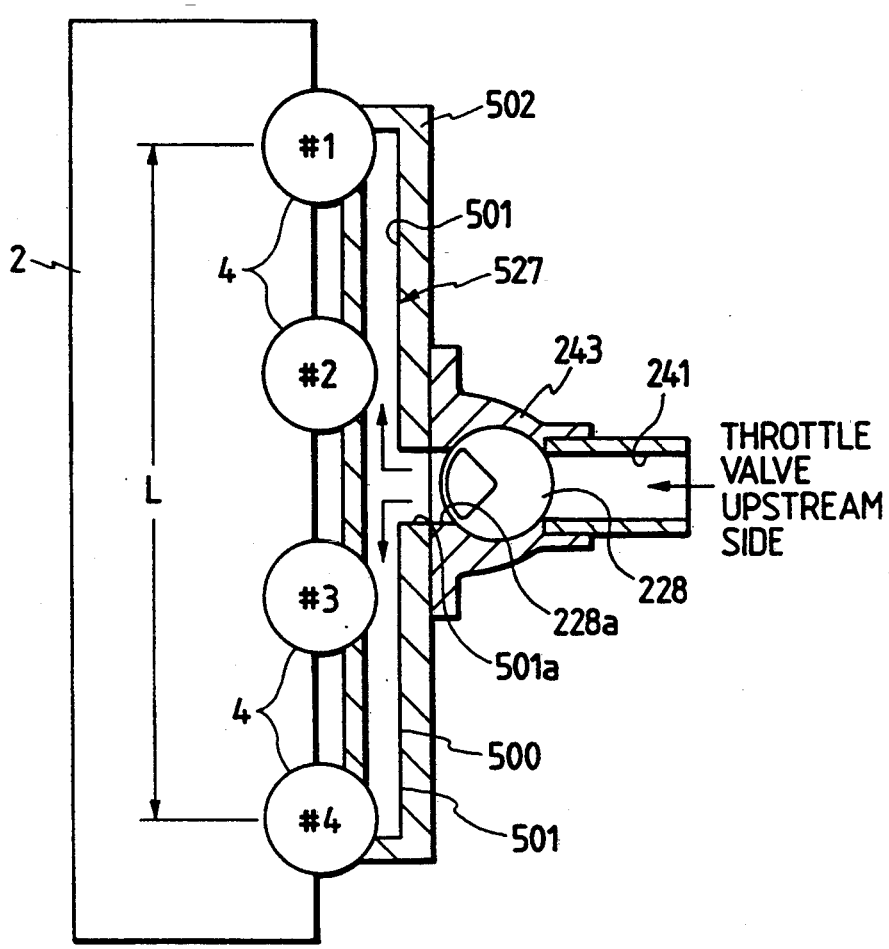
FIG. 35 is a plan sectional view schematically showing the structure of an air passage with the single air control valve disposed therein, according to a tenth preferred embodiment of the present invention.

FIG. 35 is a plan sectional view showing the structure of the air passage 527 with the air control valve 228 disposed therein, according to the tenth preferred embodiment. In FIG. 35, the same reference symbols as those in FIG. 30 represent the same components as those in FIG. 30.

As shown in FIG. 35, in a distributing body 502, a branch portion 501a is formed as being continuous with the outlet port 228a of the air control valve 228. The air distributing section 500 of the air passage 527 is bifurcated from the branch portion 501a to form air discharging sections 501. As seen from FIG. 35, the air distributing section 500 downstream of the branch portion 501a extends along a direction of arrangement of the fuel injection valves 4 to connect the adjacent fuel injection valves 4 at a minimum distance.

In this preferred embodiment, a cross-sectional passage area of the branch portion 301a is set equal to a sum of cross-sectional passage areas of the branch passages bifurcated from the branch portion 501a. Accordingly, as in the seventh preferred embodiment, the lowering of a supply pressure of the mixing air due to the pressure drop at the branch portion 501a is effectively prevented, and further, the capacity of the air passage 527 from the air control valve 228 to the fuel injection valves 4 is suppressed to the acceptable minimum value so that the supply pressure of the mixing air is allowed to rapidly drop after the fuel injection so as to suppress the wasteful consumption of the mixing air. This further facilitates the atomization of the injected fuel.

In this preferred embodiment, since the air distributing section 500 connects the adjacent fuel injection valves 4 at the minimum distance, capacities of the air passage 527 from the branch portion 501a to the respective fuel injection valves 4 are not set equal to each other, in consideration of simplification of the structure and applicability to the vehicle. However, in the four-cylinder engine as in this preferred embodiment, since a length L of the air distributing section 500 extending along the arrangement direction of the fuel injection valves 4 is suppressed to about 300 mm, a difference in a passage length between the fuel injection valves 4 for the engine cylinders 1 and 2 (3 and 4) becomes about 100 mm. Accordingly, on a practical basis, differences in mixing air supply timings and mixing air supply amounts caused due to the above-noted passage length difference do no substantially affect the combustion states in the engine cylinders.

As a result, the tenth preferred embodiment can facilitate the atomization of the injected fuel as in the seventh preferred embodiment, and further improve the simplification of the structure of the fuel injection system and its applicability to the vehicle.

As appreciated, the structure of FIG. 2 is applied to this preferred embodiment.

Now, an eleventh preferred embodiment of the present invention will be described hereinbelow. The eleventh preferred embodiment is the same as the foregoing seventh preferred embodiment except for the structure of an air distributing section 600 of an air passage 627 instead of the air distributing section 200 of the air passage 227. Accordingly, the structure of the air distributing section 600 will be mainly described hereinbelow.

The structure of the air passage 627 is also readily applicable to the foregoing first to sixth preferred embodiments.

Figure 36:
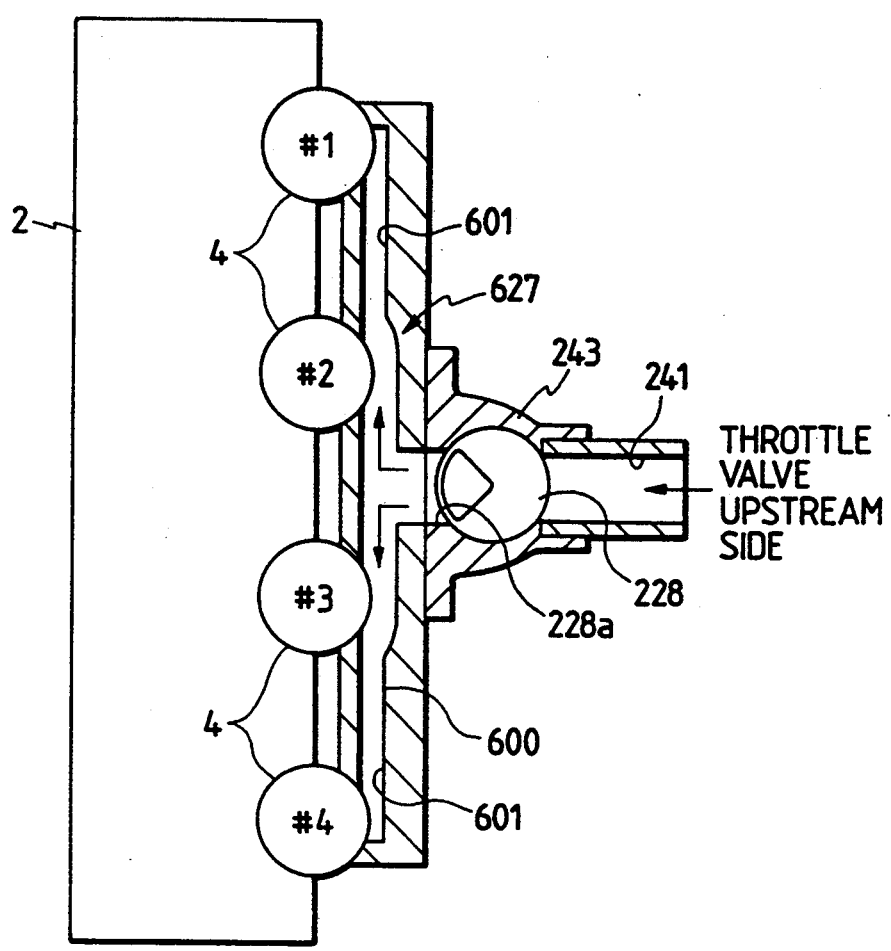
FIG. 36 is a plan sectional view schematically showing the structure of an air passage with the single air control valve disposed therein, according to an eleventh preferred embodiment of the present invention.

FIG. 36 is a plan sectional view showing the structure of the air passage 627 with the air control valve 228 disposed therein, according to the eleventh preferred embodiment. In FIG. 36, the same reference symbols as those in FIG. 30 represent the same components as those in FIG. 30.

As shown in FIG. 36, the air distributing section 600, including air discharging sections 601, of the air passage 627 in this preferred embodiment is the same as that in the tenth preferred embodiment except that a cross-sectional area of the passage extending from the fuel injection valve 4 for the engine cylinder #2 to that for the engine cylinder #1 and a cross-sectional area of the passage extending from the fuel injection valve 4 for the engine cylinder #3 to that for the engine cylinder #4 are respectively reduced by half in comparison with the tenth preferred embodiment. Accordingly, in this preferred embodiment, the capacity of the air passage 627 from the air control valve 228 to the fuel injection valves 4 is suppressed to a further reduced value so that the supply pressure of the mixing air is allowed to more rapidly drop after the fuel injection so as to suppress the wasteful consumption of the mixing air. This further facilitates the atomization of the injected fuel.

Now, a twelfth preferred embodiment of the present invention will be described hereinbelow. The twelfth preferred embodiment is the same as the foregoing tenth preferred embodiment except that a fuel delivery device 703 is unified with a distributing body 702 having therein an air distributing section 700 with air distributing sections 701 which forms a portion of an air passage 727.

FIG. 37 is a plan sectional view schematically showing the structure of the air passage 727 with the air control valve 228 disposed therein and with the fuel delivery device 703 unified with the distributing body 702, according to the twelfth preferred embodiment. In FIG. 37, the same reference symbols as those in FIG. 30 represent the same components as those in FIG. 30.

As shown in FIG. 37, in this preferred embodiment, the structure of the air passage 727 itself is the same as that of the air passage 527 in the tenth preferred embodiment. On the other hand, in FIG. 37, the fuel delivery device 703 for supplying the fuel to the fuel injection valves 4 is provided integral with the distributing body 702. Specifically, the fuel delivery device 703 is arranged in the distributing body 702 as connecting the fuel injection valves 4 mutually. To one end of the fuel delivery device 703 is connected a fuel pump (not shown) via a fuel hose 705 and to the other end thereof is connected a fuel tank (not shown) via a pressure regulator 704.

During the engine running, the fuel from the fuel pump is introduced into the fuel delivery device 703 to be adjusted to a given pressure by the pressure regulator 704 and then is distributed to the fuel injection valves 4 for the fuel injections. Excess fuel in the fuel delivery device 703 is returned to the fuel tank via the pressure regulator 704.

In this preferred embodiment, since not only the air supply system but also the fuel supply system are unified with the distributing body 702, the structure of the fuel injection system can be more simplified and the applicability of the fuel injection system to the vehicle can be more improved.

The unified structure of this preferred embodiment may be applied to the foregoing seventh to ninth and eleventh preferred embodiments.

Further, in the foregoing first to twelfth preferred embodiments, the mixing air is conducted from the upstream side of the throttle valve 8 in the intake passage 6 to the vicinity of the injection hole of the fuel injection valve 4 due to a pressure differential between the substantially atmospheric pressure at the upstream side of the throttle valve 8 and the vacuum pressure in the intake port 2a of the engine 2. However, an air pump may be provided for producing a high-pressure air which is to be supplied to the respective engine cylinders as the mixing air.

It is to be understood that this invention is not to be limited to the preferred embodiments and modifications described above, and that various changes and modifications may be made without departing from the spirit and scope of the invention as defined in the appended claims.

What is claimed is:

1. A fuel injection system for an internal combustion engine, comprising:

engine cylinders divided into a plurality of cylinder groups, each of said cylinder groups including a plurality of the engine cylinders;

fuel injection valves each provided for one of said engine cylinders;

an air passage having an introducing section for introducing air higher in pressure than that in an area near an injection hole of each fuel injection valve, and a plurality of air discharging sections each for conducting the air introduced via said air introducing section to one of said areas;

valve means, provided in said air passage, for opening and closing said air introducing section relative to said air discharging sections and for distributing the introduced air, when opening said air introducing section, to said air discharging sections selectively per cylinder group; and control means for controlling said valve means synchronously with fuel injection of each fuel injection valve so as to open said air introducing section and for controlling said valve means to a valve position which can supply the introduced air to the air discharging sections for one of said cylinder groups which includes the engine cylinder being injected with the fuel by the corresponding fuel injection valve.

2. A fuel injection system as set forth in claim 1, wherein said valve means comprises an air control valve provided in said air passage for opening and closing said air introducing section, and a distributing valve provided in said air passage downstream of said air control valve for distributing the introduced air to the air discharging sections selectively per cylinder group, and wherein said control means comprises air supply control means for opening said air control valve synchronously with the fuel injection of each fuel injection valve to allow the introduced air to pass therethrough, and distribution control means for controlling said distributing valve to a valve position which can supply the air to the air discharging sections for said one of the cylinder groups at least when said air control valve is opened.

3. The fuel injection system as set forth in claim 2, wherein at least one of said cylinder groups includes the engine cylinders for which the fuel injections are performed sequentially, and wherein continuous control means is further provided for continuously opening said air control valve during said sequential fuel injections and for controlling said distributing valve to a valve position which can supply the air to the air discharging sections for said at least one of the cylinder groups when an interval between said sequential fuel injections is shortened.

4. The fuel injection system as set forth in claim 1, wherein said air passage includes an intermediate section between said air introducing section and said air discharging sections, said intermediate section branching from said air introducing section per cylinder group so as to communicate with the corresponding air discharging sections, and wherein said valve means includes a plurality of opening/closing valves provided in said intermediate section in such a manner as to open and close said air passage per cylinder group.

5. The fuel injection system as set forth in claim 1, wherein said air passage includes an intermediate section between said air introducing section and said air discharging sections, said intermediate section having a branch portion communicating with said air introducing section and branch passages branching from said branch portion, each of said branch passages communicating with said air discharging sections for one of said cylinder groups, and wherein said valve means includes a plurality of opening/closing valves each provided in one of said branch passages so that said air introducing section is opened and closed relative to said air discharging sections per cylinder group.

6. The fuel injection system as set forth in claim 1, wherein said air passage includes a branch portion communicating with said air introducing section at its upstream side and with said air discharging sections at its downstream side, and wherein capacities of said air passage from said branch portion to the respective fuel injection valves are set substantially equal to each other.

7. The fuel injection system as set forth in claim 1, wherein said air passage Includes a branch portion communicating with said air introducing section at its upstream side and with said air discharging sections at its downstream side, and wherein lengths and cross-sectional areas of said air passage from said branch portion to the respective fuel Injection valves are set substantially equal to each other.

8. The fuel injection system as set forth in claim 1, wherein said air passage Includes a branch portion communicating with said air introducing section at its upstream side and with said air discharging sections at its downstream side, and wherein a cross-sectional area of said air passage upstream of said branch portion is set substantially equal to a sum of cross-sectional areas of said air passage downstream of said branch portion.

9. The fuel injection system as set forth in claim 1, wherein said air passage includes a branch portion communicating with said air introducing section at its upstream side and with said air discharging sections at its downstream side, and wherein said air discharging sections for each of said cylinder groups are unified with each other so as to extend along a direction of arrangement of the corresponding fuel injection valves to connect the adjacent fuel injection valves at a minimum distance.

10. A fuel injection system for an internal combustion engine, comprising:

engine cylinders divided into a plurality of cylinder groups;

fuel injection valves each provided for one of said engine cylinders;

an air passage having an introducing section for introducing air higher in pressure than that in an area near an injection hole of each fuel injection valve, and a plurality of air discharging sections each for conducting the air introduced via said air introducing section to one of said areas;

valve means, provided in said air passage, for opening and closing said air introducing section relative to said air discharging sections and for distributing the introduced air, when opening said air introducing section, to said air discharging sections selectively per cylinder group, said valve means comprising an air control valve provided in said air passage for opening and closing said air introducing section, and a distributing valve provided in said air passage downstream of said air control valve for distributing the introduced air to the air discharging sections selectively per cylinder group; and control means for controlling said valve means synchronously with a fuel injection of each fuel injection valve so as to open said air introducing section and for controlling said valve means to a valve position which can supply the introduced air to the air discharging sections for one of said cylinder groups which includes the engine cylinder being injected with the fuel by the corresponding fuel injection valve, said control means comprising air supply control means for opening said air control valve synchronously with the fuel injection of each fuel injection valve to allow the introduced air to pass therethrough, and distribution control means for controlling said distributing valve to a valve position which can supply the air to the air discharging sections for said one of the cylinder groups at least when said air control valve is opened;

said distributing valve being arranged to be capable of simultaneously distributing the introduced air to the air discharging sections for all the engine cylinders, and wherein distribution inhibiting means is further provided for inhibiting the valve position control by said distribution control means and for switching said valve position of the distributing valve to a valve position which can distribute the introduced air simultaneously to the air discharging sections for all the engine cylinders when a valve opening time of said air control valve is equal to or greater than a time period which requires overlapping air supplies for the engine cylinders belonging to the different cylinder groups.

11. A fuel injection system for an internal combustion engine, comprising:

engine cylinders divided into a plurality of cylinder groups;

fuel injection valves each provided for one of said engine cylinders;

an air passage having an introducing section for introducing air higher in pressure than that in an area near an injection hole of each fuel injection valve, and a plurality of air discharging sections each for conducting the air introduced via said air introducing section to one of said areas;

valve means, provided in said air passage, for opening and closing said air introducing section relative to said air discharging sections and for distributing the introduced air, when opening said air introducing section, to said air discharging sections selectively per cylinder group, said valve means comprising an air control valve provided in said air passage for opening and closing said air introducing section, and a distributing valve provided in said air passage downstream of said air control valve for distributing the introduced air to the air discharging sections selectively per cylinder group; and control means for controlling said valve means synchronously with a fuel injection of each fuel injection valve so as to open said air introducing section and for controlling said valve means to a valve position which can supply the introduced air to the air discharging sections for one of said cylinder groups which includes the engine cylinder being injected with the fuel by the corresponding fuel injection valve, said control means comprising air supply control means for opening said air control valve synchronously with the fuel injection of each fuel injection valve to allow the introduced air to pass therethrough, and distribution control means for controlling said distributing valve to a valve position which can supply the air to the air discharging sections for said one of the cylinder groups at least when said air control valve is opened;

said distributing valve being arranged to be capable of simultaneously distributing the introduced air to the air discharging sections for all the engine cylinders, and wherein distribution inhibiting means is further provided for inhibiting the valve position control by said distribution control means and for switching said valve position of the distributing valve to a valve position which can distribute the introduced air simultaneously to the air discharging sections for all the engine cylinders when a valve opening time of said fuel injection valve is equal to or greater than a time period which requires overlapping fuel supplies for the engine cylinders belonging to the different cylinder groups.

12. A fuel injection system for an internal combustion engine, comprising:

engine cylinders divided into a plurality of cylinder groups, each of said cylinder groups including a plurality of the engine cylinders;

fuel injection valves each provided for one of said engine cylinders;

an air passage having an air introducing section for introducing air higher in pressure than that in an area near an injection hole of each fuel injection valve, and a plurality of air discharging sections each for conducting the air introduced via said air introducing section to one of said areas;

valve means, provided in said air passage, for opening and closing said air introducing section relative to said air discharging sections, said valve means having first valve positions for distributing the introduced air to said air discharging sections selectively per cylinder group when said air introducing section is opened; and control means for controlling said valve means synchronously with a fuel injection of each fuel injection valve so as to open said air introducing section and for controlling said valve means to one of said first valve positions so as to supply the introduced air to the air discharging sections for one of said cylinder groups which includes the engine cylinder being injected with the fuel by the corresponding fuel injection valve.

13. A fuel injection system as set forth in claim 12, wherein said valve means comprises an air control valve provided in said air passage for opening and closing said air introducing section, and a distributing valve provided in said air passage downstream of said air control valve and having said first valve positions for distributing the introduced air to the air discharging sections selectively per cylinder group, and wherein said control means opens said air control valve synchronously with the fuel injection of each fuel injection valve to allow the introduced air to pass therethrough, and further controls said distributing valve to said one of the first valve positions so as to supply the air to the air discharging sections for said one of the cylinder groups at least when said air control valve is opened.

14. A fuel injection system for an internal combustion engine, comprising:

engine cylinders divided into a plurality of cylinder groups;

fuel injection valves each provided for one of said engine cylinders;

an air passage having an air introducing section for introducing air higher in pressure than that in an area near an injection hole of each fuel injection valve, and a plurality of air discharging sections each for conducting the air introduced via said air introducing section to one of said areas;

valve means, provided in said air passage, for opening and closing said air introducing section relative to said air discharging sections, said valve means having first valve positions for distributing the introduced air to said air discharging sections selectively per cylinder group when said air introducing section is opened, said valve means comprising an air control valve provided in said air passage for opening and closing said air introducing section, and a distributing valve provided in said air passage downstream of said air control valve and having said first valve positions for distributing the introduced air to the air discharging sections selectively per cylinder group, said distributing valve having a second valve position for simultaneously distributing the introduced air to the air discharging sections for all the engine cylinders; and control means for controlling said valve means synchronously with a fuel injection of each fuel injection valve so as to open said air introducing section and for controlling said valve means to one of said first valve positions so as to supply the introduced air to the air discharging sections for one of said cylinder groups which includes the engine cylinder being injected with the fuel by the corresponding fuel injection valve, said control means opening said air control valve synchronously with the fuel injection of each fuel injection valve to allow the introduced air to pass therethrough, and said control means further controls said distributing valve to said one of the first valve positions so as to supply the air to the air discharging sections for said one the cylinder groups at least when said air control valve is opened, said control means controlling said distributing valve to said second position when a valve opening time of said air control valve is equal to or greater than a time period which requires overlapping air supplies for the engine cylinders.

* * * * *